(12) United States Patent
Pellow-Jarman et al.

(10) Patent No.: US 12,292,945 B2
(45) Date of Patent: *May 6, 2025

(54) CALCULATION CONTROL FOR HYBRID COMPUTING OF HAMILTONIAN EIGENSOLUTIONS

(71) Applicant: QUNOVA COMPUTING, INC., Daejeon (KR)

(72) Inventors: Aidan Patrick Pellow-Jarman, Cape Town (ZA); Shane Dylan McFarthing, Cape Town (ZA); Rowan Martin Pellow-Jarman, Durban (ZA); Eyuel Eshetu Elala, Daejeon (KR); Doo Hyung Kang, Daejeon (KR); Heejeong Jeong, Daejeon (KR)

(73) Assignee: QUNOVA COMPUTING, INC. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/762,439

(22) Filed: Jul. 2, 2024

(65) Prior Publication Data

US 2025/0077930 A1    Mar. 6, 2025

Related U.S. Application Data

(63) Continuation of application No. 18/750,874, filed on Jun. 21, 2024.
(Continued)

(51) Int. Cl.
*G06F 17/11*    (2006.01)
*G06N 10/60*    (2022.01)

(52) U.S. Cl.
CPC ............. *G06F 17/11* (2013.01); *G06N 10/60* (2022.01)

(58) Field of Classification Search
CPC .................... G06N 10/00–80; G06F 17/11
See application file for complete search history.

(56) References Cited

U.S. PATENT DOCUMENTS 10,332,023 B2 *  6/2019   Mezzacapo ............ G06N 10/60
11,301,770 B2    4/2022   Genin et al.
(Continued)

FOREIGN PATENT DOCUMENTS

WO    2020037253 A1    2/2020
WO    2023210840 A1    11/2023

OTHER PUBLICATIONS

Jarrod R McClean et al. "The theory of variational hybrid quantum-classical algorithms" New Journal of Physics (2016) vol. 18.
(Continued)

*Primary Examiner* — Emily E Larocque
(74) *Attorney, Agent, or Firm* — K&L Gates LLP

(57) ABSTRACT

Calculation control for hybrid computing of Hamiltonian eigensolutions may be provided by selecting K basis states from an ansatz space of a chemical system, wherein the ansatz space is generated by a quantum computer system and includes fewer basis states than a whole basis space for the chemical system, wherein the K basis states are selected according to a selection protocol to define a core space for the chemical system; computing, via an eigensolver provided by a classical computer system, an eigensolution for the chemical system from the core space; and outputting the eigensolution for the chemical system.

16 Claims, 34 Drawing Sheets

Related U.S. Application Data

(60) Provisional application No. 63/566,620, filed on Mar. 18, 2024, provisional application No. 63/535,545, filed on Aug. 30, 2023.

(56) References Cited

U.S. PATENT DOCUMENTS

| | | | |
|---|---|---|---|
| 2020/0065439 A1 | 2/2020 | Babbush et al. | |
| 2022/0164501 A1* | 5/2022 | Nosanow | G06N 10/20 |
| 2022/0284337 A1 | 9/2022 | Radin et al. | |
| 2022/0358391 A1* | 11/2022 | Johnson | G06F 9/5077 |
| 2023/0054868 A1 | 2/2023 | Zhang et al. | |
| 2023/0081927 A1 | 3/2023 | Zhang et al. | |
| 2023/0169381 A1* | 6/2023 | Wang | G06F 9/5094 703/2 |
| 2023/0289501 A1 | 9/2023 | Nguyen et al. | |

OTHER PUBLICATIONS

Jonathan Romero et al. "Strategies for quantum computing molecular energies using the unitary coupled cluster ansatz" Quantum Science and Technology (2019) vol. 4.

Frank Arute et al. "Quantum supremacy using a programmable superconducting processor" Nature (2019) vol. 574, pp. 505-510.

Dr. Jean M. Standard "A Hartree-Fock Calculation of the Water Molecule" (2015).

Yuya O. Nakagawa et al. "ADAPT-QSCI: Adaptive Construction of Input State for Quantum-Selected Configuration Interaction" Quantum Physics (2023).

Keita Kanno et al. "Quantum-Selected Conguration Interaction: classical diagonalization of Hamiltonians in subspaces selected by quantum computers" Quantum Physics (2023).

Peruzzo, Alberto, et al. "A variational eigenvalue solver on a photonic quantum processor." Nature communications (20214) vol. 5, No. 4213.

Lee, Joonho, et al. "Generalized unitary coupled cluster wave functions for quantum computation." Journal of chemical theory and computation (2018) vol. 15, pp. 311-324.

Tang, Ho Lun, et al. "Qubit-ADAPT-VQE: An adaptive algorithm for constructing hardware-efficient ans atze on a quantum processor." PRX Quantum (2021) vol. 2, issue 2, 020310.

Mizukami, Wataru, et al. "Orbital optimized unitary coupled cluster theory for quantum computer." Physical Review Research (2020) vol. 2, Issue 3, 033421.

Bierman, Joel, Yingzhou Li, and Jianfeng Lu. "Improving the accuracy of variational quantum eigensolvers with fewer qubits using orbital optimization." Journal of Chemical Theory and Computation (2023) vol. 19(3), pp. 790-798.

* cited by examiner

CALCULATION CONTROL FOR HYBRID COMPUTING OF HAMILTONIAN EIGENSOLUTIONS

INCORPORATION BY REFERENCE

Any and each application to which a priority claim is made in the Application Data Sheet is hereby incorporated by reference in its entirety.

BACKGROUND

Field

The present disclosure relates to computation using quantum computers.

Quantum Computers

Quantum computers, in contrast to classical computers, use quantum mechanical phenomena to store data in quantum bits or "qubits" that can store classical representation of '0', '1' or the superposition of the two. Accordingly, rather than outputting true/false or 1/0 when read as a classical bit would provide, a qubit provides these classical values as output probabilistically based on the state of the qubit. Quantum computers have several promising uses that benefit from the nondeterministic nature of quantum phenomena, which are capable of providing greater speed and efficiency in solving certain classes of calculations than classical computers can provide. However, these quantum computers suffer from noise in those calculations that can prevent the quantum computers from reaching solutions for various calculations (e.g., being trapped in local minima/maxima, having noise dominate an output value, etc.).

Calculating Hamiltonians

One field where quantum computers are showing promise is in the simulation of the quantum properties of chemical systems, such as by calculating the eigensolutions of the Hamiltonian of a system. The Hamiltonian corresponds to the total energy (e.g., the kinetic and potential energies of the constituent particles) in the simulated system and provides the possible energies according to a set of eigenvalues and eigenvectors. These values have proven of interest for researchers in evaluating potential chemical interactions of complex molecules with one another and biological structures (e.g., cells, viruses, and components thereof), and may be used in identifying new medicines and therapeutic agents, and the uses thereof.

No Admission of Prior Art

The discussions in this section is to provide background for the present disclosure and does not constitute an admission of prior art.

SUMMARY

Hybrid Computing

The present disclosure provides for calculation control for hybrid computing of Hamiltonian eigensolutions. In a hybrid computing environment, both classical computing devices and quantum computing devices are used to provide operators with the benefits of each computing technology, while reducing the drawbacks of each computing technology. For example, by controlling the calculation of Hamiltonian eigensolutions in the hybrid environment as described in the present disclosure, an operator can produce a more accurate set of answers than when using a quantum-only computing system, and more quickly (and with fewer computing resources) than when using a classical-only computing system. Additionally, the added functionalities offered by the present disclosure include improvements over conventional hybrid computing systems by identifying when to perform given operations in a classical or a quantum computing system.

Handover Algorithms

Traditional quantum computing practices take advantage of the increased efficiency of quantum computers to potentially solve various problems in fields of chemical analysis that have proven to be intractable for classical computers to solve. The classical computer traditionally prepares the problem to be run on the quantum computer and then decodes the output of the quantum computation to obtain the answer. However, quantum computers are still a developing technology for which hardware access remains limited, and the outputs provided by quantum computers can be inexact due to noise inherent in the quantum computers. Handover algorithms, as described in the present disclosure, allow the classical computer to take over calculations from the quantum computer before the quantum computer would traditionally output a solution but after the quantum computer has rendered the problem tractable by classical computers, which are not affected by quantum noise in their output and are generally available more widely than quantum computers. By identifying when the quantum computer has produced sufficient information for the quantum computer to "hand over" the task of completing the calculation to the classical computer, operators may perform calculations that that have traditionally been identified as intractable for classical computers while also avoiding noise in the final answer (producing more accurate final results), and freeing up limited quantum computing resources for other calculations that remain intractable for classical computers, among other benefits.

Hamiltonian Calculations

Particularly, with respect to calculating Hamiltonian eigensolutions, by using the classical computing systems to formulate the initial full Hamiltonian, the quantum computing systems to produce the corresponding wave functions, and the classical computing system to determine how and when to produce a version of the full Hamiltonian with a reduced dimension (referred to herein as a subspace Hamiltonian), the present disclosure allows for control of the calculations to be passed back to the classical computing system. By controlling when and how to pass control back to the classical computing systems (or to pass operation back to the quantum computing systems), the present disclosure provides an output for Hamiltonian calculations that mitigates the uncertainty inherent to quantum noise in quantum computing systems. Additionally, the described approach uses fewer computing resources than other hybrid computing approaches and provides operators with various controls to select different thresholds for accuracy, resource dedication, and calculation profiles, among other benefits and technical improvements that will be apparent to those skilled in the art on a detailed review of the present disclosure.

Hamiltonian Representation

The Hamiltonian can be represented as a matrix, which reduces the quantum chemistry problem to a matrix eigensolution problem. The size of such a matrix grows exponentially fast with respect to the numbers of electrons and orbitals. The target state that satisfies the eigensolution problem is often very sparse, meaning that the amplitudes, or contributions, of a large portion of the basis states that make up the state are zero or negligibly small. As a result, one can use the basis states that have non-negligible contributions to the target state to perform a reduction of the Hamiltonian matrix to a smaller dense matrix. Such a compressed matrix may still have an accurate eigensolution or have an approximated eigensolution.

Extension of Solution

The eigensolution problem of a sparse matrix can be extended beyond chemistry problems. Any optimization problem that can be formulated as a quadratic unconstrained binary optimization problem can be compressed to a certain degree of accuracy. In this picture, the power of solving a large matrix can be derived from the efficient methodology for compressing a large matrix to a smaller representative matrix.

Aspects of the Disclosure

One aspect of the present disclosure provides a method that uses a hybrid computing system to output the ground state value and the ground state energy value of a chemical system calculated by both a quantum computing device and a classical computing device by performing, via a quantum computing system, preparing a wave function with respect to the full Hamiltonian for a chemical system having $2^n$ basis states using a trial wave function preparation protocol such that the wave function facilitates the sampling of the basis states with non-negligible contributions to the eigensolution of the full Hamiltonian; terminating the iterative calculation once the quantum computing system prepares a sufficiently accurate wave function; sampling, via the quantum computing system, a plurality of N samples from the prepared wave function from a last iteration of the iterative calculation, based on probabilities of the chemical compound occupying those K basis states, to describe a subset of N basis states from among the $2^n$ basis states; selecting, via the classical computer system, a subset of K basis states from among the N basis states using a selection protocol, constructing, via the classical computer system, a subspace Hamiltonian of the full Hamiltonian; and computing and outputting, via the classical computer system, a classically-computed ground state eigensolution for the full Hamiltonian based on a classically-computed eigensolution of the subspace Hamiltonian.

Variation is Contemplated Across Iterations

In the forgoing method, the initial state preparation protocol may comprise various different protocols that are varied across different iterations, the trial wave function preparation protocol may comprise various different protocols that are varied across different iterations, different stop criteria may be used across the various iterative loops and cause an individual loop to exit by different conditions at various iterations, the selection protocol for selecting the K basis states from among the $2^n$ basis states for inclusion in the subspace Hamiltonian may comprise various different protocols that are varied across different iterations.

Additional Aspects

Additional aspects, features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

Figure 1:
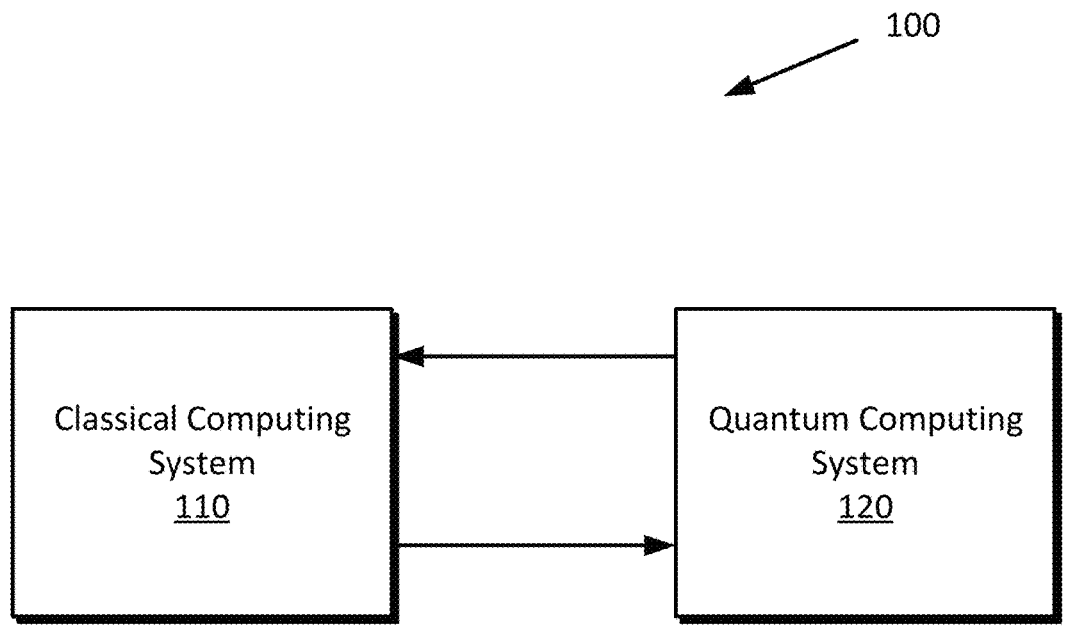
FIG. 1 illustrates an example hybrid computing system, according to embodiments of the present disclosure.

The exemplifications set out herein illustrate certain non-limiting embodiments, in one form, and such exemplifications are not to be construed as limiting the scope of the appended claims in any manner.

DETAILED DESCRIPTION

Examples and Embodiments

The presently disclosed subject matter now will be described and discussed in more detail in terms of some specific embodiments and examples with reference to the accompanying drawings, in which some, but not all embodiments of the invention are shown. Like numbers refer to like elements or parts throughout unless otherwise referenced. The presently disclosed subject matter may be embodied in many different forms and should not be construed as limited to the specific embodiments set forth herein. Rather, these embodiments are provided so that this disclosure will satisfy applicable legal requirements. Indeed, many modifications and other embodiments of the presently disclosed subject matter will come to the mind of one skilled in the art to which the presently disclosed subject matter pertains. Therefore, it is to be understood that the presently disclosed subject matter is not to be limited to the specific embodiments disclosed and that modifications and other embodiments are intended to be included within the scope of the appended claims.

Chemical Systems

The term "chemical system" may refer to any composition or collection of atoms representable by a chemical formula including molecules, ions, radicals, etc., in which the atoms thereof are bound together via covalent or non-covalent bonds, including homonuclear or heteronuclear collections thereof.

Quantum Representation of a Chemical System

When representing a chemical system in a quantum computer, qubits are used to represent properties of chemical system, where each qubit is based on a two-level quantum system that encodes a computational basis state of $|0\rangle$ or $|1\rangle$, but can be a coherent superposition of either value at the same time until measured. Accordingly, a quantum computer using n qubits has 2n basis states available to describe the chemical system. Each of these 2n basis states is associated with a probability amplitude $\alpha_i$, whose magnitude squared represents a probability of the chemical system being in a given basis state, where the value of $\alpha_i$ is determined by sampling the quantum representation of the chemical system and noting how often the chemical system is found in a given basis state. For example, if a one qubit system (e.g., n=1) is sampled X times, the computational basis state may be determined to be $|0\rangle$ Y % of the time (e.g., $Y=|a_0|^2*100$) and $|1\rangle$ Z % of the time (e.g., $Z=|a_1|^2*100$), and the system can be presented in a wave function as $|\psi\rangle = \alpha_0|0\rangle + \alpha_1|1\rangle$.

Hamiltonian (H)

A Hamiltonian is an operator in quantum mechanics, and for a chemical system represents the total energy and provides the possible energies according to a set of eigenvalues and eigenvectors. The energy for a given state in which the system can be is given by the expectation value of the Hamiltonian with respect to that state.

Varieties of Hamiltonians

A full Hamiltonian includes values for every basis state for the chemical system it represents; however, many of these basis states' contributions to the eigensolution are zero or close to zero, which indicates a low probability of the chemical system being measured in that basis state. Accordingly, the number of basis states that the chemical system has a high probability of being in are relatively small compared to the total number of basis states. Using this sparsity, a subspace Hamiltonian can be constructed using only the small number of basis states relevant to the eigensolution of the full Hamiltonian. If the basis states used to construct the subspace Hamiltonian match those that are most representative of eigensolution of the full Hamiltonian for the chemical system, then the eigensolution of the subspace Hamiltonian is able to approximate the eigensolution of the full Hamiltonian for the chemical system, while reducing the computational complexity of the representation.

Implications of Identifying a Representative Subspace Hamiltonian

Calculating the amplitudes for the basis states of the eigensolution of the full Hamiltonian for a chemical system is typically proposed to be performed via a quantum computer as the computational complexity of the calculations for chemical systems of increasing size renders generating a solution via classical computers or human mental processes intractable. Operators may use various quantum computing methodologies, such as a variational quantum eigensolver (VQE), to find the ground state of the chemical system from an initial state using an ansatz (which may develop a best guess for the eventual ground state formed using various methodologies known to those of skill in the art). VQE is an iterative process, which consumes significant computing resources on the quantum computer, and may end with the iterations resulting in suboptimal solution that does not correspond to the ground state (e.g., a local minimum instead of a global minimum), which further wastes limited quantum computing resources. However, by identifying when the quantum computer has produced a sufficiently accurate wave function to produce a representative subspace Hamiltonian (typically prior to reaching a quantitatively complete answer on its own), the quantum computer can hand over further calculations to a classical computer to solve the remaining portion of the calculations provided that the subspace Hamiltonian reduces the problem space enough to render the calculation classically tractable. Accordingly, a hybrid computing system can use a hand over procedure to transfer calculations (using a full Hamiltonian) from the quantum computer to a classical computing system (using a corresponding subspace Hamiltonian) to complete the calculations, thereby conserving limited quantum computing resources while also producing an output that is unaffected by a quantum noise floor for the accuracy thereof, among other benefits of using a hybrid computing system.

Hybrid Computing System

FIG. 1 illustrates an example hybrid computing system 100, according to embodiments of the present disclosure. The hybrid computing system 100 includes a classical computing system 110 that is interfaced with a quantum computing system 120 to perform calculations partially using classical computing techniques and quantum computing techniques. As used herein, a hybrid computing system 100 refers to a classical-quantum computer combination, rather than combinations of analog and digital computers, which in other fields have variously referred to as "hybrid computers". Each of the classical computing system 110 and the quantum computing system 120 may include one or multiple computing devices and various communications interfaces. An example classical computing system 110 is discussed in relation to FIG. 12, and an example quantum computing system 120 is discussed in relation to FIG. 13.

Benefits of a Hybrid Computing System

Conventionally, classical computing systems 110 have been used to define the sequence of quantum gates or quantum circuits for the quantum computing systems 120 and to receive the results of the quantum calculations performed by quantum computing systems 120. In contrast, the hybrid computing system 100 allows for both classical calculations and quantum calculations to be efficiently performed by distributing the workload between the systems according to the relative strengths of the systems for certain tasks. This results in improving the functionality of the overall system, reducing the computational resources required by conventional computing systems, improving the speed and accuracy of the calculations performed, among other technical improvements and benefits.

Various Architectures of Hybrid Computing System

In various embodiments, the hybrid computing system 100 may be organized according to various architectures, including batch quantum computing architectures, interactive quantum computing architectures, integrated quantum computing architectures, and distributed quantum computing architectures.

Batch Computing Architectures

In batch quantum computing architectures, the classical computing system 110 defines quantum circuits and submits those quantum circuits as jobs to the quantum processing unit (QPU) of the quantum computing system 120, which returns the result to the classical computing system 110. Batching multiple quantum circuits into one job, however, reduces wait time between submissions, allowing the hybrid computing system 100 to run multiple jobs faster. Accordingly, when one quantum circuit "job" is completed by the quantum computing system 120, the next quantum circuit "job" is ready for analysis.

Interactive Quantum Computing Architectures

In interactive quantum computing architectures, an operator can specify repeated execution of the quantum circuit with different parameters (or the same parameters). Jobs can be grouped logically into one session and prioritized over non-session jobs. Although sessions allow for shorter queue times and longer running problems, the qubit states does not persist between each iteration. Examples of problems that can use this approach are Variational Quantum Eigensolvers (VQE) and Quantum Approximate Optimization Algorithms (QAOA).

Integrated Quantum Computing Architectures

In integrated quantum computing architectures, classical computations are performed while physical qubits are coherent, as the classical computing system 110 and quantum computing system 120 operate together. Although potentially constrained by qubit life and error correction, integrated architectures allow for quantum programs to include common programming tools (e.g., loops, nested conditional statements, etc.) beyond mere circuit analysis that can use one or more states from the quantum circuit as values for variables. Beneficially, the classical computing system 110 may allow for various qubit reuse techniques; allowing the quantum computing system 120 to have fewer physical qubits, but offer a larger number of "virtual" qubits to run more complex calculations.

Distributed Quantum Computing Architectures

In distributed quantum computing architectures, the classical computing system 110 works with the quantum computing system 120 using logical qubits. The long coherence time provided by logical qubits enables complex and distributed computation across a cloud computing environment. Accordingly, the various computing devices may be located in different environments from one another, and may be shared with other users on a platform as a service (PaaS) usage model.

Example Calculation Spaces

Figure 2A:
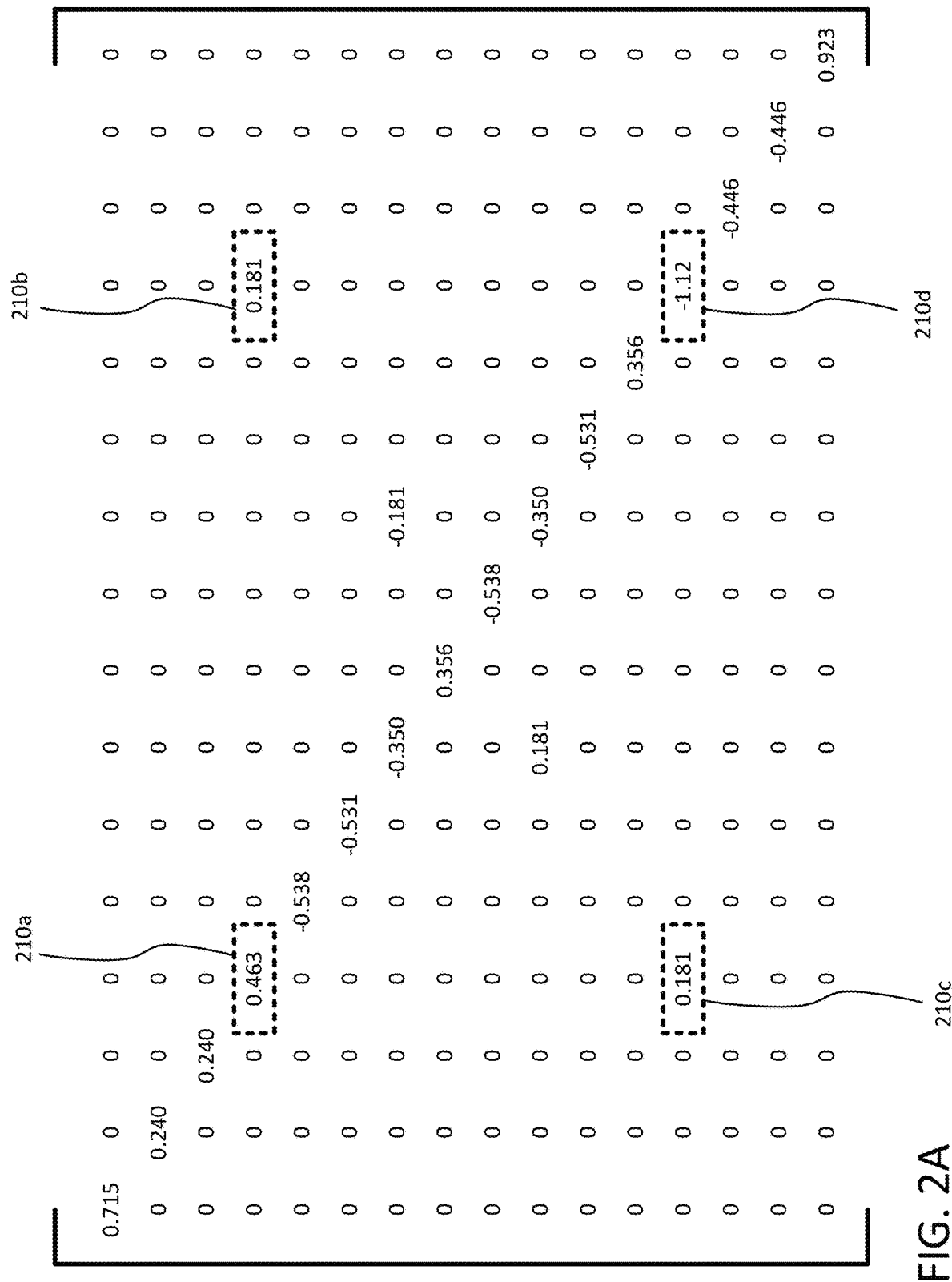
FIGS. 2A-2C provide illustrations of various calculation spaces, according to embodiments of the present disclosure.
Figure 2B:
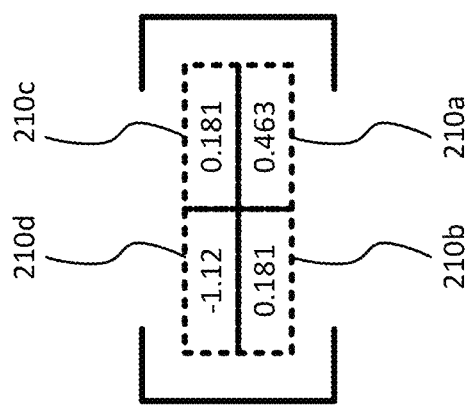
Figure 2C:
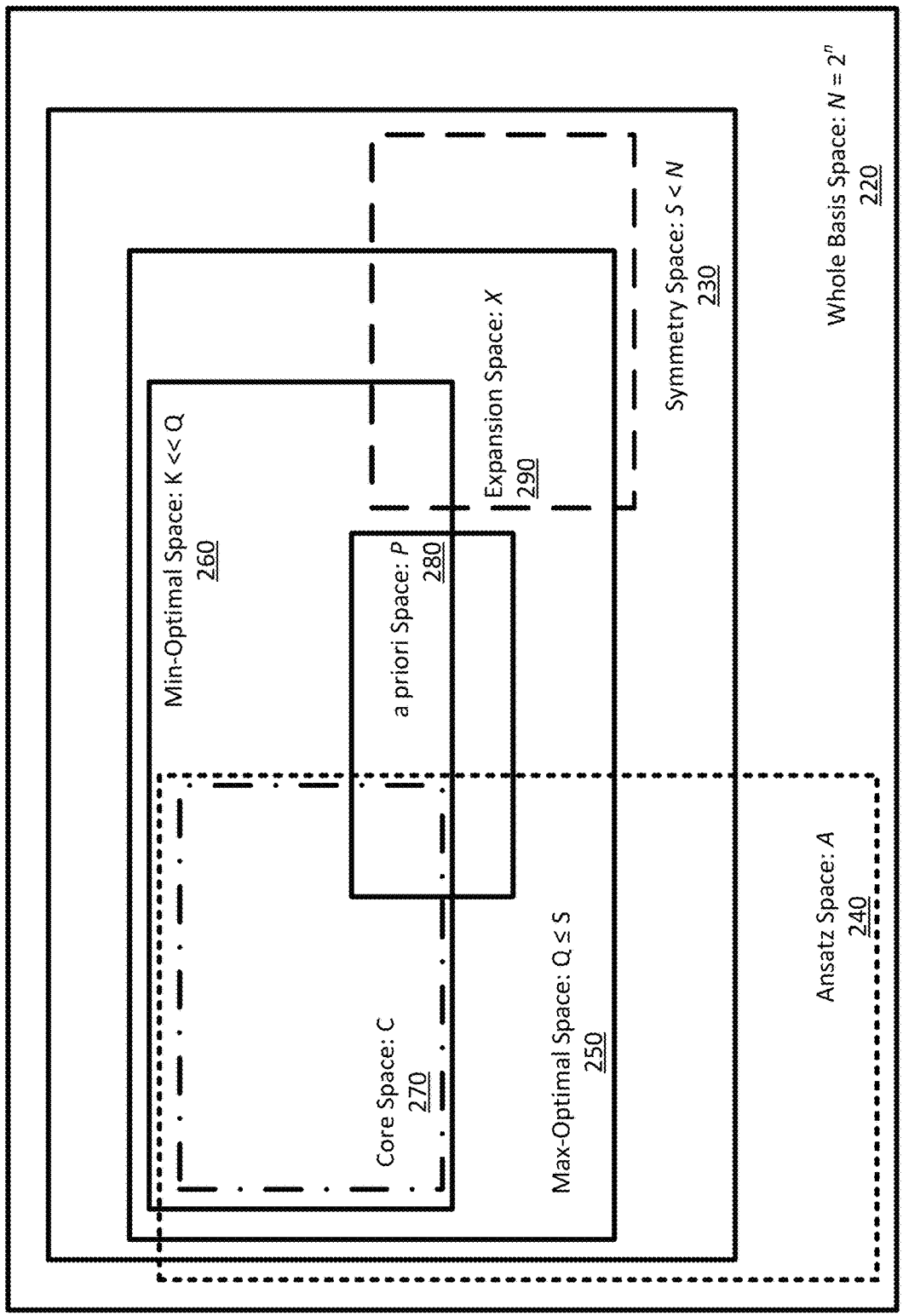

FIGS. 2A-2C provide illustrations of various calculation spaces, according to embodiments of the present disclosure. FIGS. 2A-2B illustrate representations of an electron Hamiltonian for a hydrogen molecule ($H_2$), in which FIG. 2A is a matrix representation of the full Hamiltonian of $H_2$, and FIG. 2B illustrates an example matrix representation of a subspace Hamiltonian of $H_2$. FIG. 2C illustrates various calculation spaces relative to the whole or entire basis space (e.g., from which the full Hamiltonian can be calculated).

Hamiltonian Matrix

A Hamiltonian can be represented with a matrix such that when the quantum computing device uses n qubits on the quantum computer, the dimension of the Hamiltonian matrix can be described as $2^n \times 2^n$. For the $H_2$ molecule which uses 4 qubits, the molecule can be fully represented in a 16×16 Hamiltonian matrix as in shown in FIG. 2A.

Hamiltonian Matrix for $H_2$

The values shown in the matrix of FIG. 2A represent the matrix elements for each of the different basis states, where each position ij in the matrix corresponds to the matrix element of the basis states $b_i$ and $b_j$. As will be apparent, the eigensolution of the full Hamiltonian can be well approximated by a sparse solution; many of the basis states have amplitudes of zero or near-zero, indicating a zero or near-zero contribution to the eigensolution of the full Hamiltonian.

Linear Sum of Pauli Words

As will be appreciated, this matrix can also be represented as a complex linear sum of the Pauli words, which is more memory efficient, as the complexity of the matrix grows exponentially relative to the number of qubits. As one of skill in the art will appreciate, the complex linear sum representation of the full Hamiltonian is what the VQE operates on due to the memory efficiency of this format, despite both encoding the same data, although various black-box representations with an element-wise access protocol may also be used for even further increases in efficiency.

Subspace Hamiltonians

To reduce the computational complexity of the mathematical operations to perform on the full Hamiltonian, a subspace Hamiltonian is created. The subspace Hamiltonian is a reduced matrix whose eigensolution approximates that of the full Hamiltonian, allowing a classical computer to solve for an approximate eigensolution of the full Hamiltonian, a task usually considered intractable on classical devices due to the exponential size of the matrix. Due to the sparse nature of the approximation of the eigensolution of the full Hamiltonian, with many amplitudes of zero or near-zero, the basis states with zero or near-zero amplitudes have a negligible effect on the calculation of the approximate eigensolution of the full Hamiltonian. Accordingly, this subspace Hamiltonian provides a highly accurate approximation of the full Hamiltonian, such that the classically computed energy is also highly accurate, provided that the important basis states (those with non-negligible amplitudes in the eigensolution) are used to construct the subspace Hamiltonian.

Basis State Selection

To create the subspace Hamiltonian, various selection criteria are used to identify values 210*a-d* (generally or collectively, values 210) for constructing the subspace Hamiltonian. By properly selecting the K basis states from among the $2^n$ basis states of the original problem space, the complexity of the mathematical operations to perform on the subspace Hamiltonian may be reduced to such an extent that the quantum computing device 1300 may hand over further calculations to the classical computing device 1200 which originally would have been intractable on the classical computing device without significantly sacrificing accuracy in the end results. The basis states are selected according to selection criteria such as a symmetry criterion (e.g., checking that the number of electrons is conserved), a screening criterion (e.g., values above a given threshold), an overlap criterion (e.g., identifying overlaps of the basis states with other basis states and to identify important groups of basis states); or a randomized selection, and combinations thereof.

Example Subspace Hamiltonian

After the sampling and application of the selection protocol provides the K basis states important for the eigensolution of the full Hamiltonian, a subspace Hamiltonian $\hat{H}'$ of reduced dimension K×K is created from the selected values 210, as shown in FIG. 2B where K=2. The subspace Hamiltonian is constructed from matrix elements in the full Hamiltonian that are selected using the K sampled basis states. The selected values are arranged in a K×K matrix (or represented in a corresponding linear sum of Pauli words or other efficient representation), and may be placed in various orders. As will be appreciated, other subspace Hamiltonians using different selected basis states and different values for K will produce subspace Hamiltonians beyond that provided in the example of FIG. 2B.

Variations in Calculation Spaces

FIG. 2C illustrates various different calculations spaces beyond the one example spaces illustrated in FIGS. 2A-2B. In the pursuit of finding a specific eigensolution of a Hamiltonian, one must conduct a search of the Hilbert space of all possible states the system could occupy. The whole basis space 220 (N) contains all $2^n$ possible basis states that the quantum device can prepare for the system under analysis, and several potential subspaces may be further identified within the whole basis space 220. The symmetry space 230 (S) includes all those basis states that the system can validly occupy, (e.g., based on system properties such as number of electrons and total spin), and excludes those basis states from the whole basis space 220 which are not considered valid for the system under analysis; typically the symmetry space is smaller than the whole basis space (e.g., S<N). The ansatz space 240 (A) contains all those basis states that can be sampled from the state prepared by the ansatz on the quantum device, which excludes basis states from the whole basis space 220 that are not accessible through the state prepared for the trial wave function. Additionally, depending on the structure of the ansatz, the ansatz space 240 may contain basis states not considered valid for the system (for example if the ansatz does not preserve the number of electrons) such that some of the basis states in the ansatz space 240 are outside of the symmetry space 230. Accordingly, in some embodiments, the ansatz space 230 is contained within the symmetry space 230, while in other embodiments, the ansatz space 230 extends beyond the symmetry space 230.

Optimal Basis States

When computing an eigensolution for a Hamiltonian, not all of the basis states provide equal value as inputs to the calculations; some basis states are more important to the accuracy of the end result of the calculations. For example, the max-optimal basis space 250 includes all of the basis states that are relevant to the target eigensolution, while the min-optimal basis space 260 includes the minimum set of basis states from the optimal basis space 250 that are required to achieve the desired level of accuracy in the eigensolution (for example, in a chemical system this would be chemical accuracy; e.g., $1.6 \times 10^{-3}$ Ha). Various subspaces exist with sizes between those of the max-optimal basis space 250 and the min-optimal basis space 260. The a priori space 280 includes all basis states known a priori to be in the max-optimal basis space 250, as may be known from prior analyses of the system under analysis.

Selected Space

As used herein, a core space 270 (C) refers to the set of K basis states selected the selection protocol from the ansatz apace (A). Ideally, the core space 270 would match the min-optimal basis space 260, but constraints imposed by the available computing resources may affect the ability of operators to reach this status for the core space 270. Additionally, when initially considering the problem at hand, one may not know precisely which basis states in the whole basis space 220 belong to the min-optimal space 260, and because there are an exponential number of states in the whole basis space ($2^n$), neither random selection nor brute force selection are feasible methods for identifying the basis states that make up the min-optimal space 260.

Framework Introduction

Accordingly, the present disclosure provides a framework to efficiently obtain the basis states in the min-optimal space 260 (e.g., to optimize selection of the core space 270) via the sequential application of two different mechanisms. The ansatz on the quantum device is used to prepare a state using a subset of the basis states in the whole basis space, the ansatz space 240, which serves as a search area for a given iteration of the framework. Depending on how the ansatz is constructed, the ansatz space 240 may have varying levels of overlap with the min-optimal space 260, and perhaps no overlap at all. Accordingly, through a trial wave function preparation protocol the framework aims to maximize the area of the min-optimal space 260 included in the ansatz space 240 by altering the state prepared on the quantum device.

Application of Selection Protocols

After an iteration of attempted optimization of the overlap between the ansatz space 240 and the min-optimal space 260, a selection protocol is applied to the basis states in the ansatz space 240 to further reduce the search area to the core space 270, which includes only the states in the overlap of the ansatz space 240 and the min-optimal space 260. This reduction in the number of basis states facilitates the application of a classical computer system for finding the eigensolution of the Hamiltonian. In most cases, the ansatz space 240 will contain states not included in the min-optimal space 260, which are filtered out to result in the core space 270. In the ideal case where the trial wave function preparation protocol prepares the perfect sampling state on the quantum device, there will be no reduction in this step as the ansatz space 240 will be equivalent to the min-optimal space 260; however, such a case is unlikely to occur in practice.

Ansatz Space Overlap Goal

By the sampling of the ansatz space 240, the core space 270 is produced, which avoids exponential scaling in choosing the basis states on which to operate. An implication of this sampling is that only basis states which are contained in the ansatz space 240 can form part of the core space 270. If a large portion of the min-optimal space 260 lies outside of the ansatz space 240, the core space 270 may be unrepresentative of the min-optimal space 260, and the ansatz space 240 alone cannot provide these missing basis states. Improving the ansatz space 240 to better overlap with the min-optimal space 260 through the preparation of a quantum state with larger overlap with the target eigensolution is one way to improve the generation of the core space 270. Supplementing the ansatz space 240 with states obtained via some other procedure (e.g., a second ansatz space, an a priori space 280 from an earlier analysis) is also one way to improve the generation of the core space 270.

Use of Basis States Known to be Part of the Min-Optimal Space to Overlap Ansatz Space Additionally, the use of the a priori space 280 assists the trial wave function preparation protocol in creating a representative or well-overlapping ansatz space 240. The states contained in the a priori space 280 are known to be included in the min-optimal space 260, and can be obtained through a variety of preprocessing techniques (such as classical ab initio calculations) or can be obtained from a previous iteration of the described framework. These states can provide a guaranteed non-zero minimum overlap of the ansatz space 240 with the min-optimal space 260, which will aid the trial wave function preparation protocol in preparing a quantum state that yields an ansatz space 240 with even larger overlap with the min-optimal space 260.

Use of Basis States Known to be Part of the Min-Optimal Space to Explore Ansatz Space In addition to using an a priori space 280 to guide the overlap of the ansatz space 240 to include the values in the a priori space 280, the a priori space 280 may be used to aid the trial wave function preparation protocol in preparing a quantum state that yields an ansatz space 240 that does not overlap with the a priori space 280 (or attempts to reduce overlap therewith) to explore different portions of the min-optimal space 260 that are specifically not included in the a priori space 280.

Considerations for Generation of Core Space

The core space 270 is the result of applying a selection protocol to states in the ansatz space 240, and the relevancy of the core space 270 correlates to the efficacy of the selection protocol. The selection protocol is not optimal if the selection protocol either includes states from the ansatz space 240 that are not in the min-optimal space 260 or if the selection protocol excludes states from the ansatz space 240 that are in the min-optimal space 260. In the first case, the efficiency of the classical eigensolver procedure is reduced (potentially to the point of infeasibility on a classical computing system). In the second case, the classical eigensolver procedure is unable achieve the desired accuracy for the eigensolution.

Idealized Selection Protocol

The ideal selection protocol extracts only those states from the ansatz space 240 which are also in the min-optimal space 260, so the level of efficacy required of the selection protocol is directly proportional to the quality of the ansatz space 240 (e.g., the degree to which the ansatz space 240 contains only basis states of the min-optimal space 260). If the ansatz space 240 is equal to the min-optimal space 260, then the selection protocol may simply select all basis states in the ansatz space 240. However, if the ansatz space 240 contains basis states that are not also in the min-optimal space 260, then the selection protocol must be capable of filtering these basis states out from the ansatz space 240 when defining the core space 270 so that only those basis states also in the min-optimal space 260 remain.

Variable Nature of Some Spaces

FIG. 2C illustrates the ansatz space 240, the core space 270, and the expansion space 290 with dashed lines because the relative sizes and locations of these spaces relative to the whole basis space 220 may vary according to different calculation setups. For example, the contents of a first ansatz space 240 may vary from the contents of a second ansatz space 240 within the same whole basis space 220 depending on how the ansatz or trial wave function is generated to represent the whole basis space 220. Similarly, the core space 270, even in the same ansatz space 240 may vary based on how the basis states from the ansatz space 240 are selected.

Expansion of Core Space

In various embodiments, the core space 270 may be expanded via various methodologies by adding an expansion space 290 (X) to the core space 270. For example, two or more core spaces 270 chosen via different selection protocols or from different ansatz spaces 240 may be merged via a union space of the multiple core spaces 270, where one core space 270 acts as an expansion space 290 for the other core space 270. In another example, an a priori space 280 may be used as an expansion space 290. Other expansion spaces 290 may be identified via a Hamming distance (e.g., a Hamming space), an alpha/beta-swapped basis state set, or other spaces or sets of basis states that are within the symmetry space 230 but outside of the current ansatz space 240 that are selected by methodologies known now or developed in the future, and various combinations thereof. The combination of one or more expansion spaces 290 with an initial core space 270 found from an ansatz space 240 may be referred to as an "expanded core space".

Hamming Space Introduction

A Hamming space is defined within the remaining space of the symmetry space 230 (e.g., the portion of the symmetry space 230 that is not overlapped by the ansatz space 240) based on a Hamming distance for each basis state $b_i$ identifying the number of positions at which $b_i$ differs from the Hartree-Fock (HF) or other basis state. For example, the computing system may construct a probability distribution based on the Hamming distances by assigning a weight $w_i$ to each bitstring $b_i$ $$\left(wi = \frac{1}{\text{ham}(\text{HF}, b_i)}\right)$$

and then normalize the weights to obtain the probability $p_{bi}$ of sampling the bitstring $b_i$ $$\left(p_{bi} = \frac{w_i}{\Sigma_i w_i}\right)$$

from which the M basis states of the Hamming space are identified. These M basis states may form an expansion space 290 that is added to the core space 270 as-is, or that are subject to various selection protocols to identify a subset of the M basis states to add to the core space 270.

Alpha/Beta-Swapping Introduction

Each basis state for a chemical system may be represented as a string of bits (e.g., a bitstring) with the values of various bits corresponding to whether an electron is present (1) or not present (0) in a corresponding orbital. For example, the bitstring for a chemical system with two alpha electrons, four alpha orbitals, two beta electrons, and four beta orbitals the chemical system can be represented with an eight-bit bitstring with the first half of the bits in the bitstring correspond to the alpha orbitals and the second half of the bits in the bitstring corresponding to the beta orbitals (e.g., as ααααββββ), although one of skill in the art will appreciate that other representations can be used. Accordingly, a basis state for this system in the core space 270 represented as '11110000' would have alpha-bits of '1111' and beta-bits of '0000', which when alpha/beta swapped would result in the basis state of '00001111' being selected for use in an expansion space 290. These alpha/beta-swapped basis states may form an expansion space 290 that is added to the core space 270 as-is, or that is subject to various selection protocols to identify a subset of the alpha/beta-swapped basis states to add to the core space 270.

Compression of Core Space

In addition to expanding the core space 270, the computing system may compress the core space 270, such as after an expanded space 290 has been added to the core space 270 to preserve a number of basis states (K) that define the core space. This compression may be performed by identifying various basis states that have no impact or minimal impact on the calculated energy for the chemical system to reduce the number of basis states used in the computations of the eigensolutions and various derived values and thereby preserve computing resources, maintain a desired number of states for analysis in a given calculation, and combinations thereof.

Factors for Selecting K Value

Because operators do not have unlimited power to select the value of K for how many basis sates to use in computing an eigensolution, certain factors may be used to select an appropriate K value. These factors include, but not limited to: (1) the probabilities developed for the quantum state being sampled, (2) the available computing resources for the quantum computer, (3) the available computing resources for the classical computer, and (4) a prior value for K in the case that the prior selected value was insufficient for calculating the eigensolutions (e.g., to ensure a larger value to K is selected on a subsequent iteration).

Sampled Values

The first factor for consideration is what the amplitudes of the basis states in the quantum state being prepared are. The amplitudes ($\alpha_i$) of the quantum state, give the probability $|\alpha_i|^2$ of sampling the $i^{th}$ basis state. For example, if an operator intends to sample $K_{desired}$ states, but the number (j) of basis states in the quantum state that have non-negligible probabilities of being sampled is less than $K_{desired}$ (e.g., j<$K_{desired}$), then the highest value for $K_{actual}$ is j or less (e.g., $K_{actual} \leq j$). This could be the case if the hand over from the quantum computer to the classical computer were performed too soon and the amplitudes of the basis states in the quantum state were not qualitatively accurate enough before the state was sampled. In practice, the noise on the quantum computer will likely offset this effect, and allow the sampling of a sufficient number of basis states. This offset does not mean that the algorithm can be terminated earlier on a noisy device though, because there is no reason to believe that the basis states brought about by noise should have non-zero contributions in the final eigensolution.

Available Quantum Computing Resources

The next factor is the quantum computing resources available, which includes the amount of samples that an operator can afford to take when sampling the basis states from the quantum state. Operators have some finite number of attempts in order to sample the basis states (e.g., based on time, processor cycles, time of holding a value in a qubit), and if the operator only samples some number j, where j<$K_{desired}$, of basis states within those samples, the operator will have no choice for the size of j=$K_{actual}$.

Operator Input for K Selection

The above two factors do not necessarily limit the size of $K_{desired}$. For example, an operator can always guess samples that should be non-zero in the final solution, or provide values from external sources (or previous runs of the procedure). However, these two factors do present a hard limit on the number of basis states that can be sampled directly from one quantum state/iteration of the process as the quantum computing device (and access thereto) may only provide a given number of results.

Available Classical Computing Resources

The third factor is the classical computing resources available. These have two restraints: the time and the space (memory) available to the classical computer. The value of K needs to be small enough that the classical computer has the resources required to compute the eigensolution of the subspace Hamiltonian. For example, if all possible basis states were to be used, because classical computing time and space required to find the eigensolution of a Hamiltonian grows exponentially with the problem size, the resources needed by the classical computer could make the calculations practically impossible on the most powerful classical computing systems for even moderately sized chemical systems.

Prior Values for K

The fourth factor provides a counterbalance to pressure of the third factor to choose a lower value for $K_{desired}$ and the desire for more similar subspace Hamiltonians to the full Hamiltonians to choose a higher value for $K_{desired}$. For example, if a value selected for K in an earlier iteration is computationally determined to be too low to create a representative subspace Hamiltonian, the system will ensure that the next iteration does not select the same or a lower value for K. In contrast, if a value selected for K in an earlier iteration remains computationally intractable for the classical computing system, the system will ensure that the next iteration does not select the same or a higher value for K. Accordingly, the hybrid system may initially attempt lower values for $K_{desired}$ in earlier iterations of a handover procedure, but continually increase the value of $K_{desired}$ in subsequent iterations when the evaluation of the produced subspace Hamiltonian is judged to not be representative of the full Hamiltonian. By implementing a rule according to the fourth factor, the hybrid system may gradually adjust the computational load that the classical computing system is assigned until a represented subspace Hamiltonian is produced. As will be appreciated, adjusting the size of the value for K can increase or decrease the number of basis states included in a subspace Hamiltonian compared to earlier iterations; allowing an operator to fine-tune the computational load and accuracy of the solution produced by classical computing system.

Selection Protocols

In addition to the benefits provided by being able to adjust the number of basis states used to create a subspace Hamiltonian across several iterations (e.g., selecting different values for K in different iterations), the present disclosure provides several possibilities for selection protocols to determine which basis states are selected from the full Hamiltonian to be the K basis states in a subspace Hamiltonian. Accordingly, by using a different selection protocol in different iterations, even if the same value for K is selected for use with the same full Hamiltonian, several different subspace Hamiltonians can be generated, which may prioritize different aspects for determining which basis states from the full Hamiltonian represent the K most-significant basis states for analysis.

Methods for Selecting Basis States from Full Hamiltonians to Include in Subspace Hamiltonians FIGS. 3A-3J are flowcharts of selection protocols 300*a*-300*j* (generally or collectively, selection protocol 300) for choosing which basis states from a full Hamiltonian to include in a subspace Hamiltonian and FIGS. 4A-4H provide example graphs 405*a-h* (generally or collectively, graphs 405) of performing certain selection protocols, according to embodiments of the present disclosure. In the graphs 405, nodes 415a-t (generally or collectively, nodes 415) each represent one sampled basis state, and selected nodes 415 are represented by solid circles, while unselected nodes are represented by un-filled circles.

Electron Preserving Selection Protocol

Figure 3A:
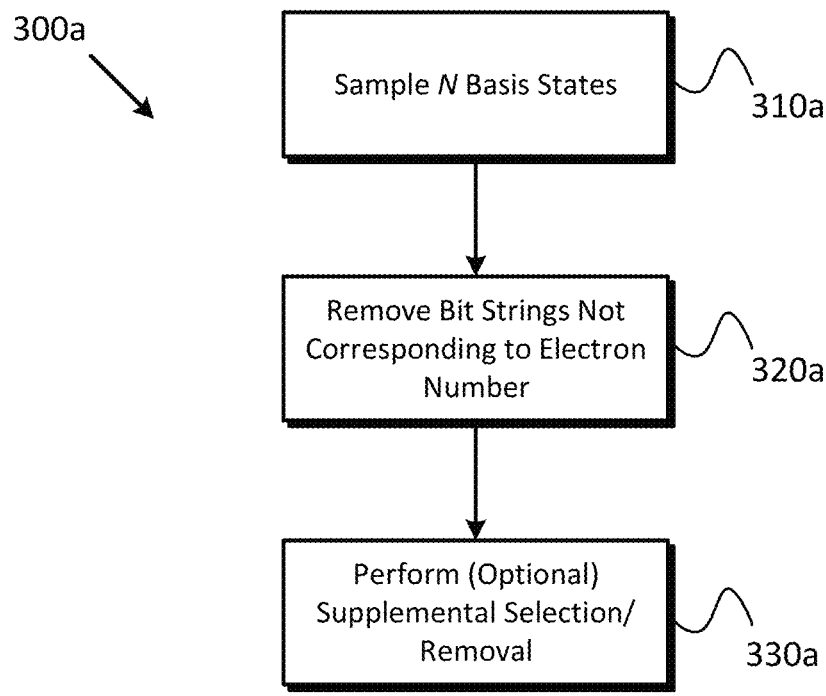
FIGS. 3A-3J are flowcharts of selection protocols for choosing which basis states from a full Hamiltonian to include in a subspace Hamiltonian, according to embodiments of the present disclosure.

FIG. 3A is a flowchart of a method 300a for implementing an electron preserving selection protocol, according to embodiments of the present disclosure. The electron preserving selection protocol selects the K basis states from the N basis states sampled from the quantum device (e.g., as a subset of the available basis states, where K≤N), where the bitstring representing each selected basis state in the set of K contains the same number of 1's as there are electrons being considered in the problem. Stated differently, method 300a applies a symmetry criterion for the selection of sample basis states to include from the full Hamiltonian in the subspace Hamiltonian in which the symmetry criterion is satisfied based on selecting the number of values of the second plurality of values equaling K that are represented by bitstrings having a number of 1's equaling a number of electrons in a chemical system represented by the full Hamiltonian.

Block 310a—Sampling N Basis States from the Quantum Device

At block 310a, the quantum computing system samples a trial wave function to obtain the set of N basis states from among the $2^n$ basis states, with each basis state $b_j$ having a probability $|\alpha_j|^2$ of being sampled.

Block 320a—Removing Bitstrings Not Containing Corresponding Numbers of 1's

At block 320a, the classical computing system removes the basis states from consideration for inclusion in the subspace Hamiltonian that do not have bitstrings that contain a number of 1's that match the number of electrons in the chemical system under analysis. As used herein the number of bitstrings determined to have the same number of 1's as the number of electrons is referred to as $E_{BS}$. For example, in a chemical system with two electrons, the basis state with bitstring '1010' would be selected amongst the N sampled basis states as the number of 1's is equal to the number of electrons; however the basis state with bitstring '0111' would not be selected as that bitstring has three 1's, while there are two electrons in the problem. Each of the bitstrings with the corresponding number of 1's would be available for selection as part of the K selected basis states, and the value for $E_{BS}$ would be six (e.g., 0011, 0101, 0110, 1001, 1010, and 1100 for two electrons). Accordingly, of the sixteen bitstrings (e.g., 0000 to 1111) sampled for an exhaustive sampling of a two electron system, ten would be removed; leaving six for selection as part of K (e.g., $E_{BS}$=6).

Block 330a Supplemental Selection/Removal

At block 330a, basis states for selection in calculating the eigensolution are chosen from the $E_{BS}$ basis states identified as satisfying the selection protocol. When $E_{BS}$=K (or when $E_{BS}$=$K_{remainder}$ from an unfilled portion of K from an earlier selection process), the selection process may conclude. However, when $E_{BS}$>K, a supplemental selection process may be performed to identify a subset of the $E_{BS}$ basis states to reduce the selection to K basis states for use in the subspace Hamiltonian. Similarly, when $E_{BS}$<K, a supplemental selection process may be performed to identify additional basis states to include in the K basis states for use in the subspace Hamiltonian (e.g., $K_{remainder}$=$K_{desired}$−$E_{BS}$). Generally, to ensure that a set of $K_{desired}$ basis states is eventually selected, one or more sets of $K_{supplemental}$ basis states may be selected to add to an initial amount of $K_{selected}$ basis states (where the individual basis states of the $K_{supplemental}$ basis states preferably are not members of the initial $K_{selected}$ basis states) or one or more sets of $K_{removal}$ basis states may be selected from the $K_{selected}$ basis states to remove members from the initial amount of $K_{selected}$ basis states. Once the $K_{desired}$ basis states are determined for construction the subspace Hamiltonian (using one or more selection protocols), the system may then calculate and output the eigensolution using those K basis states.

Alpha-Beta Preserving Selection Protocol

Figure 3B:
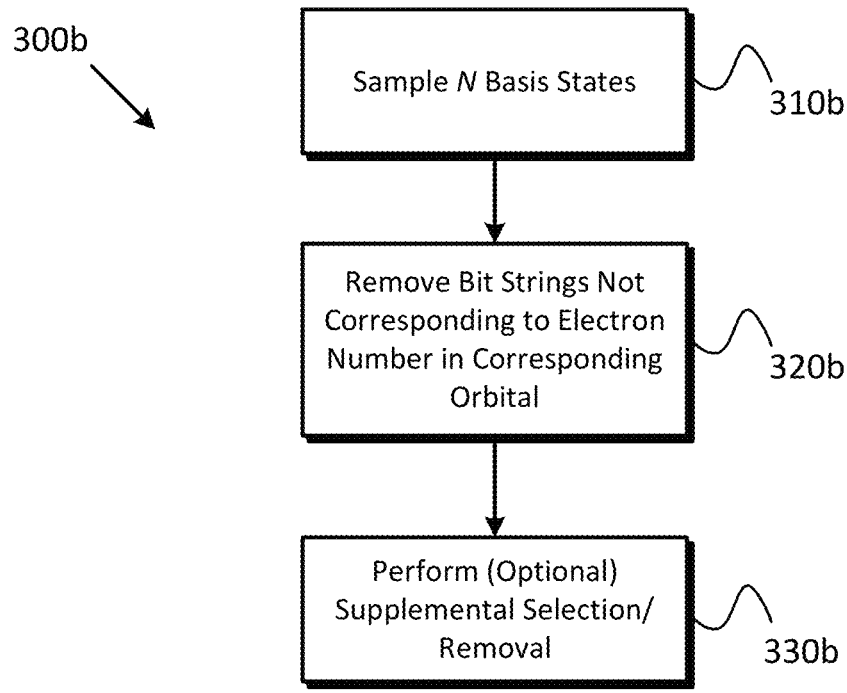

FIG. 3B is a flowchart of a method 300b for implementing an alpha-beta electron preserving selection protocol, according to embodiments of the present disclosure. The alpha-beta preserving selection protocol selects the K basis states from the N basis states sampled from the quantum device (e.g., as a subset of the available basis states, where K≤N), where the bitstring representing each selected basis state in K contains the same number of 1's in the alpha orbital positions as there are alpha electrons in the problem, and the bitstring representing each selected basis state in K contains the same number of 1's in the beta orbital positions as there are beta electrons in the problem. Stated differently, method 300b applies a symmetry criterion for the selection of sample basis states to include from the full Hamiltonian in the subspace Hamiltonian in which the symmetry criterion is satisfied based on selecting the number of values of the second plurality of values equaling K that are represented by bitstrings having a number of 1's in positions corresponding to a given type of orbital equaling a number of electrons in the given type of orbital of a chemical system represented by the full Hamiltonian.

Block 310b—Sampling N Basis States from the Quantum Device

At block 310b, the quantum computing system samples a trial wave function to obtain the set of N basis states from among the $2^n$ basis states, with each basis state $b_j$ having a probability $|\alpha_j|^2$ of being sampled.

Block 320b—Removing Bitstrings Not Containing Corresponding Numbers of 1's in Corresponding Orbitals At block 320b, the classical computing system removes the basis states from consideration for inclusion in the subspace Hamiltonian that do not have bitstrings that contain a number of 1's that match the number of electrons in the positions corresponding to the alpha and beta orbitals in the chemical system under analysis. As used herein, the number of electrons in the alpha orbitals is identified as $E_\alpha$ and the number of electrons in the beta orbitals is identified as $E_\beta$. For example, for a problem with two alpha electrons (e.g., $E_\alpha$=2), 4 alpha orbitals, two beta electrons (e.g., $E_\beta$=2), and 4 beta orbitals the chemical system can be represented with an eight-bit bitstring with the first half of the bits in the bitstring corresponding to the alpha orbitals and the second half of the bits in the bitstring corresponding to the beta orbitals (e.g., as $\alpha\alpha\alpha\alpha\beta\beta\beta\beta$), although one of skill in the art will appreciate that other representations can be used. Continuing the example, the classical computing system would remove any basis state with a bitstring with fewer than two 1's or more than two 1's in either the alpha portion or the beta portion (e.g., 11101100, which has three 1's in the alpha portion and two Is in the beta portion; 10101000, which has two 1's in the alpha portion and one 1 in the beta portion, etc.). In contrast, the classical computing system retains the basis states that have two 1's in each of the alpha and beta portions (e.g., 11001010 and 1011001) for use in the K selected basis states. The total number of basis states that have the bitstrings that satisfy both $E_\alpha$ and $E_\beta$ may be understood as $E_{BS}$.

Block 330b—Supplemental Selection/Removal

At block 330b, basis states for selection in calculating the eigensolution are chosen from the $E_{BS}$ basis states identified as satisfying the selection protocol. When $E_{BS}=K$ (or when $E_{BS}=K_{remainder}$ from an unfilled portion of K from an earlier selection process), the selection process may conclude. However, when $E_{BS}>K$, a supplemental selection process may be performed to identify a subset of the $E_{BS}$ basis states to reduce the selection to K basis states for use in the subspace Hamiltonian. Similarly, when $E_{BS}<K$, a supplemental selection process may be performed to identify additional basis states to include in the K basis states for use in the subspace Hamiltonian (e.g., $K_{remainder}=K_{desired}-E_{BS}$). Once the K basis states are determined for construction of the subspace Hamiltonian (using one or more selection protocols), the system may then calculate and output the eigensolution using those K basis states.

Overlap Partition Selection Protocol with Partition Bias

Figure 3C:
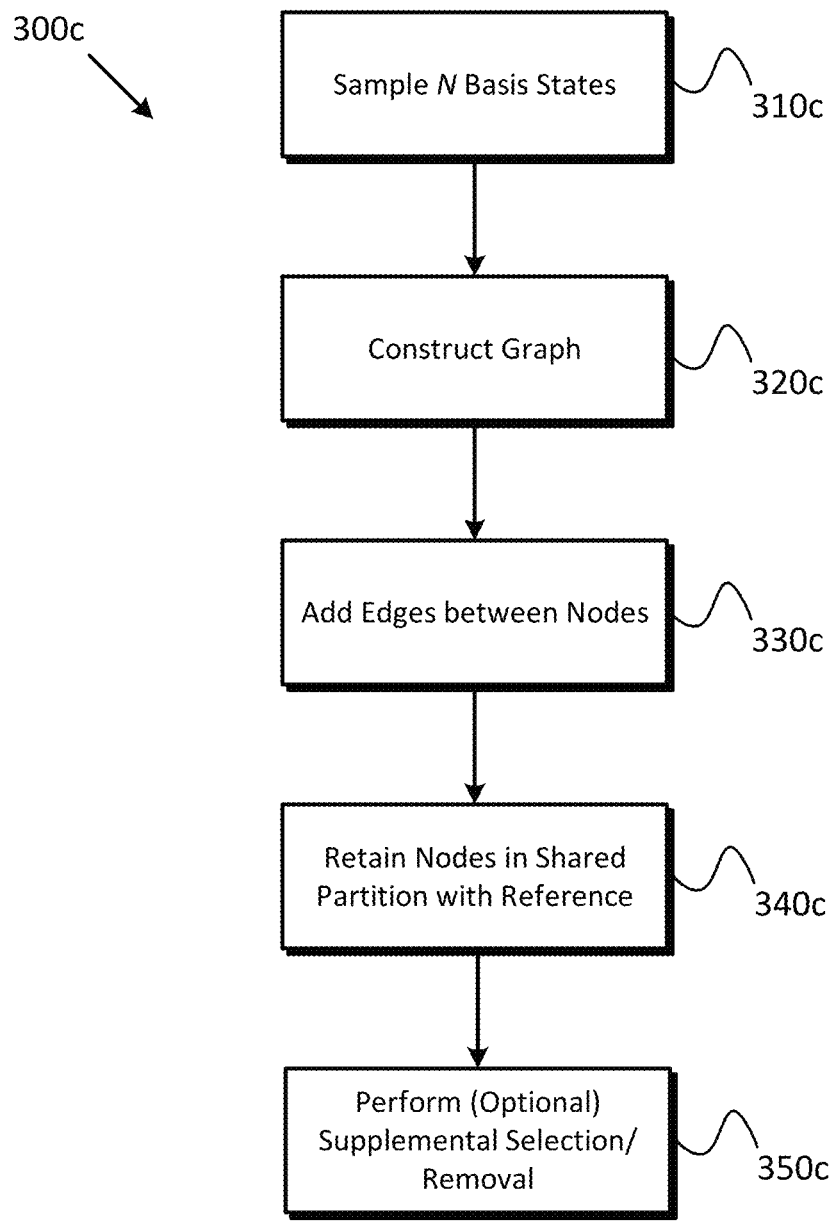

FIG. 3C is a flowchart of a method 300c for implementing an overlap partition selection protocol with a partition bias, according to embodiments of the present disclosure. The overlap partition selection protocol selects from the N basis states sampled from the quantum device a set of K basis states (K≤N), where each selected basis state in K is in the same graph partition as a known reference state. Stated differently, method 300c applies an overlap criterion for the selection of sample basis states to include from the full Hamiltonian in the subspace Hamiltonian in which the overlap criterion is satisfied based on generating a graph of the first plurality of values as a plurality of nodes with edges connecting every pair of nodes for which $\langle b_1|H|b_2 \rangle$ is non-zero; identifying a reference node from the plurality of nodes associated with a known reference state; and selecting all nodes of the plurality of nodes that share a partition in the graph with the reference node.

Block 310c—Sampling N Basis States from the Quantum Device

At block 310c, the quantum computing system samples a trial wave function to obtain the set of N basis states from among the $2^n$ basis states, with each basis state $b_j$ having a probability $|\alpha_j|^2$ of being sampled.

Block 320c—Graph Construction

At block 320c, the classical computing system constructs a graph (such as graph 405a shown in FIG. 4A) by creating a node/vertex for each of the basis states in the set of N basis states sampled from the quantum device. Each basis state then has a corresponding node/vertex in the graph.

Block 330c—Add Edges

At block 330c, the classical computing system adds an edge for every combination of two nodes/vertices in the graph, representing two basis states $|b_1\rangle$ and $|b_2\rangle$, where $\langle b_1|H|b_2 \rangle$ is non-zero. Accordingly, as shown in graph 405a in FIG. 4A, edges are constructed between some of the nodes/vertices, and some sets of nodes/vertices (e.g., a graph partition) may be disconnected from other sets of nodes/vertices (e.g., other graph partitions).

Block 340c—Retain Nodes in Shared Graph Partition with Reference Node

At block 340c, the classical computing system retains the basis states associated with a known reference state in a shared partition of the graph. Any two basis states are in the same partition if and only if their corresponding nodes/vertices are connected to each other by a path. For example, in FIG. 4A, if node 415a is identified as the reference state, the other nodes 415b-1 in the same partition with the node 415a are retained, while nodes 415m-o and 415p-t are removed from consideration. As used herein, the number of basis states retained in the shared partition is denoted as $P_{nodes}$.

Block 350c—Supplemental Selection/Removal

At block 350c, the basis states for selection are chosen from the basis states identified as belonging to the same graph partition as the reference state. When $P_{nodes}=K$ (or when $P_{nodes}=K_{remainder}$ from an unfilled portion of K from an earlier selection process), the selection process may conclude. However, when $P_{nodes}>K$, a supplemental selection process may be performed to identify a subset of the $P_{nodes}$ basis states to reduce the selection to K basis states for use in the subspace Hamiltonian. Similarly, when $P_{nodes}<K$, a supplemental selection process may be performed to identify additional basis states to include in the K basis states for use in the subspace Hamiltonian (e.g., $K_{remainder}=K_{desired}-P_{nodes}$). Once the K basis states are determined for construction of the subspace Hamiltonian (using one or more selection protocols), the system may then calculate and output the eigensolution using those K basis states.

Overlap Partition Selection Protocol with Breadth-First Bias

Figure 3D:
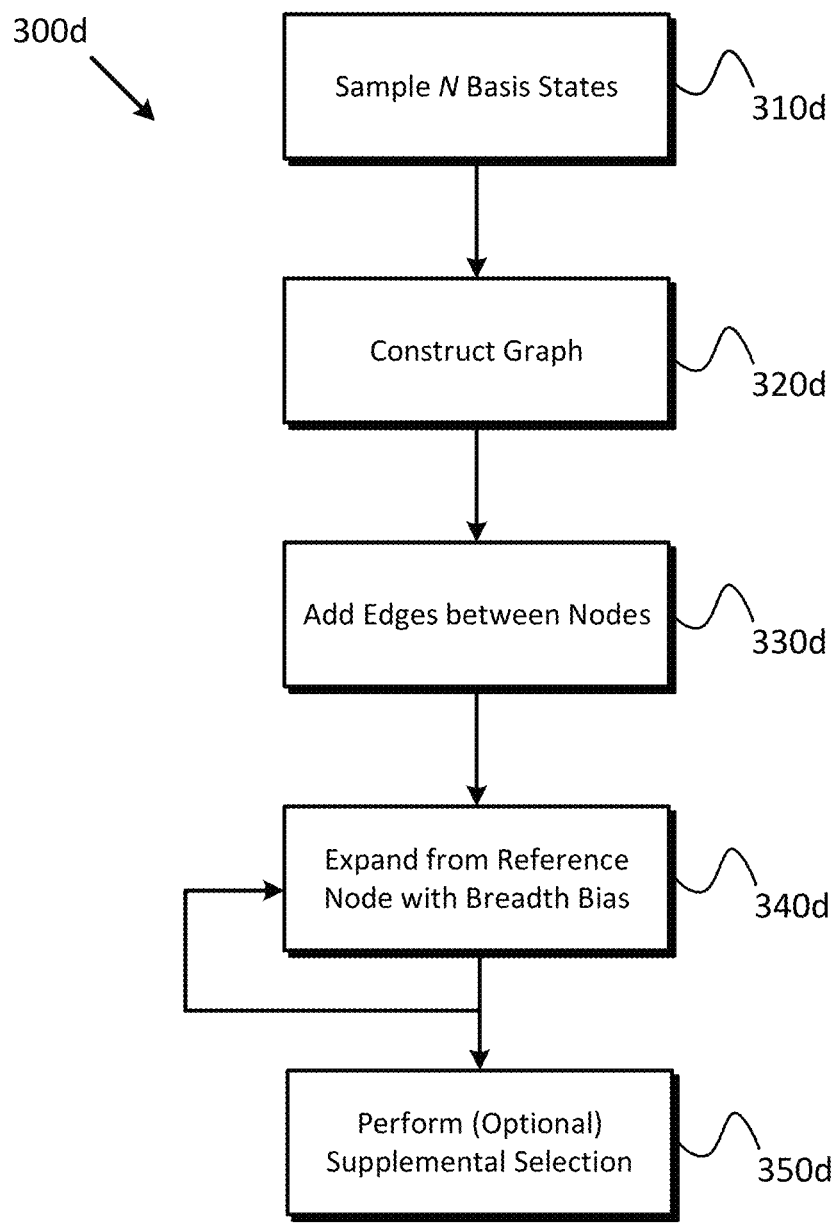

FIG. 3D is a flowchart of a method 300d for implementing an overlap partition selection protocol with breadth-first bias, according to embodiments of the present disclosure. Nodes within a lower number of "hops" (having to traverse a smaller number of edges) from the reference node are given priority for inclusion in the subspace Hamiltonian over nodes further from the reference node or in different partitions. Stated differently, method 300d applies an overlap criterion for the selection of sample basis states to include from the full Hamiltonian in the subspace Hamiltonian in which the overlap criterion is satisfied based on generating a graph of the first plurality of values as a plurality of nodes with edges connecting every pair of nodes for which $\langle b_1|H|b_2 \rangle$ is non-zero; identifying a reference node from the plurality of nodes associated with a known reference state; and selecting all nodes one edge away from the reference node or a previously selected node from the plurality of nodes until all nodes of the plurality of nodes that share a partition with the reference node are selected or at least K nodes from the plurality of nodes are selected, whichever occurs first.

Block 310d—Sampling N Basis States from the Quantum Device

At block 310d, the quantum computing system samples a trial wave function to obtain the set of N basis states from among the $2^n$ basis states, with each basis state $b_j$ having a probability $|\alpha_j|^2$ of being sampled.

Block 320d—Graph Construction

At block 320d, the classical computing system constructs a graph (such as graph 405b shown in FIG. 4B) by creating a node/vertex for each of the basis states in the set of N basis states sampled from the quantum device. Each basis state then has a corresponding node/vertex in the graph.

Block 330d—Add Edges

At block 330d, the classical computing system adds an edge for every combination of two nodes/vertices in the graph, representing two basis states $|b_1\rangle$ and $|b_2\rangle$, where $\langle b_1|H|b_2 \rangle$ is non-zero. Accordingly, as shown in graph 405b in FIG. 4B, edges are constructed between some of the nodes/vertices, and some sets of nodes/vertices (e.g., a graph partition) may be disconnected from other sets of nodes/vertices (e.g., other graph partitions).

Block 340d—Breadth-First Expansion

At block 340d, the classical computing system identifies which of the basis states to retain based on a breadth-first tree expansion starting with the node/vertex of a known reference state. This breadth-first expansion expands from the reference state node/vertex to first include basis states whose node/vertex is connected to the reference state node/vertex in the graph, as is shown in graph 405c in FIG. 4C with the selection of nodes 415b, 415c, and 415i compared to graph 405b in FIG. 4B. Next, basis states whose node/vertex is connected to nodes/vertices that are connected to the reference state node/vertex in the graph are included, such as is shown in graph 405d (e.g., via nodes 415d, 415g, 415j and 415l) in FIG. 4D, and so on. This expansion continues until either the nodes/vertices of K basis states have been included in the selection, or there are no more basis states with nodes/vertices in the graph partition containing the reference state node/vertex to include. As used herein, the number of basis states retained in the partition from the breadth-first expansion is denoted as $P_{nodes}$.

Block 350d—Supplemental Selection

At block 350d, up to K basis states for selection are chosen from the basis states identified as being within a breadth-first expansion from the reference node (e.g., expansion per block 340d may conclude once the nodes for K basis states are identified). When $P_{nodes}=K$ (or when $P_{nodes}=K_{remainder}$ from an unfilled portion of K from an earlier selection process), the selection process may conclude. However, when $P_{nodes}<K$, a supplemental selection process may be performed to identify additional basis states to include in the K basis states for use in the subspace Hamiltonian (e.g., $K_{remainder}=K_{desired}-P_{nodes}$). Once the K basis states are determined for construction of the subspace Hamiltonian (using one or more selection protocols), the system may then calculate and output the eigensolution using those K basis states.

Overlap Partition Selection Protocol with Best-First Bias

Figure 3E:
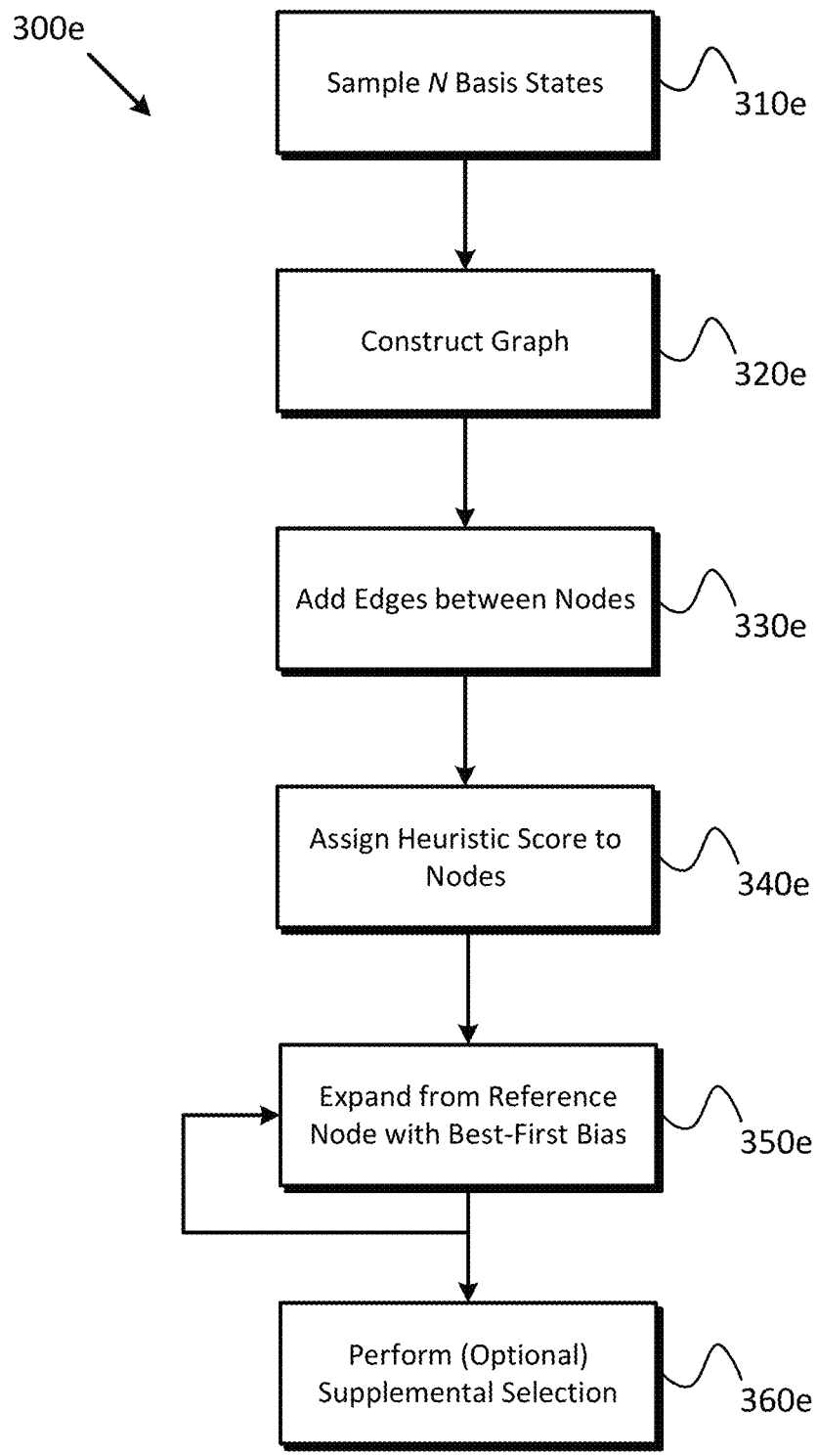

FIG. 3E is a flowchart of a method 300e for implementing an overlap partition selection protocol with best-first bias, according to embodiments of the present disclosure. Stated differently, method 300e applies an overlap criterion for the selection of sample basis states to include from the full Hamiltonian in the subspace Hamiltonian in which the overlap criterion is satisfied based on generating a graph of the first plurality of values as a plurality of nodes with edges connecting every pair of nodes for which $\langle b_1|H|b_2\rangle$ is non-zero; assigning a score to each node of the plurality of nodes based on a heuristic measure of how important a corresponding basis state is; identifying a reference node from the plurality of nodes associated with a known reference state; and selecting a next node one edge away from the reference node or a previously selected node from the plurality of nodes that has the highest score relative to all other nodes of the plurality of nodes that are one edge away from the references node or any previously selected node from the plurality of nodes until all nodes of the plurality of nodes that share a partition with the reference node are selected or at least K nodes from the plurality of nodes are selected, whichever occurs first.

Block 310e—Sampling N Basis States from the Quantum Device

At block 310e, the quantum computing system samples a trial wave function to obtain the set of N basis states from among the $2^n$ basis states, with each basis state $b_j$ having a probability $|\alpha_j|^2$ of being sampled.

Block 320e—Graph Construction

At block 320e, the classical computing system constructs a graph (such as graph 405e shown in FIG. 4E) by creating a node/vertex for each of the basis states in the set of N basis states sampled from the quantum device. Each basis state then has a corresponding node/vertex in the graph.

Block 330e—Add Edges

At block 330e, the classical computing system adds an edge for every combination of two nodes/vertices in the graph, representing two basis states $|b_1\rangle$ and $|b_2\rangle$, where $\langle b_1|H|b_2\rangle$ is non-zero. Accordingly, as shown in graph 405e in FIG. 4E, edges are constructed between some of the nodes/vertices, and some sets of nodes/vertices (e.g., a graph partition) may be disconnected from other sets of nodes/vertices (e.g., other graph partitions).

Block 340e—Assign Heuristic Score

At block 340e, the classical computing system assigns each node in the graph a score based on a heuristic measure, such as how relevant the corresponding basis state is, a relative importance of a given basis state, etc. In various embodiments, the heuristic score is calculated by constructing the overlap of the basis state $b_i$ with the reference node or another currently selected node.

Block 350e—Best-First Expansion

At block 350e, the classical computing system identifies which of the basis states to retain based on a best-first tree expansion starting with the node/vertex of a known reference state. This expansion then selects the next best scoring node/vertex that is allowed to be expanded within the partition to which the reference node belongs to while growing the tree structure. In various embodiments, the score of each unexpanded node is reassigned by the classical computing system after the expansion of the current node. The tree structure grows in this manner until either K nodes/vertices of are expanded into or all of the nodes within the given partition are expanded into. As used herein, the number of basis states retained in the partition from the best-first expansion is denoted as $P_{nodes}$.

Example Best—First Expansion

Figure 4A:
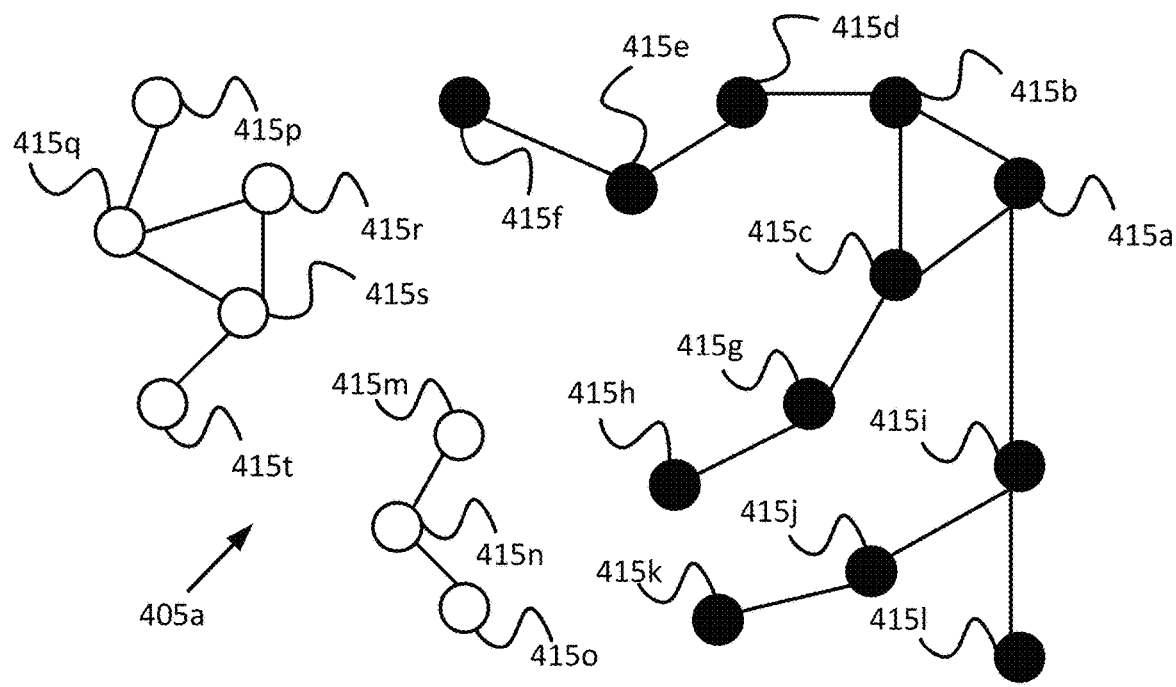
FIGS. 4A-4J illustrate example graphs of performing certain selection protocols, according to embodiments of the present disclosure.
Figure 4B:
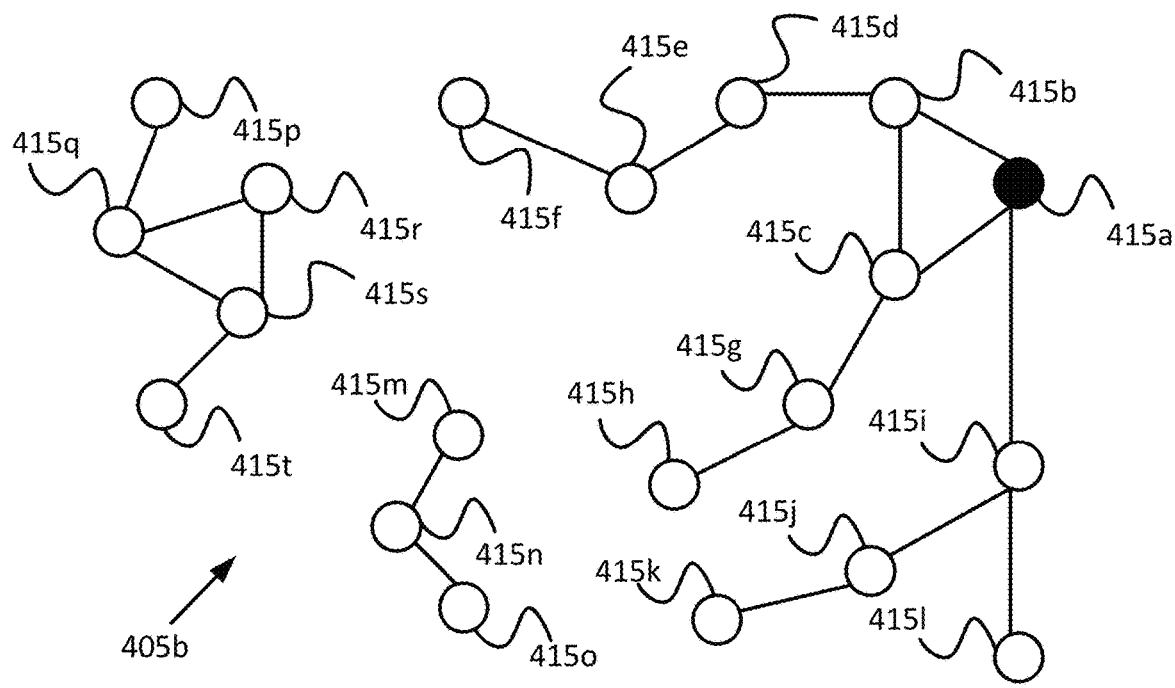
Figure 4C:
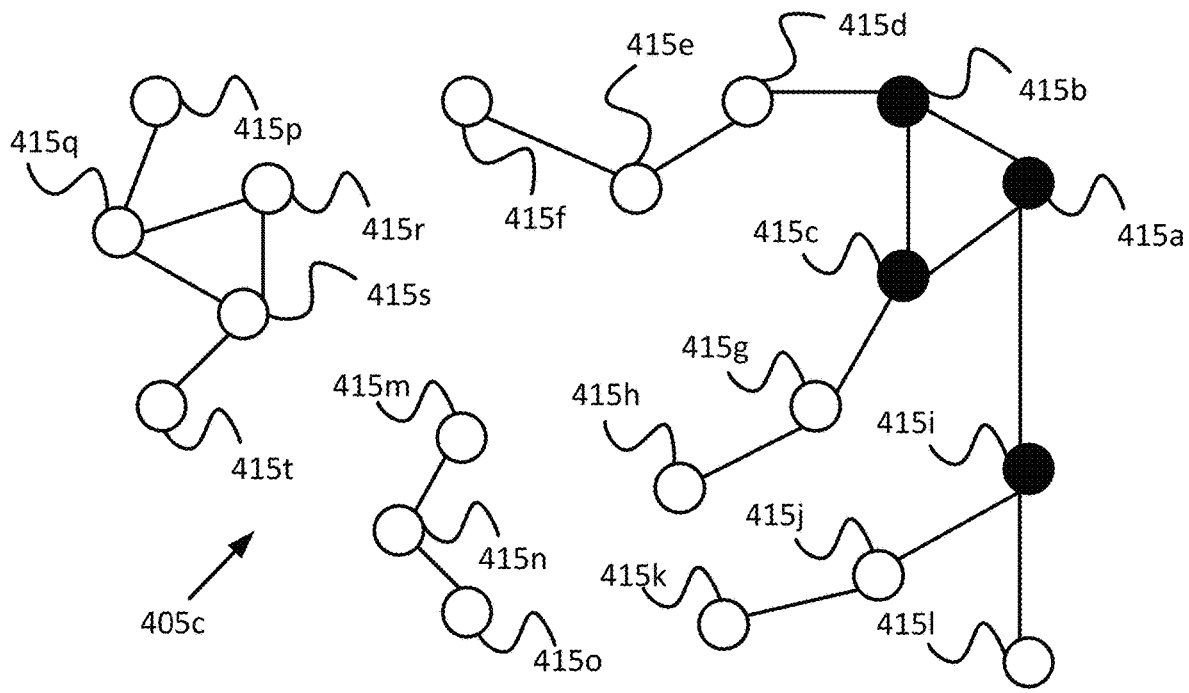
Figure 4D:
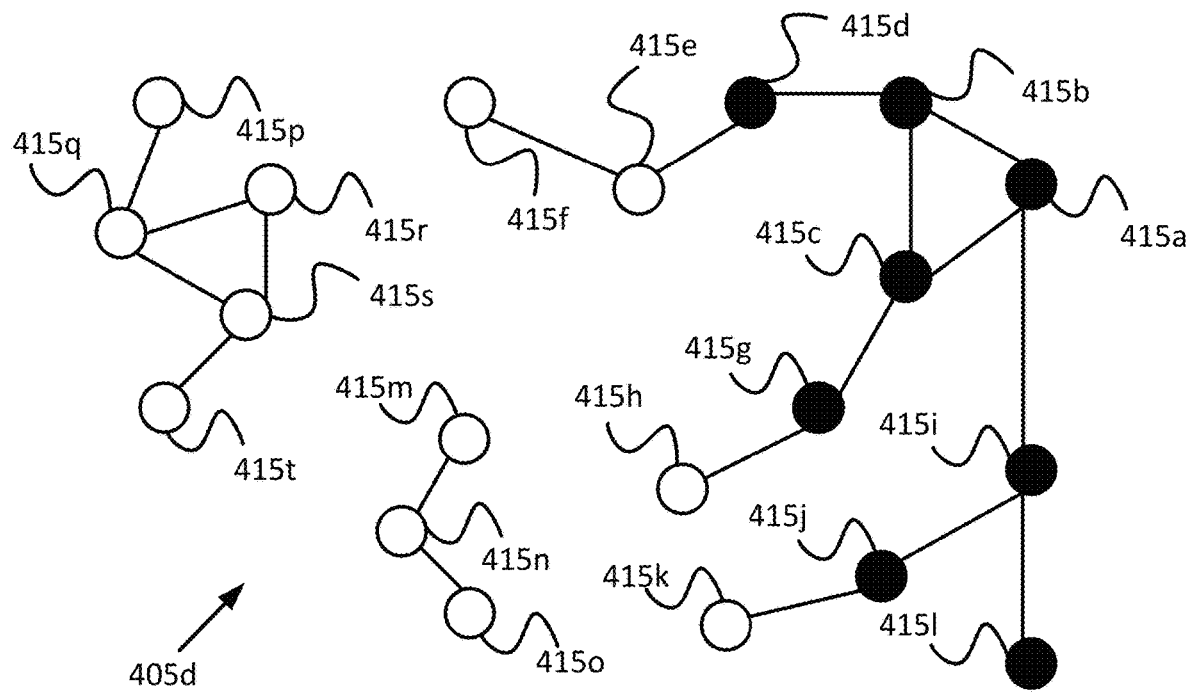
Figure 4E:
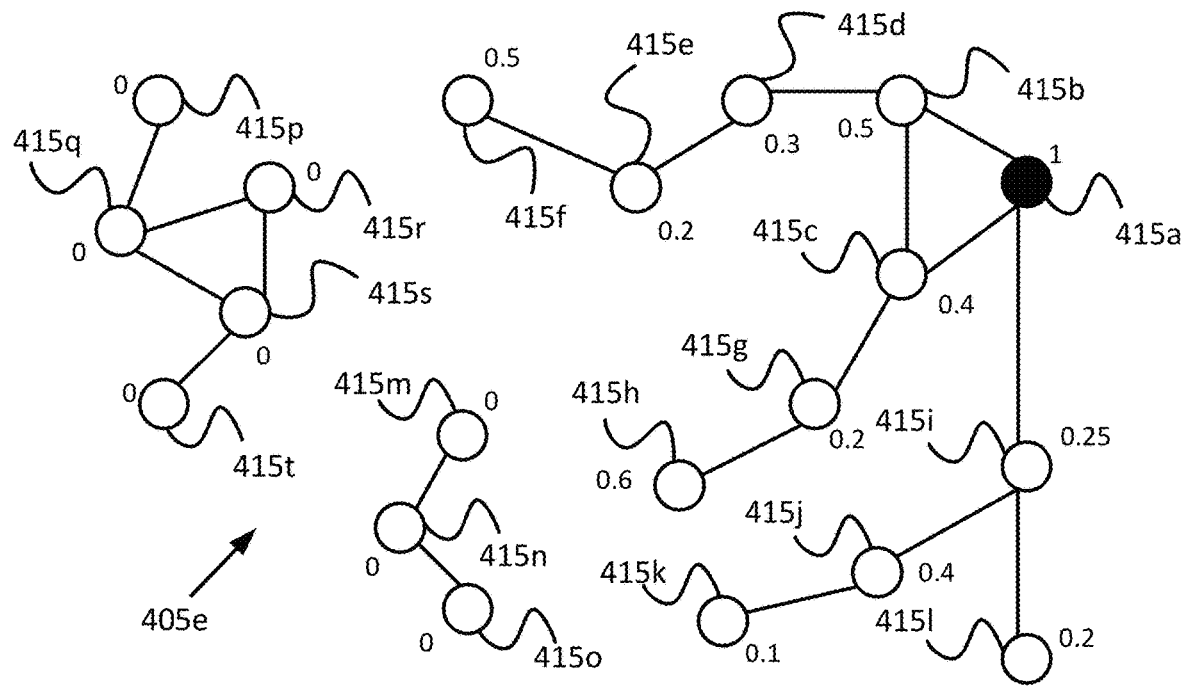
Figure 4F:
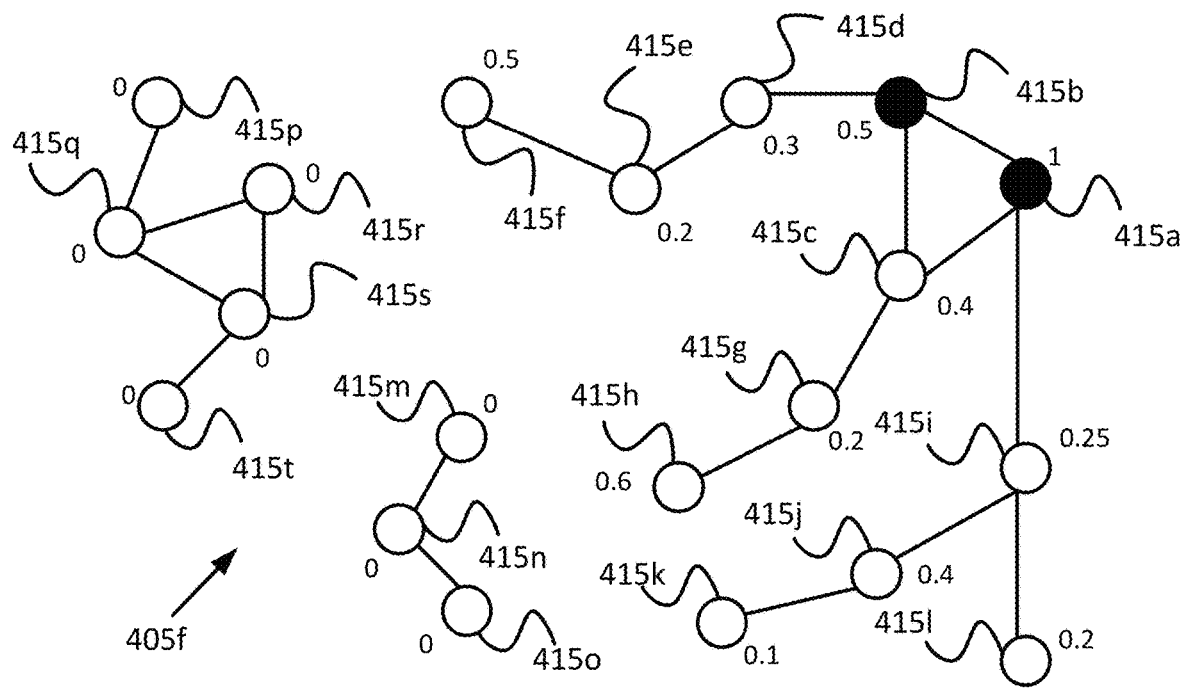
Figure 4G:
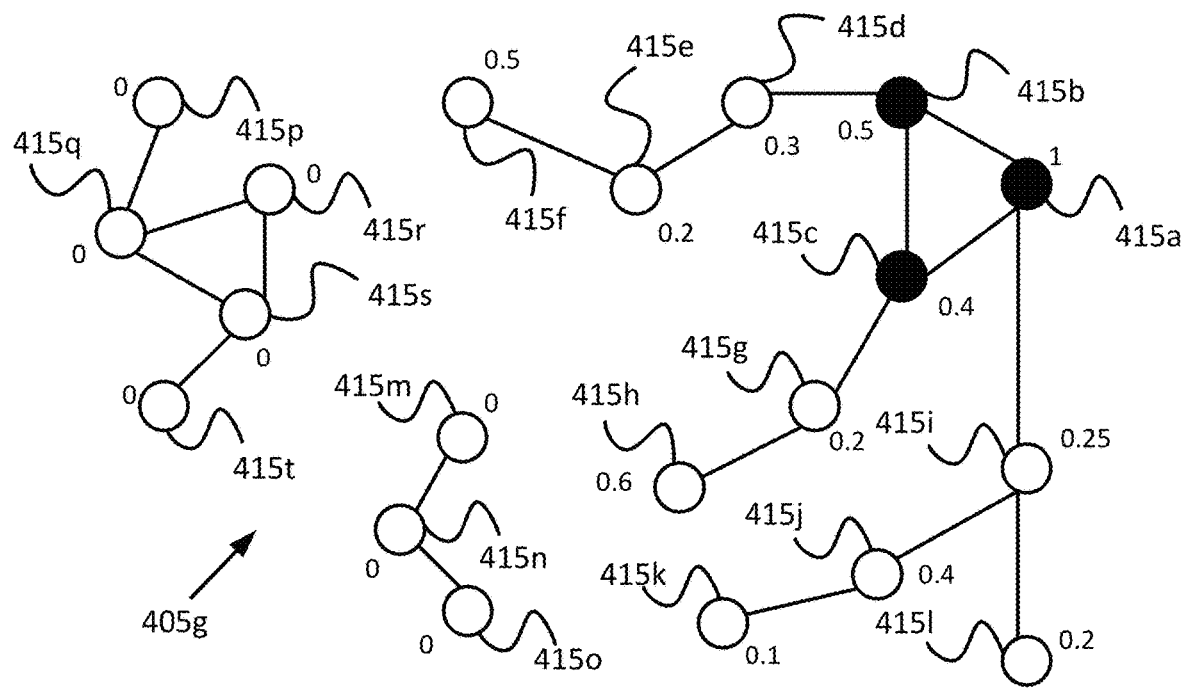
Figure 4H:
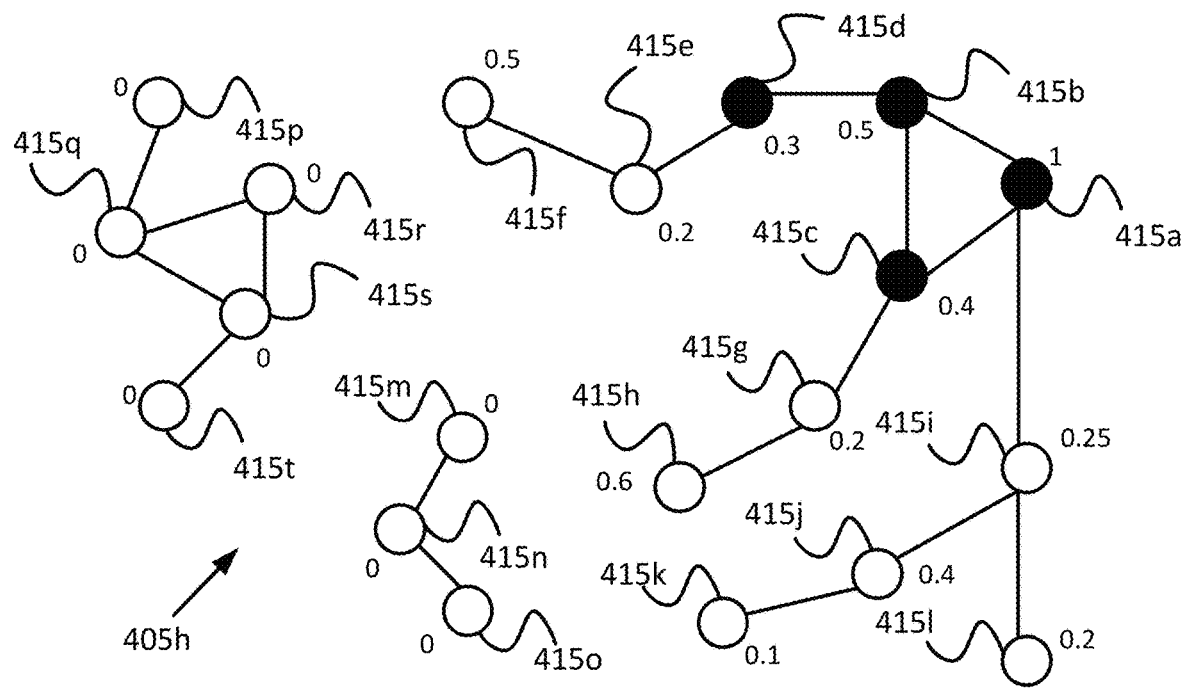

As shown in the graph 405e in FIG. 4E, the initial selection for the basis states to include starts with the reference node 415a. The expansion proceeds to graph 405f in FIG. 4F by selecting the second node 415b based on the second node 415b having the highest score for any node 415 linked via an edge to any of the currently selected nodes (note that node 415h has a higher score than node 415b, but is not selected because node 415h is unconnected by an edge to any currently selected node 415). Expansion may continue as shown in graph 405g and graph 405h by selecting the highest-scoring nodes connected by an edge to one of the currently selected nodes.

Block 360e—Supplemental Selection

At block 360e, up to K basis states for selection are chosen from the basis states identified as being within a best-first expansion from the reference node (e.g., expansion per block 350e may conclude once the nodes for K basis states are identified). When $P_{nodes}=K$ (or when $P_{nodes}=K_{remainder}$ from an unfilled portion of K from an earlier selection process), the selection process may conclude. However, when $P_{nodes}<K$, a supplemental selection process may be performed to identify additional basis states to include in the K basis states for use in the subspace Hamiltonian (e.g., $K_{remainder}=K_{desired}-P_{nodes}$). Once the K basis states are determined for construction of the subspace Hamiltonian (using one or more selection protocols), the system may then calculate and output the eigensolution using those K basis states.

Iterative Contribution-Based Selection Protocol

Figure 3F:
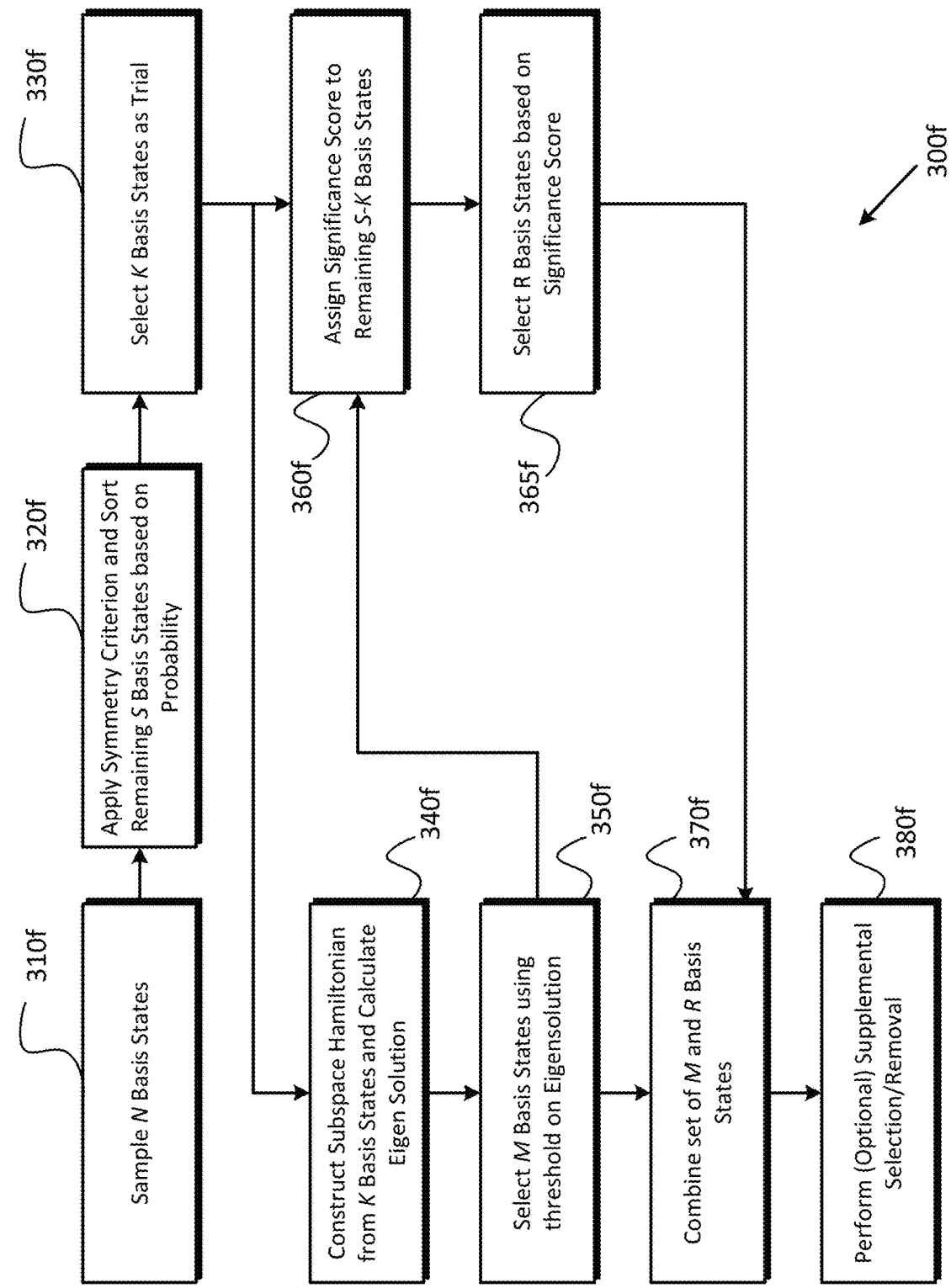

FIG. 3F is a flowchart of a method 300f for implementing an iterative contribution-based selection protocol, according to embodiments of the present disclosure. Stated differently, method 300f applies an iterative contribution-based criterion for selection of sampled basis states to include from the full Hamiltonian in the subspace Hamiltonian in which the iterative contribution-based criterion is satisfied based on applying a symmetry criterion to the set of N sampled basis states to obtain a set of S remaining basis states; sorting the set of S basis states $b_i$ based on their probabilities $|\alpha_i|^2$; making a trial selection of K basis states $b_i$ with the largest probabilities $|\alpha_i|^2$; constructing a subspace Hamiltonian $H_K$ using the selected K basis states and solving for the eigensolution of $H_K$; selecting a subset of M basis states from the trial selection of K basis states based on the amplitudes $\alpha_i$ of each basis state $b_i$ in the eigensolution of $H_K$; assigning a significance score to each basis state $b_i$ from S not included in the trial selection, where the significance score of each basis state is defined as $sig(b_i)=|eig(H_M)-eig(H_{M+b_i})|$; selecting the R basis states not included in the trial selection with the largest significance scores; and combining the selected sets of basis states M and R.

Block 310f—Sampling N Basis States from the Quantum Device

At block 310f, the quantum computing system samples a trial wave function to obtain the set of N basis states from among the $2^n$ basis states, with each basis state $b_i$ having a probability $|\alpha_i|^2$ of being sampled.

Block 320f—Removing Basis States According to Symmetry Criterion and Sorting Basis States At block 320f, the classical computing system removes the basis states from consideration for inclusion in the subspace Hamiltonian that do not satisfy a symmetry criterion, wherein the symmetry criterion comprises removing basis states that do not have bitstrings that contain a number of 1's that match the number of electrons in the chemical system under analysis, or comprises removing basis states that do not have bitstrings that have a number of 1's in positions corresponding to a given type of orbital equaling a number of electrons in the given type of orbital of a chemical system represented by the full Hamiltonian. As used herein the number of basis states that satisfy the symmetry criterion is referred to as S. The classical computer then sorts the basis states $b_i$ in S according to the probability $|\alpha_i|^2$ for each $b_i$.

Block 330f—Trial Selection of K Basis States

At block 330f, the classical computing system makes a trial selection of the K basis states from the S remaining basis states with the highest probabilities $|\alpha_i|^2$.

Block 340f—Calculating Eigensolution of Trial Subspace Hamiltonian

At block 340f, the classical computing system constructs a subspace Hamiltonian $H_K$ with the trial selection of K basis states from S, and solves the eigensolution of the subspace Hamiltonian.

Block 350f—Selection of M Basis States from Trial Selection of K Basis States

At block 350f, the classical computing system selects a subset M of basis states $b_i$ from the trial selection of K basis states (where M<K) based on the amplitudes $\alpha_i$ of each basis state $b_i$ in the eigensolution. Each amplitude $\alpha_i$ indicates how much basis state $b_i$ contributes to the eigensolution. The classical computing system then constructs a subspace Hamiltonian $H_M$ with the M selected basis states.

Block 360f—Construction of Significance Scores for Basis States not in Trial Selection At block 360f, the classical computer assigns a significance score to each basis state $b_i$ in S not included in the trial selection of K basis states at block 330f. The significance score of each basis state $b_i$ gives an indication of how important $b_i$ is to the eigensolution of subspace Hamiltonian $H_K$. In various embodiments this significance score, herein referred to as $sig(b_i)$, is calculated as $sig(b_i)=|eig(H_M)-eig(H_{M+b_i})|$. This score compares the eigensolution of the subspace Hamiltonian $H_M$ with the eigensolution of the subspace Hamiltonian constructed with basis states $M+b_i$, which indicates the effect of including $b_i$ in the selection of basis states.

Block 365f—Selection of R Basis States using Significance Scores

At block 365f, the classical computing system selects from the set of S basis states, the set of R basis states with the R highest significance scores. This selection represents the set of R basis states $b_i$ with the highest observed impact on improving the eigensolution of the subspace Hamiltonian $H_M$.

Block 370f—Combining M Trial Basis States with R Basis States

At block 370f, the classical computing system combines the set of M basis states $b_i$ with largest amplitudes $\alpha_i$ in the eigensolution, with the set of R basis states with largest significance scores $sig(b_i)$. As used herein the number of basis states included in the set M+R is referred to as $E_{BS}$. Accordingly, the classical computing system produces a set of (up to) K basis states that have been evaluated as being significant to the generation of a representative eigensolution for a chemical system.

Block 380f—Supplemental Selection/Removal

At block 380f, up to K basis states for selection are chosen from the $E_{BS}$ basis states identified as being an electron preserving selection. When $E_{BS}=K$ (or when $E_{BS}=K_{remainder}$ from an unfilled portion of K from an earlier selection process), the selection process may conclude. However, when $E_{BS}>K$, a supplemental selection process may be performed to identify a subset of the $E_{BS}$ basis states to remove from the selection to reduce the K basis states for use in the subspace Hamiltonian. Similarly, when $E_{BS}<K$, a supplemental selection process may be performed to identify additional basis states to include in the K basis states for use in the subspace Hamiltonian (e.g., $K_{remainder}=K_{desired}-E_{BS}$). Once the K basis states are determined for construction of the subspace Hamiltonian (using one or more selection protocols), the system may then calculate and output the eigensolution using those K basis states.

Alpha/Beta Swapping Supplementation Protocol

Figure 3G:
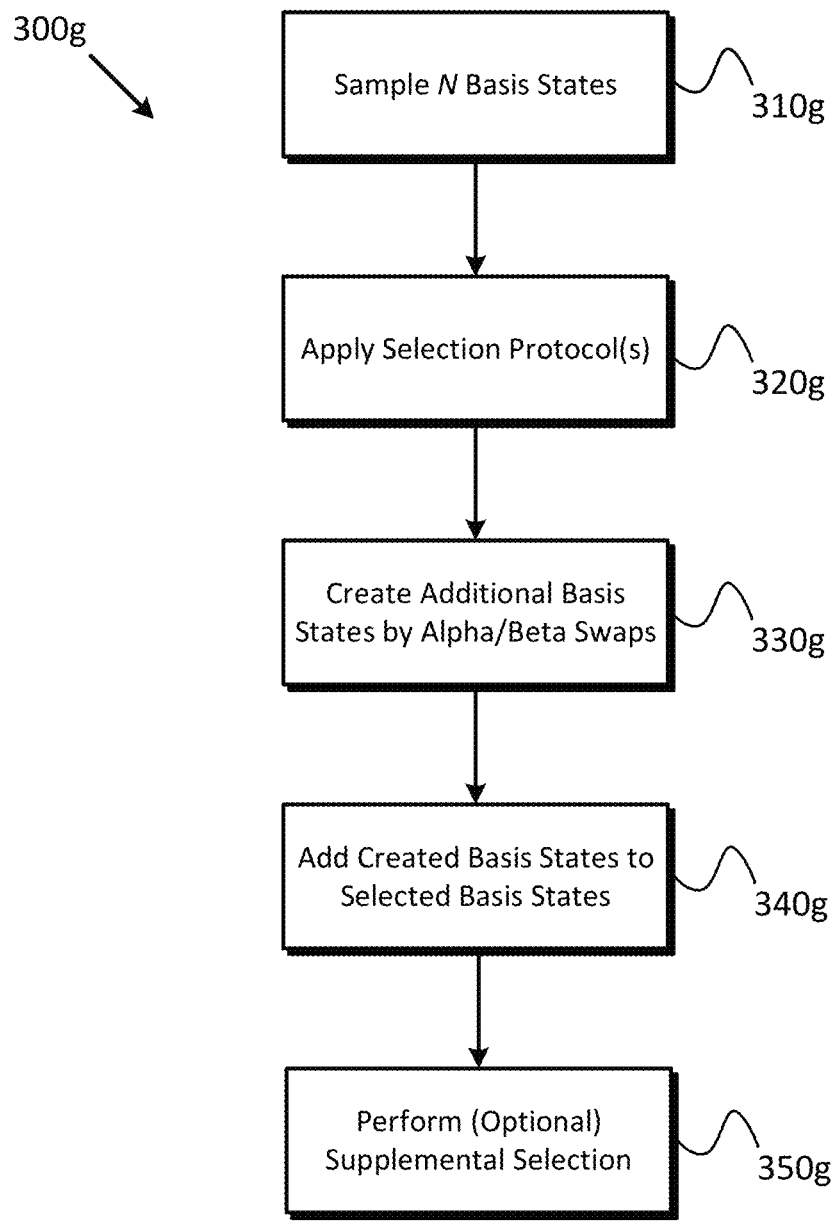
Figure 3H:
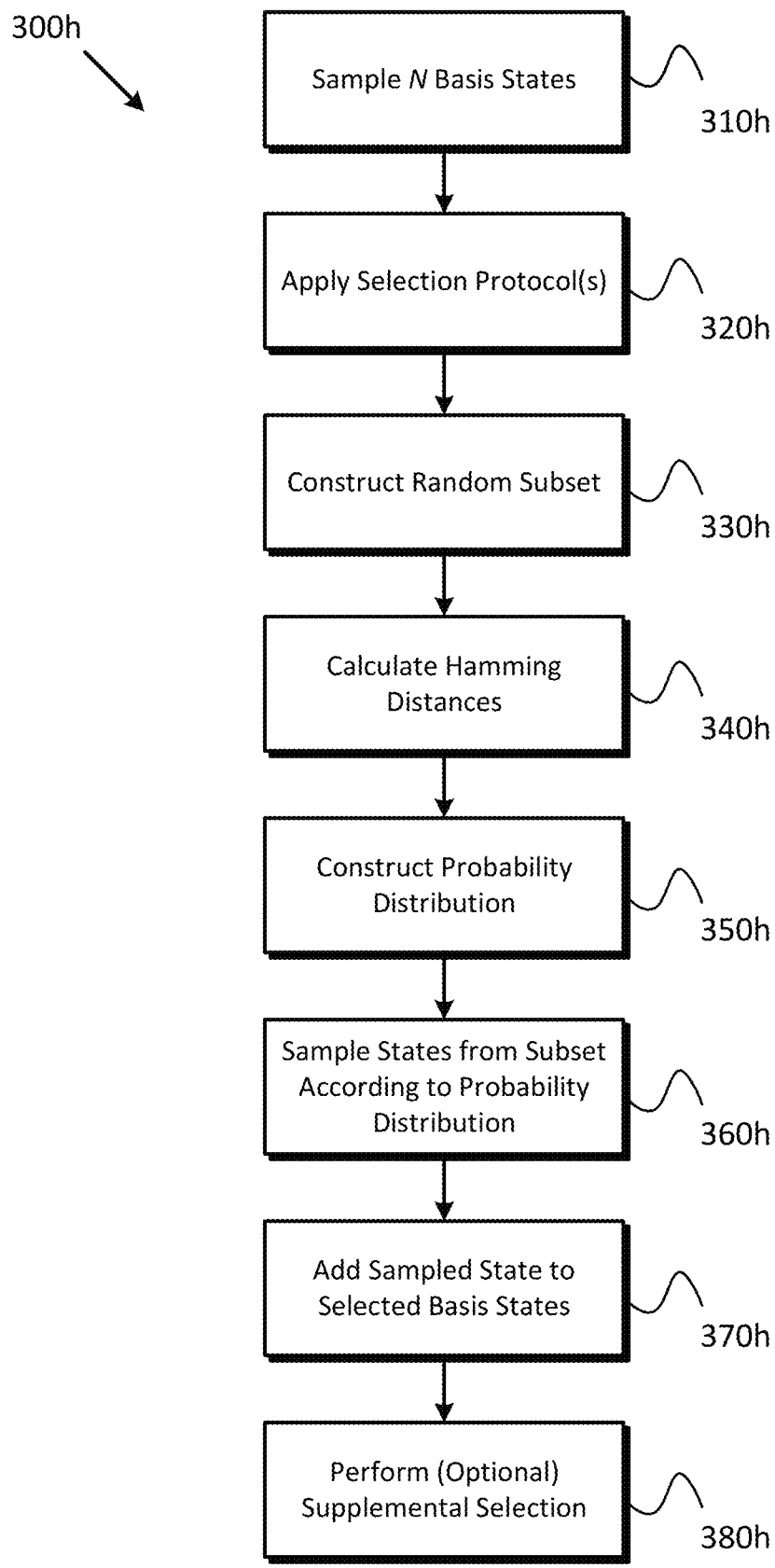

FIG. 3G is a flowchart of a method 300g for implementing an alpha/beta swapping supplementation protocol, according to embodiments of the present disclosure. In method 300g, the basis states selected by the application of a selection protocol, or a sequence of selection protocols, are supplemented using additional basis states from the Symmetry Space. These additional states are constructed by separating the selected basis states into the alpha- and beta-configurations thereof, and then performing a permutation in which the alpha- and beta-configurations are swapped, thereby creating a new basis state. If a basis state with a certain alpha- and beta-configuration is found to be important to the eigensolution, the basis state with the correspondingly swapped alpha- and beta-configuration has often been found to also be important for the eigensolution.

Block 310g—Sampling N Basis States from the Quantum Device

At block 310g, the quantum computing system samples a trial wave function to obtain the set of N basis states from among the $2^n$ basis states, with each basis state $b_j$ having a probability $|\alpha_j|^2$ of being sampled.

Block 320g—Application of Selection Method(s)

At block 320g, the classical computing system applies either a single selection method or a sequence of selection methods to identify a subset $E_{init}$ of the N basis states sampled from the quantum computing system which satisfy the selection protocol(s). This selection of states forms the Core Space, to which the additional states selected by method 300g are appended.

Block 330g—Permute Alpha- and Beta-Configurations to Construct Additional Basis States At block 330g, the classical computing system separates each basis state $b_i$ in $E_{init}$ into its alpha- and beta-configuration as $\alpha_i$ and $\beta_i$, respectively. The classical computing system then performs the permutation of swapping the alpha- and beta-configurations to obtain a new basis state $b_i'$ for each basis state $b_i$ in $E_{init}$. This forms the set $E_{supp}$ containing the basis states $b_i'$.

Block 340g—Add the Constructed Basis States to the Selected Set of Basis States

At block 340g, the classical computing systems combines the basis state selections $E_{init}$ and $E_{supp}$ to form a selection $E_{BS}$ of unique basis states. Through the supplementation of the Core Space $E_{init}$ with $E_{supp}$, the Core Space is expanded to include important basis states that were not obtained through the sampling by the quantum computing system.

Block 350g—Perform (Optional) Supplemental Selection/Removal

At block 350g, up to K basis states for selection are chosen from the basis states identified by the initial selection and further supplementation by the alpha/beta swapping method. When $E_{BS}=K$ (or when $E_{BS}=K_{remainder}$ from an unfilled portion of K from an earlier selection process), the selection process may conclude. However, when $E_{BS}>K$, a supplemental selection process may be performed to identify a subset of the $E_{BS}$ basis states to reduce the selection to K basis states for use in the subspace Hamiltonian. Similarly, when $E_{BS}<K$, a supplemental selection process may be performed to identify additional basis states to include in the K basis states for use in the subspace Hamiltonian (e.g., $K_{remainder}=K_{desired}-E_{BS}$). Once the K basis states are determined for construction of the subspace Hamiltonian (using one or more selection protocols), the system may then calculate and output the eigensolution using those K basis states.

Heuristic Supplementation Protocol

In method 300h, a heuristic is used to guide the selection of additional basis states from the Symmetry Space for inclusion in the Core Space. The heuristic used for each basis state is the hamming distance of the basis state with respect to the Hartree-Fock basis state. The Hartree-Fock basis state is well-known to have a significant contribution to the eigensolution and the importance of a basis state to the eigensolution has been observed to often be inversely proportional to the degree by which the basis state in question differs from the Hartree-Fock basis state.

Block 310h—Sampling N Basis States from the Quantum Device

At block 310h, the quantum computing system samples a trial wave function to obtain the set of N basis states from among the $2^n$ basis states, with each basis state $b_j$ having a probability $|\alpha_j|^2$ of being sampled.

Block 320h—Application of Selection Protocol(s)

At block 320h, the classical computing system applies either a single selection protocol or a sequence of selection protocols, to identify a subset $E_{init}$ of the N basis states sampled from the quantum computing system which satisfy the selection protocol(s). This selection of states forms the Core Space to which the additional states selected by method 300h are appended.

Block 330h—Select a Random Subset of Valid Basis States

At block 330h, the classical computing system selects a random subset $E_{rand}$ of basis states belonging to the Symmetry Space that are not contained in $E_{init}$. The selection $E_{rand}$ forms the domain of the probabilistic sampling in the following operations of method 300h.

Block 340h—Calculate the Hamming Distance for Each Basis State

At block 340h, the classical computing system calculates the hamming distance hi with respect to the Hartree-Fock basis state for each basis state $b_i$ in $E_{rand}$. The hamming distance hi for basis state $b_i$ is the number of positions at which $b_i$ differs from the Hartree-Fock basis state.

Block 350h—Construct Probability Distribution for Sampling

At block 350h, the classical computing system assigns a sampling probability $$p_i = \frac{w_i}{\Sigma_i w_i}$$

for each basis state $b_i$ in $E_{rand}$, where $$w_i = \frac{1}{h_i}.$$

A number of basis states are then sampled from $E_{rand}$ to supplement the selection $E_{init}$, and the sampling probabilities $p_i$ are defined such that the probability of sampling a basis state $b_i$ is directly proportional to its similarity to the Hartree-Fock basis state.

Block 360h—Sample Basis States from the Selected Subset

At block 360h, the classical computing system performs a sampling of basis states from $E_{rand}$ based on the probability distribution formed by the $p_i$'s, forming the set of sampled basis states $E_{supp}$ which supplement the Core Space $E_{init}$ formed in block 320h.

Block 370h—Add the Sampled Basis States to the Selected Set of Basis States

At block 370h, the classical computing systems combines the basis state selections $E_{init}$ and $E_{supp}$ to form a selection $E_{BS}$ of unique basis states. Through the supplementation of the Core Space $E_{init}$ with $E_{supp}$, the Core Space is expanded to include important basis states that were not obtained through the sampling by the quantum computing system.

Block 380h—Perform (Optional) Supplemental Selection

At block 380h, the K basis states for selection are chosen from the basis states identified by the initial selection and further supplementation by the heuristic supplementation method. When $E_{BS}=K$ (or when $E_{BS}=K_{remainder}$ from an unfilled portion of K from an earlier selection process), the selection process may conclude. However, when $E_{BS}>K$, a supplemental selection process may be performed to identify a subset of the $E_{BS}$ basis states to reduce the selection to K basis states for use in the subspace Hamiltonian. Similarly, when $E_{BS}<K$, a supplemental selection process may be performed to identify additional basis states to include in the K basis states for use in the subspace Hamiltonian (e.g., $K_{remainder}=K_{desired}-E_{BS}$). Once the K basis states are determined for construction of the subspace Hamiltonian (using one or more selection protocols), the system may then calculate and output the eigensolution using those K basis states.

Fixed-K-Greatest Selection Protocol

Figure 3I:
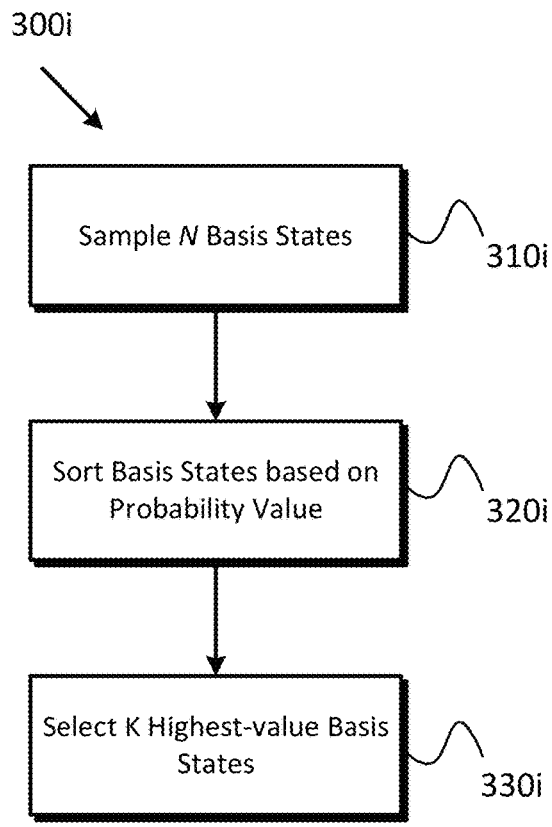

FIG. 3I is a flowchart of a method 300i for implementing a fixed-K-greatest selection protocol, with a fixed value for K in which the K basis states with the highest (or highest absolute) values from the N basis states sampled from the quantum device. In various embodiments, despite the advantages of being able to increase or decrease the size of the value used for K across iterations, having a known fixed value for K offers a simple solution when a known number of basis states are needed. For example, if after performing one or more of the selection protocols set forth herein in which resulted in fewer than $K_{desired}$ basis states being selected, the system determines that a supplemental selection should be performed, and may perform method 300i on a fixed value of K (e.g., $K_{fixe}d$, where $K_{fixed}=K_{desired}-K_{selected}$) to meet the number of basis states to add to the $K_{selected}$ basis states from one or more previous iterations to meet the number of basis states to select for $K_{desired}$. Similarly, if after performing one or more of the selection protocols set forth herein in which resulted in more than $K_{desired}$ basis states being selected, the system determines that a supplemental removal should be performed, and may perform method 300i using a fixed value of K to retain only $K_{desired}$ basis states from the initial selection.

Block 310i—Sampling N Basis States from the Quantum Device

At block 310i, the quantum computing system samples a trial wave function to obtain the set of N basis states from among the $2^n$ basis states, with each basis state $b_j$ having a probability $|\alpha_j|^2$ of being sampled.

Block 320i—Sorting Basis States Based on Probabilities

At block 320i, the classical computing system sorts the basis states $b_j$ sampled per block 310i based on the probability values $|\alpha_j|^2$ thereof, from highest to lowest. In various embodiments, various sorting algorithms may be used (e.g., bubble sort, heap sort, merge sort, tree sort, insertion sort, shell sort, etc.).

Block 330i—Select K Highest-Value Basis States

At block 330i, the classical computing system selects the K basis states sorted as having the K highest values.

Conceptual Illustration of the Fixed-K-Greatest Selection Protocol

Figure 4I:
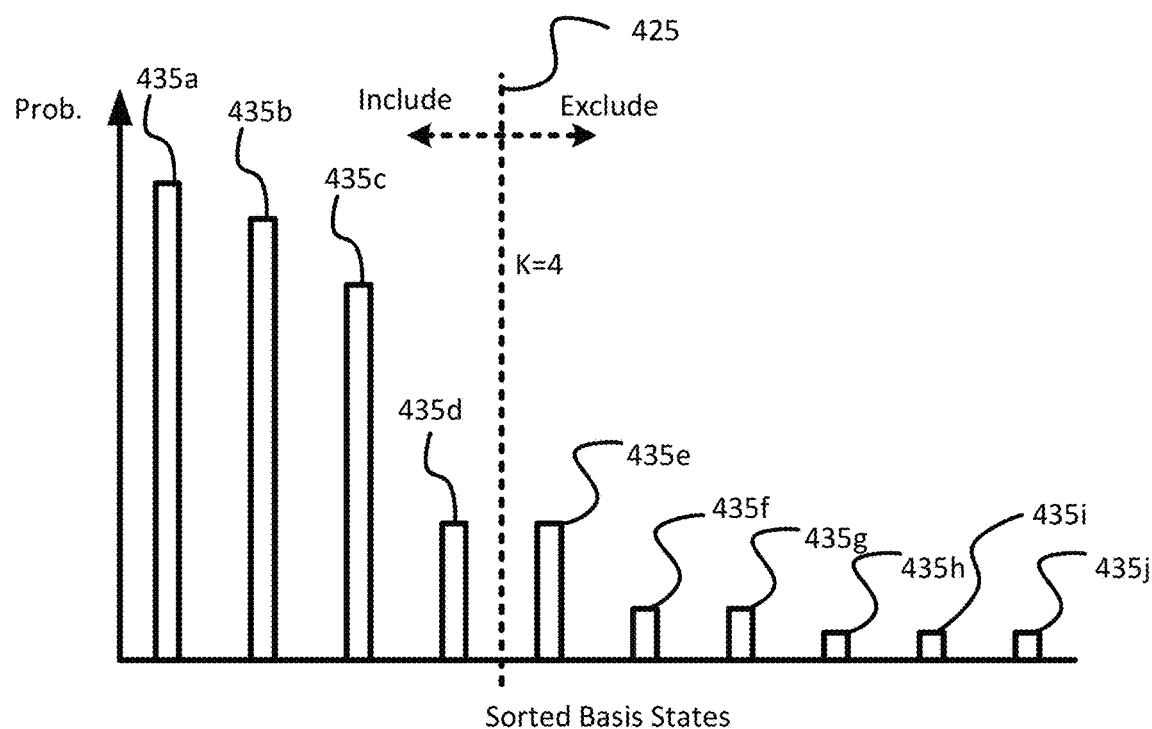

FIG. 4I illustrates an example cutoff for selection of the K basis states from the sorted basis states according to method 300i. In the illustrated example, a cutoff 425 for K is fixed at four (e.g., K=4) so that the four basis states with the greatest samples probabilities are selected, and the other basis states are excluded/omitted. Several basis states 435a-j are illustrated as being sorted with highest to lowest probability with four basis states 435a-d on the included-side of the cutoff 425 and six basis states 435e-j on the excluded-side of the cutoff 425. As will be appreciated, the identities of the basis states 435a-j are given for convenience to the reader and correspond to the sorted probability values for those basis states, which may have no bearing on the position of that basis state in Hamiltonian matrix representation.

Considerations for Use of Fixed-K-Greatest Selection Protocol

As will be appreciated, although convenient for selecting a pre-defined numbed of basis states, the Fixed-K-Greatest Selection Protocol focuses on a single selection criterion; sampling probability. Accordingly, the third basis state 435c may be selected for inclusion over the fifth basis state 435e despite the fifth basis state 435e having greater effect on the accuracy of the calculations than the third basis state 435c according to one or more other selection criteria (e.g., those discussed in relation to methods 300a-f). Similarly, the Fixed-K-Greatest Selection Protocol may also result in basis states with equal values being split between being included or excluded sets (e.g., basis state 435d and basis state 435e) from the included set of basis states. Additionally, sorting algorithms are generally recognized to be computationally intensive and sorting a large number of basis states (e.g., $2^n$) to generate an ordered listing to which a cutoff 425 can be applied may be time and resource intensive.

Threshold-Probability Selection Protocol

Figure 3J:
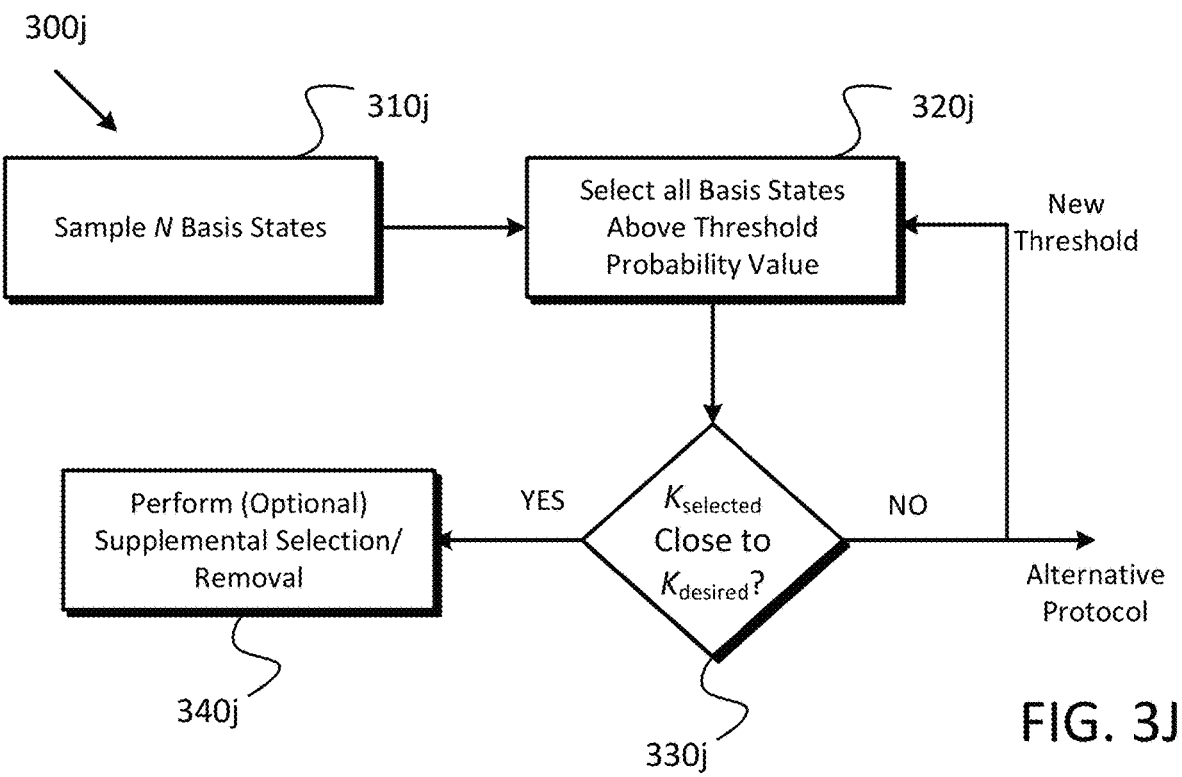

FIG. 3J is a flowchart of a method 300j for implementing a threshold-probability selection protocol, wherein the basis states with the values above a given threshold are selected from the N basis states sampled from the quantum device. In various embodiments, the number of basis states selected may be much greater than or much lower than $K_{desired}$, and various thresholds may be examined until the number of selected basis states is within a desired range of $K_{desired}$ (e.g., $K_{desired}\pm10\%$). Beneficially, the threshold-probability selection protocol, despite operating with an unknown value $K_{selected}$, is computationally simple to perform (e.g., avoiding the need to perform computationally complex sorting algorithms; thereby allowing operation on an unsorted list or pool of basis states), and allows for rapid repetition using various different values for the probability threshold. Accordingly, the threshold-probability selection protocol may be used as an initial selection protocol (with supplementation or omission determinations made by other selection protocols) or may be used as a supplementation or omission protocol for another selection protocol with low computational overhead.

Block 310j—Sampling N Basis States from the Quantum Device

At block 310j, the quantum computing system samples a trial wave function to obtain the set of N basis states from among the $2^n$ basis states, with each basis state $b_j$ having a probability $|\alpha_j|^2$ of being sampled.

Block 320j—Sorting Basis States Based on Probabilities

At block 320j, the classical computing system selects all those basis states sampled per block 310j that have a probability value above a threshold value.

Block 330j—Determine Whether $K_{selected}$ is Close to $K_{Desired}$

At block 330j, the classical computing system determines whether the number of basis states selected per block 320j ($K_{selected}$) is close to the number of basis states desired for selection ($K_{Desired}$). When $K_{selected}$ is within a predefined window of $K_{desired}$, method 300j may proceed to block 340j. When $K_{selected}$ is not within a predefined window of $K_{desired}$, method 300j may return to block 320j to select all the basis states above a different threshold value, or may proceed to another selection protocol.

Block 340j—Supplemental Selection/Removal

At block 340j, the $K_{selected}$ basis states, once close to $K_{desired}$ or after determining that a threshold selection protocol is inapt for reaching $K_{desired}$ in calculating the eigensolution, are supplemented to reach $K_{desired}$. When $K_{selected}$=K desired (or when $K_{selected}$=$K_{remainder}$ from an unfilled portion of K from an earlier selection process), the selection process may conclude. However, when $K_{selected}$>$K_{desired}$, a supplemental selection process may be performed to identify a subset of the $K_{selected}$ basis states to remove from the initial selection $K_{selected}$ of basis states for use in the subspace Hamiltonian to reduce $K_{selected}$ to $K_{desired}$. Similarly, when $K_{selected}$<$K_{desired}$, a supplemental selection process may be performed to identify additional basis states to include in the K basis states for use in the subspace Hamiltonian. Once the K basis states are determined for construction of the subspace Hamiltonian (using one or more selection protocols), the system may then calculate and output the eigensolution using those K basis states.

Conceptual Illustration of the Threshold-Probability Selection Protocol

Figure 4J:
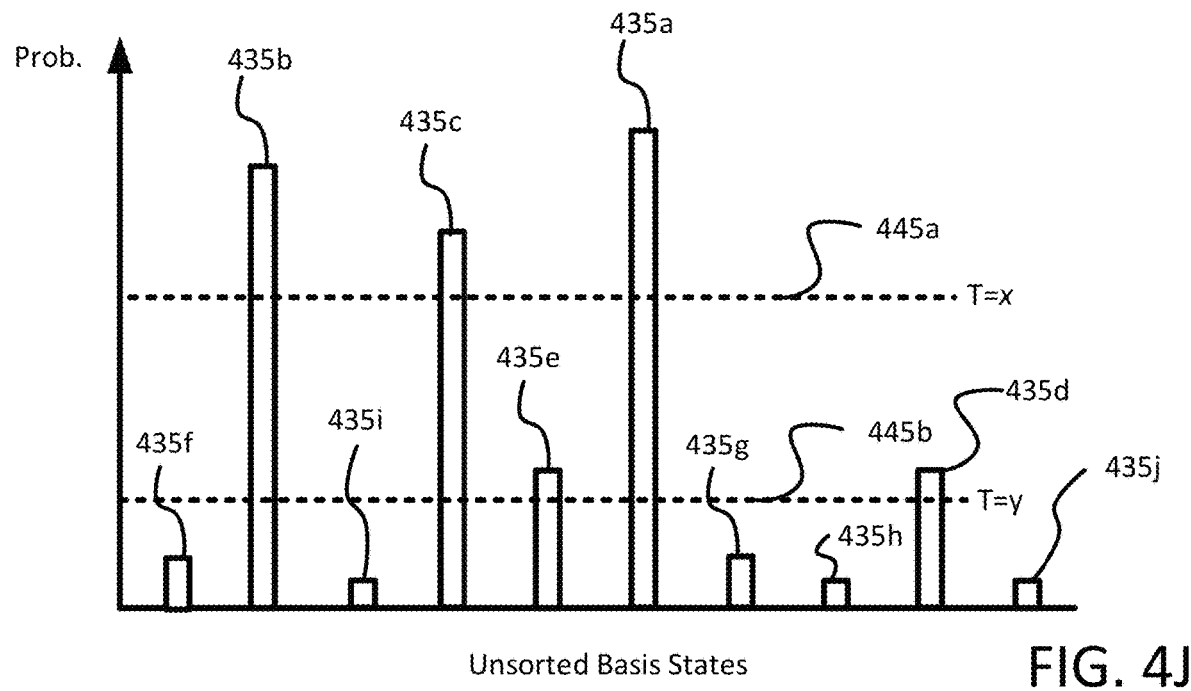

FIG. 4J illustrates examples of thresholds (T) for selection of the K basis states from the unsorted basis states according to method 300j. In the illustrated example, two thresholds 445a, 445b are shown where the first threshold 445a is greater than the second threshold 445b (e.g., x>y). For ease of understanding and comparison to FIG. 4I, the basis states 435a-j (and probabilities thereof) are given identically between FIG. 4I and FIG. 4J. As is illustrated in FIG. 4J, when T=x for the first threshold 445a, three basis states 435a-c are selected, and when T=y for the second threshold 445b, five basis states 435a-e are selected. As will be appreciated, the basis states 435a-j are in a different order in FIG. 4J than in FIG. 4I, thereby permitting the computer systems to omit performing a sorting algorithm to select the basis states.

Threshold Selection

In various embodiments, the value for the threshold may be based on a user-defined value or may be based on a derived value from the sampled basis states, such as a percentile probability value. In some embodiments, basis states with outlier values or those identified for inclusion a priori (e.g., from an earlier selection process) may be excluded from the calculations when deriving a threshold. For example, x in FIG. 4J may correspond to the $60^{th}$ percentile so that the top 40% of the basis states by probability value are selected, while y in FIG. 4J may correspond to the $50^{th}$ percentile so that the half of basis states with the highest probability values are selected. As will be appreciated, the percentile-based threshold may not always select a number of basis states that equal the percentage of the total selected basis states. Continuing the example where x is set to the $60^{th}$ percentile, only 30 percent of the total basis states in FIG. 4J (e.g., three of the ten illustrated basis states 435a-j) have been selected due to there not being four (e.g., 40% of the ten illustrated basis states 435a-j) with probabilities of x, despite x mathematically being equal to the $60^{th}$ percentile.

Additional Selection Processes

As discussed in relation to the electron preserving selection processes (e.g., a symmetry criterion), the overlap partition selection processes (e.g., an overlap criterion), the threshold-based selection processes, etc., various supplemental selections may be made when one selection process results in more or fewer basis state than K. In various embodiments, an operator may re-run the selection process using a different selection criterion, or supplement a first selection criterion with a second selection criterion. In addition to or alternatively to the electron preserving and the overlap partition selection processes, an operator may select basis states for inclusion (or exclusion) in the K selected basis states randomly, via manual selection, or a threshold value for the amplitudes of the basis states (e.g., a screening criterion for values of the amplitudes that are above a given threshold). Additionally or alternatively, the operator may use values selected from a previous iteration of the selection process (or different samplings of values from the trial wave function or different preparations of a trial wave function).

Benefits Provided by Selection

By not just selecting how many basis states to include from the full Hamiltonian in the subspace Hamiltonian (e.g., K), but by also selecting which basis states to include from the full Hamiltonian in the subspace Hamiltonian via one or more selection protocols, an operator can alter how representative the subspace Hamiltonian is of the full Hamiltonian. Accordingly, by being able to alter both the size of the subspace Hamiltonian (via adjusting K) and how the basis states with which to construct the subspace Hamiltonian are selected (via choosing different selection protocols), an operator can readily explore and test out different settings to allow for more efficient or more accurate calculation of an eigensolution. Each of these selections, either for K or the selection protocol, can be performed independently of the other through an iterative process, such as is described in relation to method 500a described with respect to FIG. 5A.

Figure 5A:
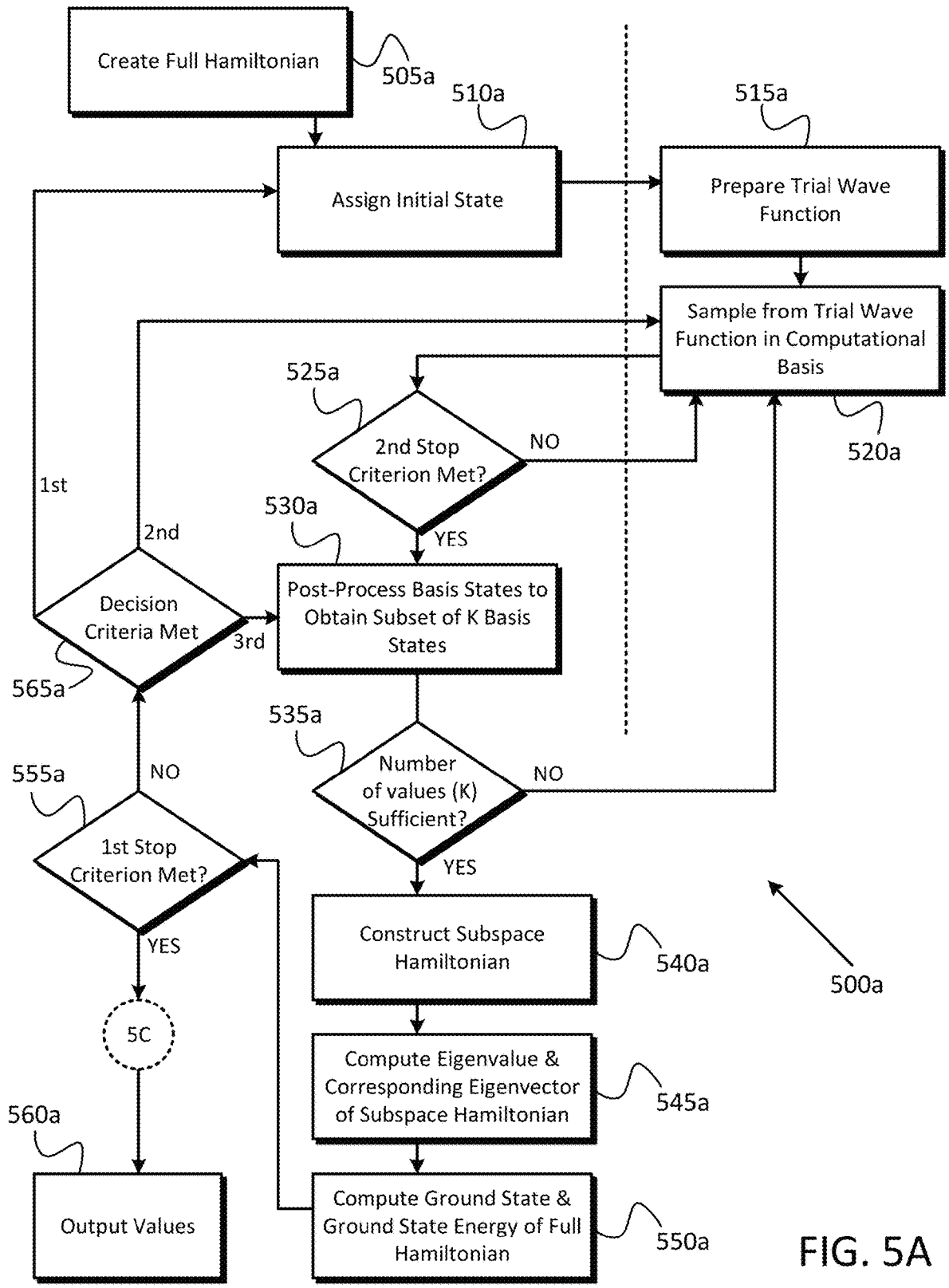
FIGS. 5A-5C are flowcharts of example methods for improving the computational efficiency of a hybrid quantum-classical computing system when determining the eigensolutions of a Hamiltonian, as may be used to represent an element or chemical compound, according to embodiments of the present disclosure.

Method of Determining the Ground State Value and Ground State Energy Per Operation of FIG. 5A FIG. 5A is a flowchart of an example method 500a for determining the ground state value and ground state energy of a Hamiltonian, as may be used to represent a chemical system, according to embodiments of the present disclosure. Method 500a begins at block 505a, where a full Hamiltonian is created to represent the chemical system. Method 500a then proceeds through one or more iterations of blocks 510a-565a to solve, using both quantum and classical computing resources, a subspace Hamiltonian for the chemical system that represents the full Hamiltonian in a classically tractable problem space. Because of the greater availability of classical computing resources compared to quantum computing resources, hand over may be attempted multiple times using various different techniques to render the computations tractable for a classical computer in different iterations and still provide improvements in overall system efficiency compared to determining the ground state value and ground state energy of a full Hamiltonian exclusively via quantum computing.

Streamlined Understanding of Method 500a

Figure 5B:
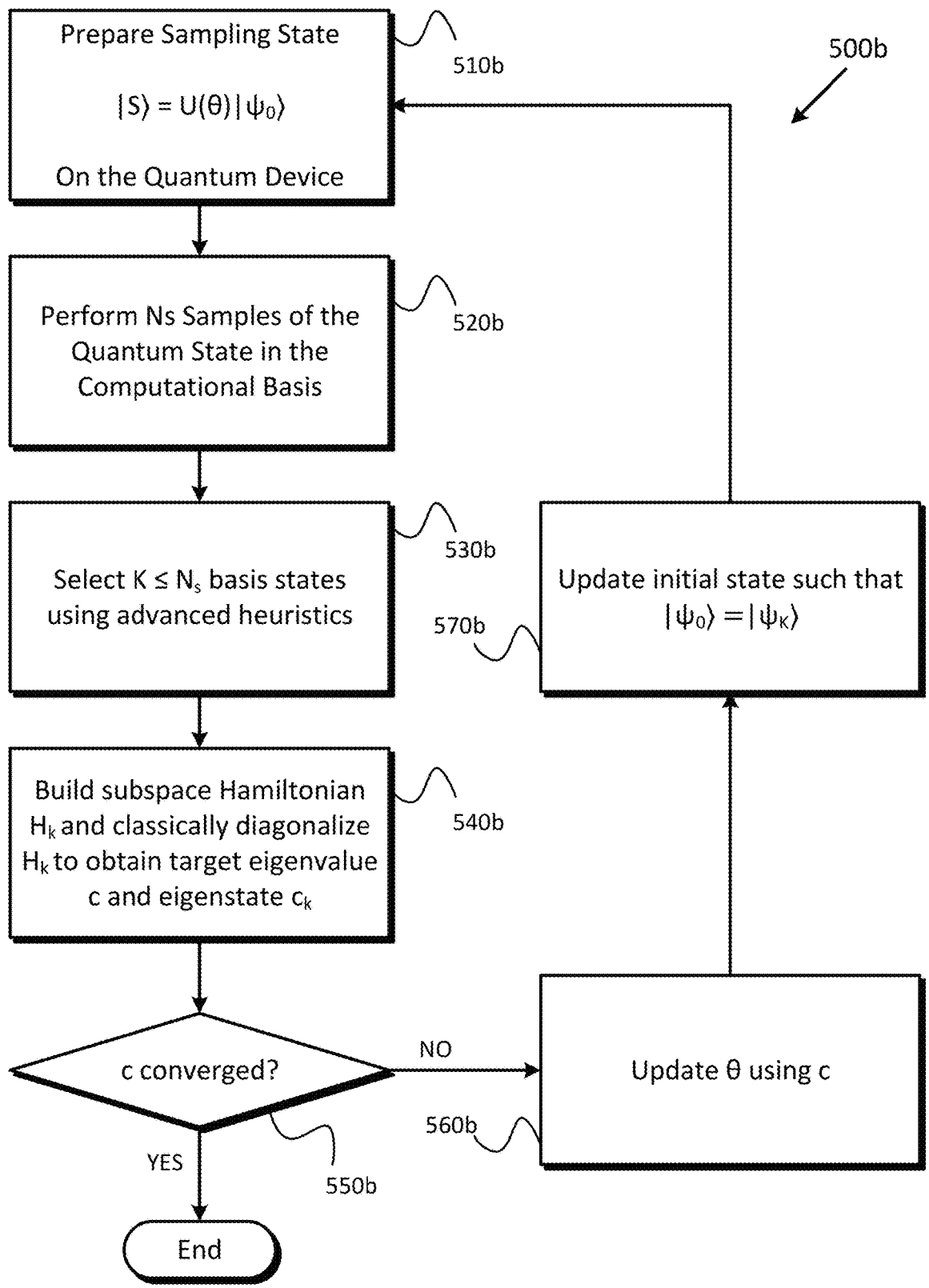

FIG. 5B provides a streamlined or overview understanding of method 500a discussed in relation to FIG. 5A to help improve understanding and to highlight the improvements offered by method 500a over traditional procedures for determining the ground state value and ground state energy of a Hamiltonian. In various embodiments, the advanced heuristics identified in block 530b may include one or more of the selection protocols discussed herein (e.g., as with respect to FIGS. 3A-3J), and the feedback loop from block 550b, block 560b, block 570b, and block 510b (in the event that the eigenvalue has not converged) updates the state of the quantum circuit to perform a subsequent iteration of analysis using an updated wavefunction based on previous analyses.

Description of Method 500b

Generally, as shown in method 500b of FIG. 5B, a sampling state ($|S\rangle = \cup(\theta)|\psi 0\rangle$) is prepared on the quantum device (per block 510b), and Ns samples of the quantum state are performed in the computational basis (per block 520b). From the Ns sampled basis states, K basis states are selected according to various advanced heuristics and selection protocols such as those discussed in relation to FIGS. 3A-3J (per block 530b), where K≤Ns. From the K selected basis states, the classical computing system builds a subspace Hamiltonian $H_K$, and classically diagonalizes the subspace Hamiltonian $H_K$ to obtain a target eigenvalue c and eigenstate $c_K$ (per block 540b). When (per block 550b) the value for the target eigenvalue c converges, the method 500b may end, but otherwise method 500b proceeds to block 560b where the state θ is updated using the latest value for the target eigenvalue c. The classical computer then updates the initial state such that |ψ0⟩ =|ψK⟩ (per block 570b), and method 500b returns to block 510b to prepare a new sampling state based on the new initial state (from block 570b).

Relationship Between Methods 500a, 600, and 700

Figure 6:
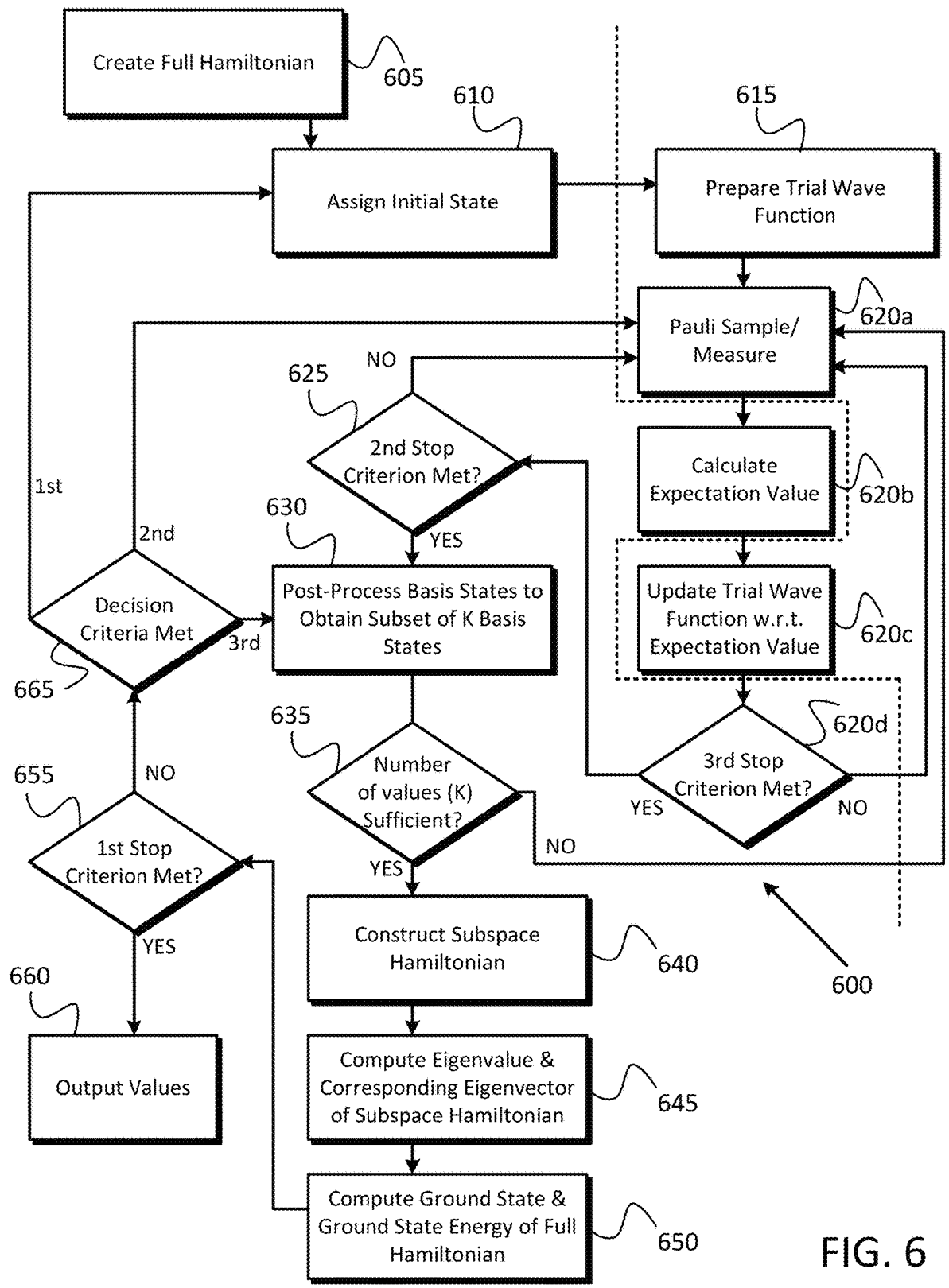
FIG. 6 is a flowchart of an example method for improving the computational efficiency of a hybrid quantum-classical computing system when determining the eigensolutions of a Hamiltonian using a Pauli-sampling or Pauli measurement, as may be used to represent an element or chemical compound, according to embodiments of the present disclosure.
Figure 7:
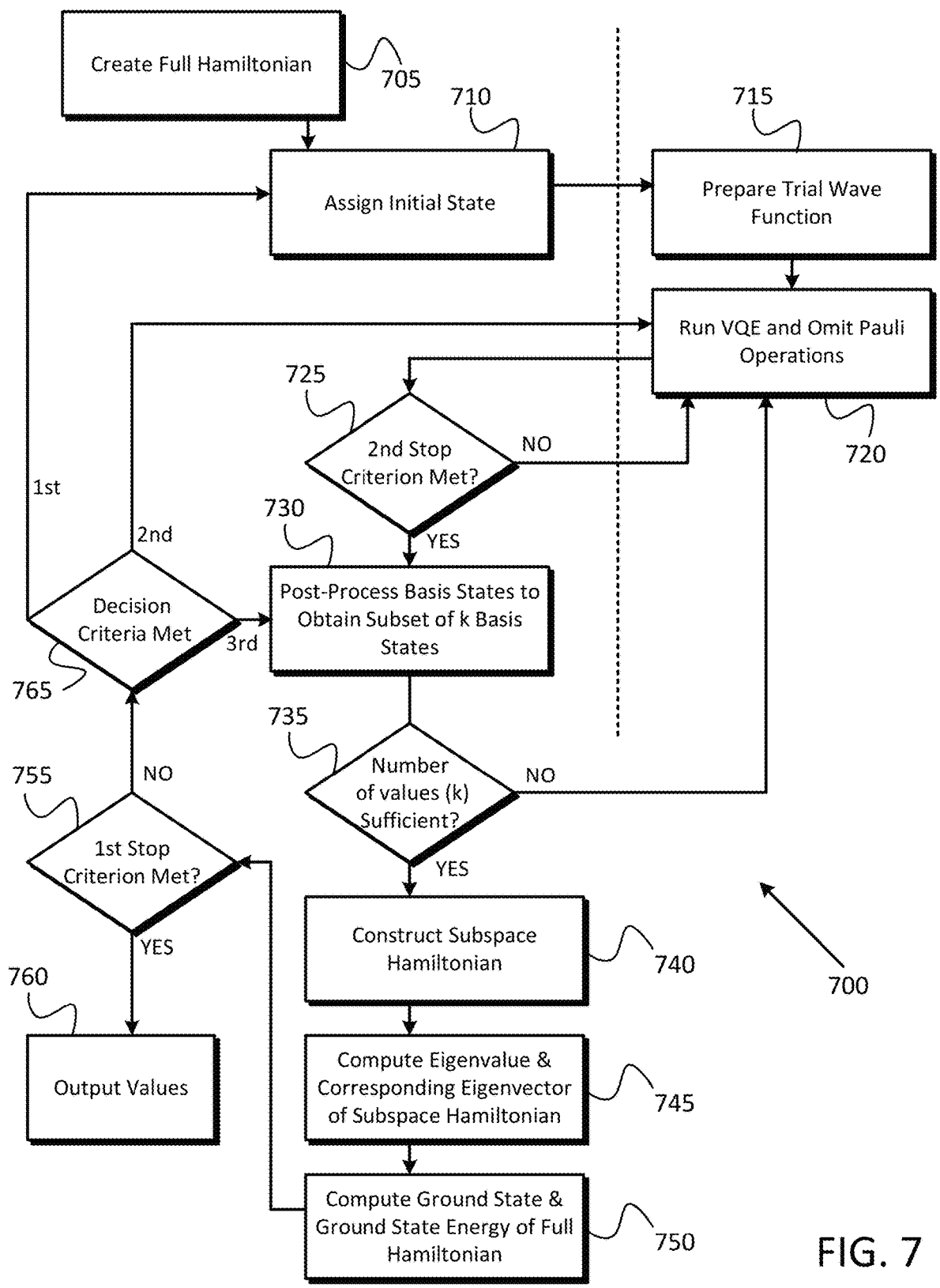
FIG. 7 is a flowchart of an example method for improving the computational efficiency of a hybrid quantum-classical computing system when determining the eigensolutions of a Hamiltonian without using Pauli sampling or Pauli measurement, as may be used to represent an element or chemical compound, according to embodiments of the present disclosure.

Method 600, described in relation to FIG. 6, provides an alternative and additional understanding of method 500a when Pauli sampling or Pauli measurements are used to analyze the Hamiltonian, whereas method 700, described in relation to FIG. 7, provides an alternative and additional understanding of method 500a when Pauli sampling or Pauli measurements are not used to analyze the Hamiltonian. These trial wave functions, and other functional equivalents, may be analyzed as a single parameterized quantum circuit (also referred to as an ansatz), or a plurality/ensemble of parameterized quantum circuits.

Relationship Between Block 520a and Method 600

In some embodiments, the wave function protocol used to generate the trial wave function includes running a variational quantum eigensolver (VQE) via the hybrid quantum-classical computing system for a third plurality of iterations until a third stop criterion is satisfied, wherein each iteration of the third plurality of iterations comprises: constructing, via the classical computing system, a parameterized quantum circuit according to the initial state; generating, via execution of the parameterized quantum circuit on the quantum computing system, a parameterized wave function that approximates the ground state of the full Hamiltonian; performing, via the quantum computing system, a Pauli sampling of the parameterized wave function, produced by the parameterized quantum circuit, with regards to the full Hamiltonian; calculating, via the classical computing system, an expectation value of the parameterized wave function with respect to the full Hamiltonian; and updating a set of parameters of the parameterized quantum circuit according to the expectation value; stopping the third plurality of iterations, on the hybrid quantum-classical computing system, in response to the third stop criterion being satisfied, wherein the parameterized wave function from a last iteration of the third plurality of iterations is output; and wherein the third plurality of iterations is performed prior to the second plurality of iterations. These operations are discussed in greater detail in regard to FIG. 6.

Relationship Between Block 520a and Method 700

In some embodiments, the trial wave function preparation protocol includes constructing, via the classical computing system, a parameterized quantum circuit according to the initial state, generating, via execution of the parameterized quantum circuit on the quantum computing system, a parameterized wave function that approximates the ground state of the full Hamiltonian, without performing a Pauli sampling, and outputting the parameterized wave function. These operations are discussed in greater detail in regard to FIG. 7.

Performed by Hybrid Quantum-Classical Computing System

The operations of FIG. 5A are performed by the hybrid quantum-classical computing system. The classical computing system generally performs the operations that are shown to the left of the dashed line, while the quantum computing system generally performs operations that are shown to the right of the dashed line. As will be appreciated, some operations may be performed by both the classical and quantum computing systems, or involve the transmission of data between the classical and quantum computing systems, which are omitted for ease of understanding. For example, preparing the trial wave function (per block 515a) includes operations performed by both the classical and quantum computing systems, but is generally illustrated as being performed by the quantum computing system.

Block 505—Creating Full Hamiltonian

At block 505a, a full Hamiltonian representing a chemical system is created using the classical computing system. The full Hamiltonian has a Hilbert space with $2^n$ basis states, which represent all possible states that the quantum system can be in. This is in contrast to the subspace Hamiltonian, discussed in detail in regard to block 540a, which includes a subset of the $2^n$ basis states selected to be most representative of the desired properties of the chemical system. Hamiltonians are used to evaluate the energy of the states the chemical system can occupy, and the subspace Hamiltonian offers a computationally simpler platform to evaluate that energy state, which the classical computing system can evaluate, which is in contrast to the full Hamiltonian, which can be too complex for a classical computing system to process in a reasonable timeframe, and therefore uses the quantum computing system to evaluate.

Block 510a—Assigning Initial State

At block 510a, the classical computing system assigns an initial state for the full Hamiltonian for the quantum computing system to begin iteratively analyzing. The initial state represents an initial assignment of the amplitudes for the full set of $2^n$ basis states to begin calculations from. In various embodiments, the classical computing system may use various state preparation protocols for assigning the initial state for the full Hamiltonian. This initial state may include at least one of: a state prepared via a Hartree-Fock protocol, a zero state, a computational basis state of the Hilbert space, a state prepared via an ab-initio initial state preparation protocol (e.g., a Density Functional Theory (DFT), Configuration Interaction (CI), Coupled Cluster (CC), Møller-Plesset Perturbation theory (MPn), etc.), a state prepared via a tensor-network initial state preparation protocol (e.g., optimizing a tensor network and mapping the resulting state to a quantum circuit to obtain a quantum state), a sparse initial state from an eigensolution from a final iteration of a previous set of iterative analyses by the hybrid computing system (e.g., a final iteration of a previous plurality of iterations for use in a subsequent plurality of iterations), a uniformly distributed state, and a randomly distributed state. The present disclosure contemplates that different protocols may be used when performing subsequent iterations by the quantum computing system on the same chemical system.

Iterations of First Loop from Block 510a to Block 510a

The iterations of the evaluation based on the initial state (and adjustments made thereto) are performed on the hybrid quantum-classical computing system, using the classical computing system and the quantum computing system for distinct calculations. This evaluation is performed by running a first plurality of iterations (e.g., as a loop) on the hybrid quantum-classical computing system, until a first stop criterion is satisfied, as is discussed in relation to block 555a, and may include various sub-loops for different analyses.

Block 515a—Generating Trial Wave Function

At block 515a, the quantum computing system generates a trial wave function ($|\psi\rangle$) that describes the quantum states of an isolated quantum system according to known quantum mechanics practices to analyze the Hamiltonian starting from the initial state over a plurality of iterations to find approximations for the eigensolutions of the Hamiltonian.

Block 520a—Sampling Trial Wave Function

At block 520a, the quantum computing system samples the trial wave function generated per block 515a in a computational basis to obtain the set of N basis states from among the $2^n$ basis states, with each basis state $b_j$ having a probability $|a_j|^2$ of being sampled. The computational basis may be understood with greater detail in regard to method 600 described in relation to FIG. 6 or method 700 described in relation to FIG. 7. In various embodiments, sampling the trial wave function updates the values of the various basis states from the initial basis states (per block 510a) or earlier iterations of sampling the trial wave function.

Block 525a—Second Loop

At block 525a, the classical computing system determines whether a second stop criterion has been met. In various embodiments, the second stop criterion is satisfied in response to at least one of: a predefined number of iterations of the second loop from block 520a to block 525a being performed; and the batch result containing at least predefined number of values. When the second stop criterion has not been met, method 500a returns from block 525a to block 520a for the quantum computer to continue an additional iteration of the second loop. When the second stop criterion has been met, method 500a proceeds from block 525a to block 530a, breaking out of the second loop.

Block 530a—Post-Processing

At block 530a, the classical computing system performs post-processing of the basis states to obtain K basis states that satisfy an inclusion criterion. Post-processing involves the evaluation of each basis state against the inclusion criterion to determine whether the basis state is to be used to construct the subspace Hamiltonian from the full Hamiltonian. In various embodiments, the inclusion criterion is satisfied in response to at least one of: the second plurality of values containing a predefined number of values from the first plurality of values; the second plurality of values containing a number of values within a predefined threshold of a predefined number of values from the first plurality of values; or the second plurality of values satisfying one or more selection protocols, such as described in relation to FIG. 3A-3J.

Post-Processing Options for Use in Block 530a

In various embodiments, the post-processing protocol comprises a selection protocol which includes: selecting, via the classical computing system, the second plurality of values from the first plurality of values, that satisfy at least one of: a symmetry criterion (e.g., checking that the number of electrons is conserved), a screening criterion (e.g., values above a given threshold), an overlap criterion (e.g., identifying overlap in a graph of the basis states with other basis states and to identify important groups of basis states); or a randomized selection. When using a symmetry criterion, the symmetry criterion may be satisfied in response to the value representing a computational basis state of the Hilbert space with a predetermined number of electrons, or wherein the screening criterion is satisfied in response to the value representing a computational basis state of the Hilbert space with an amplitude magnitude within a predefined top percentile of a plurality of amplitude magnitudes of the values of the first plurality of values. For example, the classical computing system may select those basis states with amplitude magnitudes in the top X percentile of the amplitude magnitudes of the basis states. Various selection protocols are discussed in greater detail in regard to FIGS. 3A-3J.

Block 535a—Sufficiency of K Value

At block 535a, the classical computing system determines whether the number of values in the second plurality is sufficient to generate a subspace Hamiltonian. An operator may specify by a sufficiency threshold for the number of values to include in the second plurality based on the capabilities of the classical computing system (e.g., smaller numbers of values result in smaller subspaces to analyze, which are faster to compute), level of accuracy relative to the full Hamiltonian (e.g., larger numbers of values result in larger subspaces to analyze, which may be more (or at least not less) representative of the full space than smaller subspaces), and other operator considerations. In various embodiments, the classical computer can supplement the K selected basis states (either before or after determining whether K is sufficient) with additional basis states, expanding, via the classical computing system, the second plurality of values via including a third plurality of values from at least one of a previously run second plurality of iterations or an external source (e.g., a library with historical or standardized data for chemical systems).

Benefits of Selection Protocol Choice and Ease of Iteration

By offering greater control of the size and composition of the subspace Hamiltonian via the selection protocols and ability to iterate through different values for K and processing for selecting the basis states to fill the K states, the hybrid computing system can conserve total computing resources or alter the distribution of computing resources between the classical and quantum computing systems compared to traditional computational methodologies. Additionally, by providing the hybrid system with several locations in the VQE handover process to determine when (and what elements) to alter in a subsequent iteration, the hybrid computing system can further improve the ability of the classical computing system to produce an accurate eigensolution relative to traditional computational methodologies.

Decisions from Block 535a Based on K Value

When the value of K is not sufficient, being either too high or too low compared to an operator-defined threshold or window, method 500a returns from block 535a to block 520a for the quantum computer to continue. When the value of K is sufficient (e.g., falling within operator-defined threshold or window), method 500a proceeds from block 535a to block 540a.

Block 540a—Subspace Hamiltonian Construction

At block 540a, the classical computing system constructs a subspace Hamiltonian to represent the chemical system from the second plurality of values selected in block 530a according to the inclusion criterion. In various embodiments, the subspace Hamiltonian representation comprises at least one of: a K-by-K matrix, a Pauli Sum, and a black-box representation with an element-wise access protocol.

Block 545a—Minimum Eigenvalue and Eigenvector Calculations

At block 545a, the hybrid quantum-classical computing system computes an eigensolution of the subspace Hamiltonian. In various embodiments, the classical computing system uses an Eigensolver to compute the eigensolution, which may be at least one of: a quantum computing Eigensolver performing a calculation on a quantum computing system, or a classical computing Eigensolver performing a calculation on a classical computing system, or a hybrid computing Eigensolver performing a calculation on a hybrid computing system.

Block 550a—Ground State Value Calculation

At block 550a, the classical computing system computes a ground state value representing an approximation of the ground state of the full Hamiltonian and a ground state energy value representing an approximation of the ground state energy of the full Hamiltonian, using the eigensolution of the subspace Hamiltonian.

Block 555a—First Loop Termination/Iteration

At block 555a, the classical computing system determines whether a first stop criterion has been met, thereby completing the loops of the calculation. In various embodiments, the first stop criterion is satisfied in response to at least one of: a predefined number of iterations of the first plurality of iterations being performed, running the first plurality of iterations for a predefined amount of time, using the quantum computing system for a predefined amount of time, a change in the ground state energy value from a given iteration of the first plurality of iterations to a subsequent iteration of the first plurality of iterations being within a threshold value of a quantum noise variation value for the quantum computing system, a first derivative of the ground state energy value from a given iteration of the first plurality of iterations falling below a termination threshold, and a change in the ground state energy value from a plurality of previous iterations of the first plurality of iterations to a subsequent iteration of the first plurality of iterations being within a termination threshold.

Decisions from Block 555a Based on First Stop Criterion

When the first stop criterion has not been met, method 500a proceeds from block 555a to block 565a to determine how to proceed based on various decision criteria. When the first stop criterion has been met, method 500a proceeds from block 555a to block 560a, and optionally may perform the operations outlined with respect to FIG. 5C.

Block 560a—Output

At block 560a, in response to the first stop criterion being satisfied and the classical computer stopping the first plurality of iterations, the classical computing system outputs the eigensolution from a final iteration of the first plurality of iterations. In various embodiments, once the eigensolution is known, an operator may then simulate, via the classical computing system, using the eigensolution of a chemical system representable in a $2^n$-by-$2^n$ matrix and corresponding to the full Hamiltonian in a state relative to a target chemical system and determine the most stable configuration and properties of the system. The eigensolution of a chemical system provides information about the reactivity, stability, and potential interaction of the chemical system with other chemical systems. By evaluating the reactivity, stability, and interactions of the chemical system, an operator may then utilize the chemical system in the synthesis of other chemical systems or in the study of various reactions.

Block 565a—Iteration Determinations

At block 565a, in response to the first stop criterion not being satisfied, the classical computing system determines which decision criteria have been met to determine how to proceed. In various embodiments, an operator is prompted which of the three decision criteria is to be satisfied, to fully or partially restart the calculations when the first stop criteria has not been satisfied. In various embodiments, method 500a may iterate from block 510a through block 565a several times until the first stop criterion is satisfied or an operator terminates method 500a. In various embodiments, each time method 500a iterates through block 565a, at least one parameter of the calculation is changed from a previous iteration to a next iteration. For example, a different threshold value may be selected for K, a different procedure for determining the inclusion criteria may be selected, etc. In various embodiments, the classical computing system automatically determines which of the decision criteria based on which loop may be more favorable than others to repeat, while in other embodiments, the classical computing system prompts the operator (or has been pre-instructed by the operator) for which decision criteria should be met.

First Decision Criterion is Met at Block 565a

When the first decision criterion has been met, method 500a returns from block 565a to block 510a, to generate a new (e.g., a second) initial state to then re-run the first plurality of iterations on the hybrid quantum-classical computing system until the first stop criterion is satisfied a subsequent (e.g., second) time.

Second Decision Criterion is Met at Block 565a

When the second decision criterion has been met, method 500a returns from block 565a to block 520a, to return to the point of sampling from the trial wave function to then re-run the first plurality of iterations on the quantum computing system until the second stop criterion is satisfied a subsequent (e.g., second) time, and to continue through blocks 525a-560a until the first stop criterion is satisfied a subsequent (e.g., second) time.

Third Decision Criterion is Met at Block 565a

When the third decision criterion has been met, method 500a returns from block 565a to block 530a, re-selecting the values to construct the subspace Hamiltonian, via the classical computing system. In various embodiments, the classical computing system uses the previously generated first plurality of values and selects a new second plurality of values that each satisfy the inclusion criterion. In various embodiments, the classical computing system may use a different inclusion criterion or a different processing protocol to select the new second plurality of values. Method 500a may then continue through blocks 535a-560a until the first stop criterion is satisfied a subsequent (e.g., second) time.

Figure 5C:
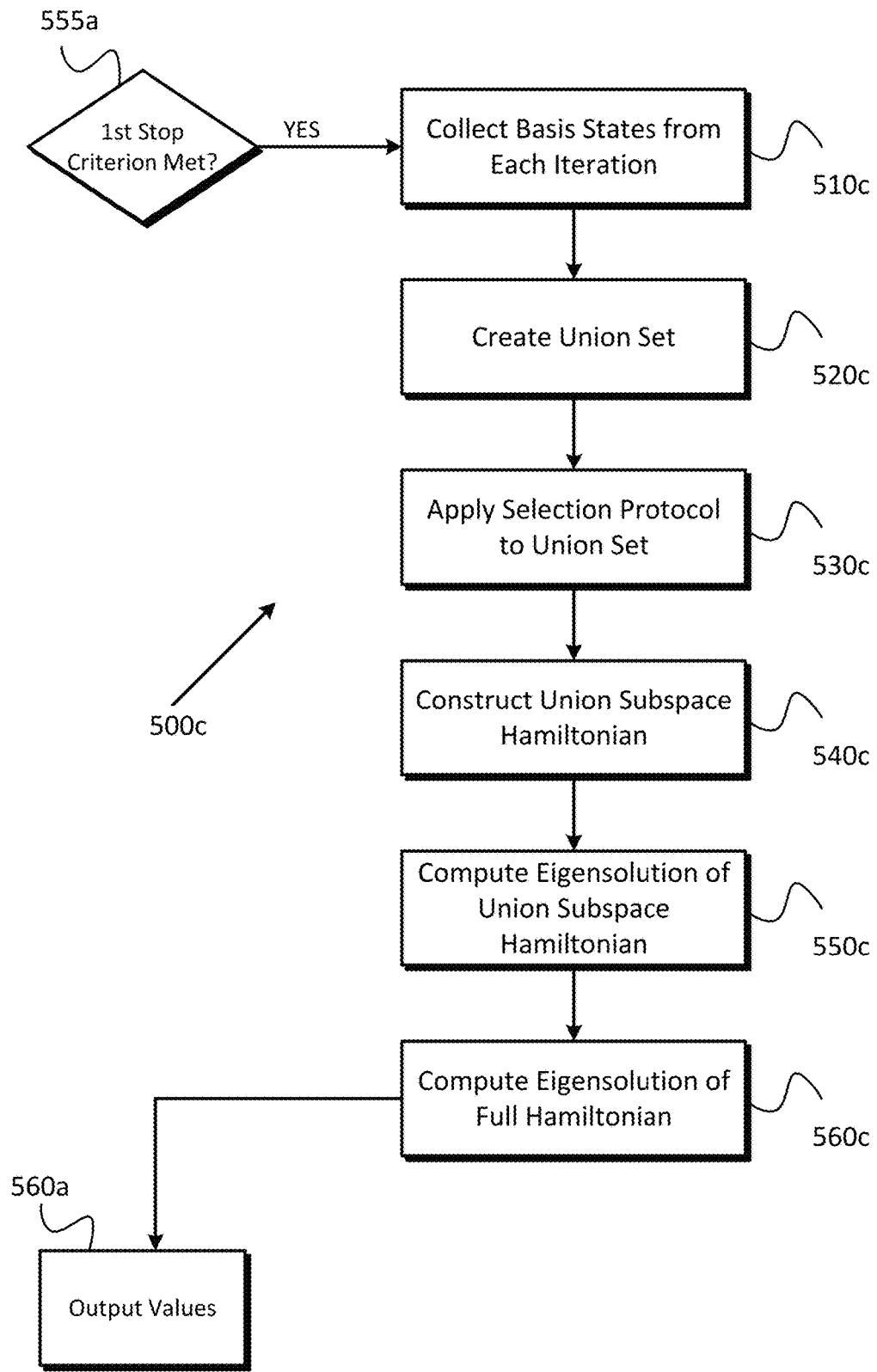

Operation of Method 500c per FIG. 5C for Union Set Analysis

FIG. 5C is a flowchart of an optional sub-method 500c that may be performed between block 555a and block 560a of method 500a. At block 510c, the classical computing system collects some of all of the N sampled basis states from previous iterations of method 500a, and at block 520c, creates a union set of these previously sampled basis states that are shared between iterations. In some embodiments, the union set is made of the previously selected K basis states from the previous iterations, but may also be made from un-selected basis states (e.g., N-K) or the whole set of N sampled basis states. For example, if in a first iteration a first set of $K_1$ basis states are selected {A, B, C, D} and in a second iteration a second set of $K_2$ basis states are selected {D, E, F, G}, the union set after the second iteration may be {A, B, C, D, E, F, G}. Similarly, if in a first iteration $N_1$ basis states are sampled and $N_2$ basis states are sampled in a second iteration, the union states allows for the different parts of the min-optimal space represented in $N_1$ and $N_2$ to be explored in a single merged/union set of values.

Block 530c—Selection within Union Set

At block 530c, the classical computing system applies a selection protocol to the union set to select $K_{union}$ basis states from the union set $U_k$ for analysis. In various embodiments, the selection protocol used to select the $K_{union}$ basis states may be the same or different from any of the selection protocols used in block 530a of method 500a.

Block 540c—Union Hamiltonian Construction

At block 540c, the classical computing system constructs a subspace Hamiltonian $H_{U_k}'$ for the union set $U_k$ to represent the chemical system from the union set according to the inclusion criterion. In various embodiments, the subspace Hamiltonian representation comprises at least one of: a K-by-K matrix, a Pauli Sum, and a black-box representation with an element-wise access protocol.

Block 550c—Union Subspace Hamiltonian Eigensolution Calculation

At block 550c, the classical computing system computes the eigensolution of the union subspace Hamiltonian $H_{U_k}'$. In various embodiments, the classical computing system uses an Eigensolver to compute the eigensolution, which may be at least one of: a quantum computing Eigensolver performing a calculation on a quantum computing system, or a classical computing Eigensolver performing a calculation on a classical computing system, or a hybrid computing Eigensolver performing a calculation on a hybrid computing system.

Block 560c—Full Hamiltonian Eigensolution Calculation

At block 560c, the classical computing system computes the eigensolution to the full Hamiltonian from the eigensolution for the union subspace Hamiltonian $H_{U_k}'$. After calculating the eigensolutions per block 550c and block 560c, method 500c may proceed to block 560a of method 500a for these eigensolutions to be output to a user for review.

Method of Determining the Ground State Value and Ground State Energy Per Operation of FIG. 6

FIG. 6 is a flowchart of an example method 600 for improving the computational efficiency of a hybrid quantum-classical computing system when determining the ground state value and ground state energy of a Hamiltonian using a Pauli-sampling or Pauli measurement, as may be used to represent an element or chemical compound, according to embodiments of the present disclosure.

Method 600 as a Special Case of Method 500

Method 600, discussed in relation to FIG. 6, may be understood as a special case on method 500a, discussed in relation to FIG. 5A, in which Pauli sampling or Pauli measurement is performed with respect to the parameterized quantum circuit. Accordingly, the operation of block 605 may be understood with reference to the discussion of block 505a, the operation of block 610 may be understood with reference to the discussion of block 510a, the operation of block 615 may be understood with reference to the discussion of block 515a, the operation of block 625 may be understood with reference to the discussion of block 525a, the operation of block 630 may be understood with reference to the discussion of block 530a, the operation of block 635 may be understood with reference to the discussion of block 535a, the operation of block 640 may be understood with reference to the discussion of block 540a, the operation of block 645 may be understood with reference to the discussion of block 545a, the operation of block 650 may be understood with reference to the discussion of block 550a, the operation of block 655 may be understood with reference to the discussion of block 555a, the operation of block 660 may be understood with reference to the discussion of block 560a, and the operation of block 665 may be understood with reference to the discussion of block 565a. Focus is given herein to the operation of block 620a, block 620b, block 620c, and block 620d as a special case of the operation of block 520a.

Blocks 605 and Block 610—Initialization of Quantum Computer

Method 600 begins at block 605, where the classical computing system creates a full Hamiltonian for a chemical system to analyze, and proceeds through block 610 for the classical computing system to generate an initial state for that chemical system and a parameterized quantum circuit that represents the chemical system according to the initial state.

Block 615—Generating Trial Wave Function

At block 615, the quantum computing system generates, via execution of the parameterized quantum circuit, a parameterized wave function that approximates the eigensolution of the full Hamiltonian.

Block 620a—Pauli Sampling

At block 620a, the quantum computing system performs Pauli sampling (for a Pauli measurement) of the parameterized quantum circuit with regards to the full Hamiltonian.

Block 620b—Calculate Expectation Value

At block 620b, the classical computing system calculates an expectation value of the parameterized quantum circuit with regards to the full Hamiltonian.

Block 620c—Update Parameters of Quantum Circuit

At block 620c, the quantum computing system updates a set of parameters of the parameterized quantum circuit according to the expectation value.

Block 620d—Determining Whether Third Loop is Complete

At block 620d, the classical computing system determines whether a third stop criterions has been met. In some such embodiments, the third stop criterion is satisfied in response to at least one of: a predefined number of iterations of the third plurality of iterations being performed, running the third plurality of iterations for a predefined amount of time, using the quantum computing system for a predefined amount of time, a change in the expectation value from a given iteration of the third plurality of iterations to a subsequent iteration of the third plurality of iterations being within a threshold value of a quantum noise variation value for the quantum computing system, a first derivative of the expectation value from a given iteration of the third plurality of iterations falling below a termination threshold, a change in the expectation value from a plurality of previous iterations of the third plurality of iterations to a subsequent iteration of the third plurality of iterations being within a termination threshold. and a predefined number of samples across the third plurality of iterations. When using a predefined number of samples as the third stop criterion, each sample includes operations of: executing a quantum circuit via the quantum computing system, obtaining a wave function, performing a measurement of the wave function via the quantum computing system, obtaining a measurement result, and outputting the measurement result.

Third Stop Criterion not Satisfied at Block 620d

When the third stop criterion has not been satisfied, method 600 returns to block 620a for the quantum computing system to continue Pauli sampling or Pauli measuring the now-updated (per block 620c) trial wave function.

Third Stop Criterion Satisfied at Block 620d

When the third stop criterion has been satisfied, the quantum computing system terminates the third loop, and method 600 proceeds to block 625 with the output of the last iteration of the third plurality of iterations for further processing according to blocks 625-665.

Method of Determining the Ground State Value and Ground State Energy Per Operation of FIG. 7

FIG. 7 is a flowchart of an example method 700 for improving the computational efficiency of a hybrid quantum-classical computing system when determining the ground state value and ground state energy of a Hamiltonian without using Pauli sampling or Pauli measurement, as may be used to represent an element or chemical compound, according to embodiments of the present disclosure.

Method 700 as a Special Case of Method 500a

Method 700, discussed in relation to FIG. 7, may be understood as a special case on method 500a, discussed in relation to FIG. 5A, in which Pauli sampling or Pauli measurement with respect to the parameterized quantum circuit is not performed. Accordingly, the operation of block 705 may be understood with reference to the discussion of block 505a, the operation of block 710 may be understood with reference to the discussion of block 510a, the operation of block 715 may be understood with reference to the discussion of block 515a, the operation of block 725 may be understood with reference to the discussion of block 525a, the operation of block 730 may be understood with reference to the discussion of block 530a, the operation of block 735 may be understood with reference to the discussion of block 535a, the operation of block 740 may be understood with reference to the discussion of block 540a, the operation of block 745 may be understood with reference to the discussion of block 545a, the operation of block 750 may be understood with reference to the discussion of block 550a, the operation of block 755 may be understood with reference to the discussion of block 555a, the operation of block 760 may be understood with reference to the discussion of block 560a, and the operation of block 765 may be understood with reference to the discussion of block 565a. Focus is given herein to the operation of block 720 as a special case of the operation of block 520a.

Blocks 705 and Block 710—Initialization of Quantum Computer

Method 700 begins at block 705, where the classical computing system creates a full Hamiltonian for a chemical system to analyze, and proceeds through block 710 for the classical computing system to generate an initial state for the chemical system and a parameterized quantum circuit that represents the chemical system according to the initial state.

Operation of Block 720—Output Parameterized Wave Function without Pauli Sampling At block 720, the quantum computing system runs a variational quantum Eigensolver (VQE) via the hybrid quantum-classical computing system for a third plurality of iterations until a third stop criterion is satisfied, wherein each iteration of the third plurality of iterations comprises: generating, via execution of the parameterized quantum circuit on the quantum computing system, a parameterized wave function that approximates the ground state of the full Hamiltonian, without performing a Pauli sampling, and outputting the parameterized wave function.

Technical Improvement Offered by Non-Pauli Process

Instead of relying on a third stop criterion and performing a third loop of analysis, the operations described in relation to method 700 rely on the second stop criterion (evaluated per block 725) and the sufficiency of the number of selected basis states (per blocks 730-735) to identify when the quantum computer has produced a sufficiently accurate representation of the full Hamiltonian to be presented in a subspace Hamiltonian thereof. The described Pauli-free methodology in method 700 permits the hybrid quantum-classical computing system to omit the computationally costly operations of performing Pauli measurements on the quantum computing system; thereby conserving computing resources of the quantum computing system.

Continued Operation of Method 700

Similarly, to the discussion provided in relation to method 500a in regard to FIG. 5A, method 700 proceeds through block 725-765 until an output is provide to an operator.

Figure 8:
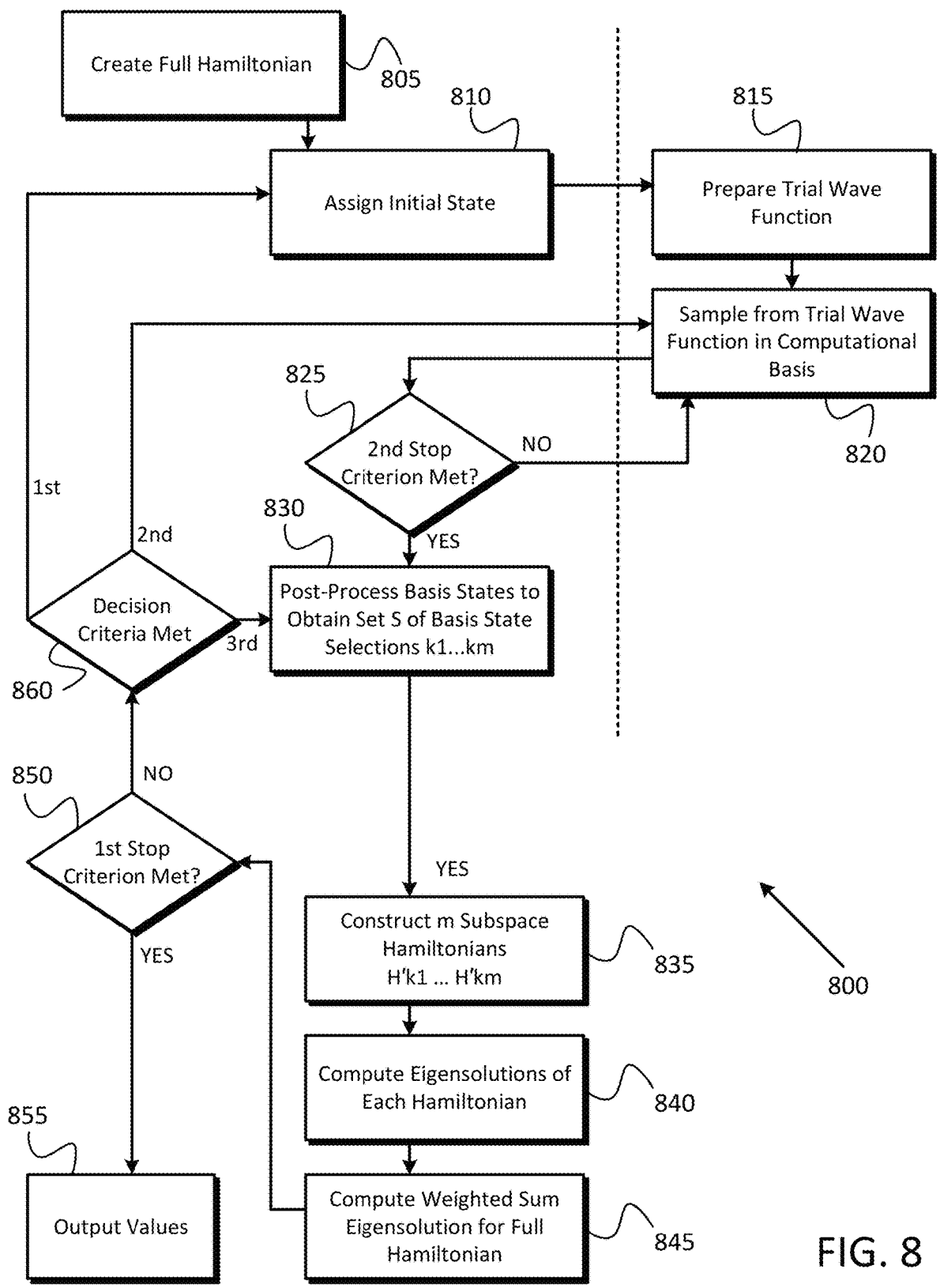
FIG. 8 is a flowchart of an example method for improving the computational efficiency of a hybrid quantum-classical computing system, as may be used to represent an element or chemical compound, according to embodiments of the present disclosure.

Method of Determining the Eigensolution Per Operation of FIG. 8

FIG. 8 is a flowchart of an example method 800 for determining the eigensolution of a Hamiltonian, as may be used to represent a chemical system, according to embodiments of the present disclosure. Method 800 may be considered a special case or variation on method 500a discussed in relation to FIG. 5A in which instead of using a single value for K in each iteration (which may vary between iterations of the various loops), a plurality of different sized values for K are used in parallel, which are denoted $k_1$, $k_2$, ... $k_m$, where m is the number of sizes for K specified by a user.

Initialization of Method 800

Method 800 begins at block 805, where a full Hamiltonian is created to represent the chemical system. Method 800 then proceeds through one or more iterations of blocks 810-860 to solve, using both quantum and classical computing resources, a subspace Hamiltonian for the chemical system that represents the full Hamiltonian in a classically tractable problem space. Because of the greater availability of classical computing resources compared to quantum computing resources, hand over may be attempted multiple times using various different techniques to render the computations tractable for a classical computer in different iterations and still provide improvements in overall system efficiency compared to determining the ground state value and ground state energy of a full Hamiltonian exclusively via quantum computing.

Block 805—Creating Full Hamiltonian

At block 805, a full Hamiltonian representing a chemical system is created using the classical computing system. The full Hamiltonian has a Hilbert space with $2^n$ basis states, which represent all possible states that the quantum system can be in. This is in contrast to the subspace Hamiltonian, discussed in detail in regard to block 540a, which includes a subset of the $2^n$ basis states selected to be most representative of the properties of the chemical system. Hamiltonians are used to evaluate the energy of the states in the Hilbert space, and the subspace Hamiltonian offers a computationally simpler platform to evaluate that energy state, which the classical computing system can evaluate, which is in contrast to the full Hamiltonian, which can be too complex for a classical computing system to process in a reasonable timeframe, and therefore uses the quantum computing system to evaluate.

Block 810—Assigning Initial State

At block 810, the classical computing system assigns an initial state for the full Hamiltonian for the quantum computing system to begin iteratively analyzing. The initial state represents an initial assignment of the amplitudes for the full set of $2^n$ basis states to begin calculations from. In various embodiments, the classical computing system may use various state preparation protocols for assigning the initial state for the full Hamiltonian. This initial state may include at least one of: a state prepared via a Hartree-Fock protocol, a zero state, a computational basis state of the Hilbert space, a state prepared via an ab-initio initial state preparation protocol (e.g., a Density Functional Theory (DFT), Configuration Interaction (CI), Coupled Cluster (CC), Møller-Plesset Perturbation theory (MPn), etc.), a state prepared via a tensor-network initial state preparation protocol (e.g., optimizing a tensor network and mapping the resulting state to a quantum circuit to obtain a quantum state), a sparse initial state from an eigensolution from a final iteration of a previous set of iterative analyses by the hybrid computing system (e.g., a final iteration of a previous plurality of iterations for use in a subsequent plurality of iterations), a uniformly distributed state, and a randomly distributed state. The present disclosure contemplates that different protocols may be used when performing subsequent iterations by the quantum computing system on the same chemical system.

Iterations of First Loop from Block 810 to Block 810

The iterations of the evaluation based on the initial state (and adjustments made thereto) are performed on the hybrid quantum-classical computing system, using the classical computing system and the quantum computing system for distinct calculations. This evaluation is performed by running a first plurality of iterations (e.g., as a loop) on the hybrid quantum-classical computing system, until a first stop criterion is satisfied, as is discussed in relation to block 850, and may include various sub-loops for different analyses.

Block 815—Generating Trial Wave Function

At block 815, the quantum computing system generates a trial wave function ($|\psi\rangle$) that describes the quantum states of an isolated quantum system according to known quantum mechanics practices to analyze the Hamiltonian starting from the initial state over a plurality of iterations to find approximations for the eigensolutions of the Hamiltonian.

Block 820—Sampling Trial Wave Function

At block 820, the quantum computing system samples the trial wave function generated per block 815 in a computational basis to obtain the set of N basis states from among the $2^n$ basis states, with each basis state $b_j$ having a probability $|\alpha_j|^2$ of being sampled. In various embodiments, sampling the trial wave function updates the values of the various basis states from the initial basis states (per block 810) or earlier iterations of sampling the trial wave function.

Block 825—Second Loop

At block 825, the classical computing system determines whether a second stop criterion has been met. In various embodiments, the second stop criterion is satisfied in response to at least one of: a predefined number of iterations of the second loop from block 820 to block 825 being performed; and the batch result containing at least predefined number of values. When the second stop criterion has not been met, method 800 returns from block 825 to block 820 for the quantum computer to continue an additional iteration of the second loop. When the second stop criterion has been met, method 800 proceeds from block 825 to block 830, breaking out of the second loop.

Block 830—Post-Processing

At block 830, the classical computing system performs post-processing of the basis states to obtain a set of S of the basis states for each selection k from $k_1$ to $k_m$ that satisfy an inclusion criterion. Post-processing involves the evaluation of each basis state against the inclusion criterion to determine whether the basis state is to be used to construct the subspace Hamiltonian from the full Hamiltonian. In various embodiments, the inclusion criterion is satisfied in response to at least one of: the second plurality of values containing a predefined number of values from the first plurality of values; the second plurality of values containing a number of values within a predefined threshold of a predefined number of values from the first plurality of values; or the second plurality of values satisfying one or more selection protocols, such as described in relation to FIG. 3A-3J.

Applying Multiple Selection Protocols in Block 830

Each of the values for $k_{1-m}$ are different and therefore each of the m selections include a different number of basis states.

In various embodiments, the selection protocol used to select the basis states may be the same or different for each of the k; values (e.g., for the $i^{th}$ member of $k_{1-m}$), and various supplemental (or removal) protocols may also be applied so that the corresponding number of basis states are selected for each $k_i$ in $k_{1-m}$.

Block 835—Subspace Hamiltonians Construction

At block 835, the classical computing system constructs a subspace Hamiltonian for each selection $k_i$ in set S to represent the chemical system from the second plurality of values selected in block 830 according to the inclusion criterion. In various embodiments, the subspace Hamiltonian representation comprises at least one of: a $k_i$-by-$k_i$ matrix, a Pauli Sum, and a black-box representation with an element-wise access protocol. The Subspace Hamiltonian for the selection of $k_i$ basis states may be denoted as $H_{k_i}'$.

Block 840—Minimum Eigenvalue and Eigenvector Calculations

At block 840, the hybrid quantum-classical computing system computes an eigensolution of each of the subspace Hamiltonians $H_{k_i}'$. In various embodiments, the classical computing system uses an Eigensolver to compute the eigensolution, which may be at least one of: a quantum computing Eigensolver performing a calculation on a quantum computing system, or a classical computing Eigensolver performing a calculation on a classical computing system, or a hybrid computing Eigensolver performing a calculation on a hybrid computing system.

Block 845—Ground State Value Calculation

At block 845, the classical computing system computes a ground state value representing an approximation of the ground state of the full Hamiltonian and a ground state energy value representing an approximation of the ground state energy of the full Hamiltonian, using the eigensolution of the subspace Hamiltonian. The final eigensolution of the full Hamiltonian is calculated as a weighted sum of the Eigensolutions of each of the Subspace Hamiltonians $H_{k_i}'$, where the weights are specified by the operator prior to the start of method 800, for which the final eigenvalue $\lambda_F$ may be represented as $\lambda_F = \Sigma_i(w_i * \lambda_{k_i})$, where $w_i$ is the weight for the eigenvalue $\lambda_{k_i}$ of the Subspace Hamiltonian $H_{k_i}'$.

Block 850—First Loop Termination/Iteration

At block 850, the classical computing system determines whether a first stop criterion has been met, thereby completing the loops of the calculation. In various embodiments, the first stop criterion is satisfied in response to at least one of: a predefined number of iterations of the first plurality of iterations being performed, running the first plurality of iterations for a predefined amount of time, using the quantum computing system for a predefined amount of time, a change in the ground state energy value from a given iteration of the first plurality of iterations to a subsequent iteration of the first plurality of iterations being within a threshold value of a quantum noise variation value for the quantum computing system, a first derivative of the ground state energy value from a given iteration of the first plurality of iterations falling below a termination threshold, and a change in the ground state energy value from a plurality of previous iterations of the first plurality of iterations to a subsequent iteration of the first plurality of iterations being within a termination threshold.

Decisions from Block 850 Based on First Stop Criterion

When the first stop criterion has not been met, method 800 proceeds from block 850 to block 860 to determine how to proceed based on various decision criteria. When the first stop criterion has been met, method 800 proceeds from block 850 to block 855.

Block 855—Output

At block 855, in response to the first stop criterion being satisfied and the classical computer stopping the first plurality of iterations, the classical computing system outputs the eigensolution from a final iteration of the first plurality of iterations. In various embodiments, once the eigensolution is known, an operator may then simulate, via the classical computing system, using the eigensolution a chemical system representable in a $2^n$-by-$2^n$ matrix and corresponding to the full Hamiltonian in a state relative to a target chemical system and determine the most stable configuration and properties of the system. The eigensolution of a chemical system provides information about the reactivity, stability, and potential interaction of the chemical system with other chemical systems. By evaluating the reactivity, stability, and interactions of the chemical system, an operator may then utilize the chemical system in the synthesis of other chemical systems or in the study of various reactions.

Block 860—Iteration Determinations

At block 860, in response to the first stop criterion not being satisfied, the classical computing system determines which decision criteria have been met to determine how to proceed. In various embodiments, an operator is prompted which of the three decision criteria is to be satisfied, to fully or partially restart the calculations when the first stop criteria has not been satisfied. In various embodiments, method 800 may iterate from block 810 through block 860 several times until the first stop criterion is satisfied or an operator terminates method 800. In various embodiments, each time method 800 iterates through block 860, at least one parameter of the calculation is changed from a previous iteration to a next iteration. For example, a different threshold value may be selected for each Kim, a different procedure for determining the inclusion criteria may be selected, a different calculation method (e.g., method 500a, method 500c, etc.) may be used, etc. In various embodiments, the classical computing system automatically determines which of the decision criteria based on which loop may be more favorable than others to repeat, while in other embodiments, the classical computing system prompts the operator (or has been pre-instructed by the operator) for which decision criteria should be met.

First Decision Criterion is Met at Block 860

When the first decision criterion has been met, method 800 returns from block 860 to block 810, to generate a new (e.g., a second) initial state to then re-run the first plurality of iterations on the hybrid quantum-classical computing system until the first stop criterion is satisfied a subsequent (e.g., second) time.

Second Decision Criterion is Met at Block 860

When the second decision criterion has been met, method 800 returns from block 860 to block 820, to return to the point of sampling from the trial wave function to then re-run the first plurality of iterations on the quantum computing system until the second stop criterion is satisfied a subsequent (e.g., second) time, and to continue through blocks 820-860 until the first stop criterion is satisfied a subsequent (e.g., second) time.

Third Decision Criterion is Met at Block 860

When the third decision criterion has been met, method 800 returns from block 860 to block 830, re-selecting the values to construct the subspace Hamiltonians, via the classical computing system. In various embodiments, the classical computing system uses the previously generated first plurality of values and selects a new second plurality of values that each satisfy the inclusion criterion. In various embodiments, the classical computing system may use a different inclusion criterion or a different processing protocol to select the new second plurality of values. Method 800 may then continue through blocks 830-850 until the first stop criterion is satisfied a subsequent (e.g., second) time.

Figure 9:
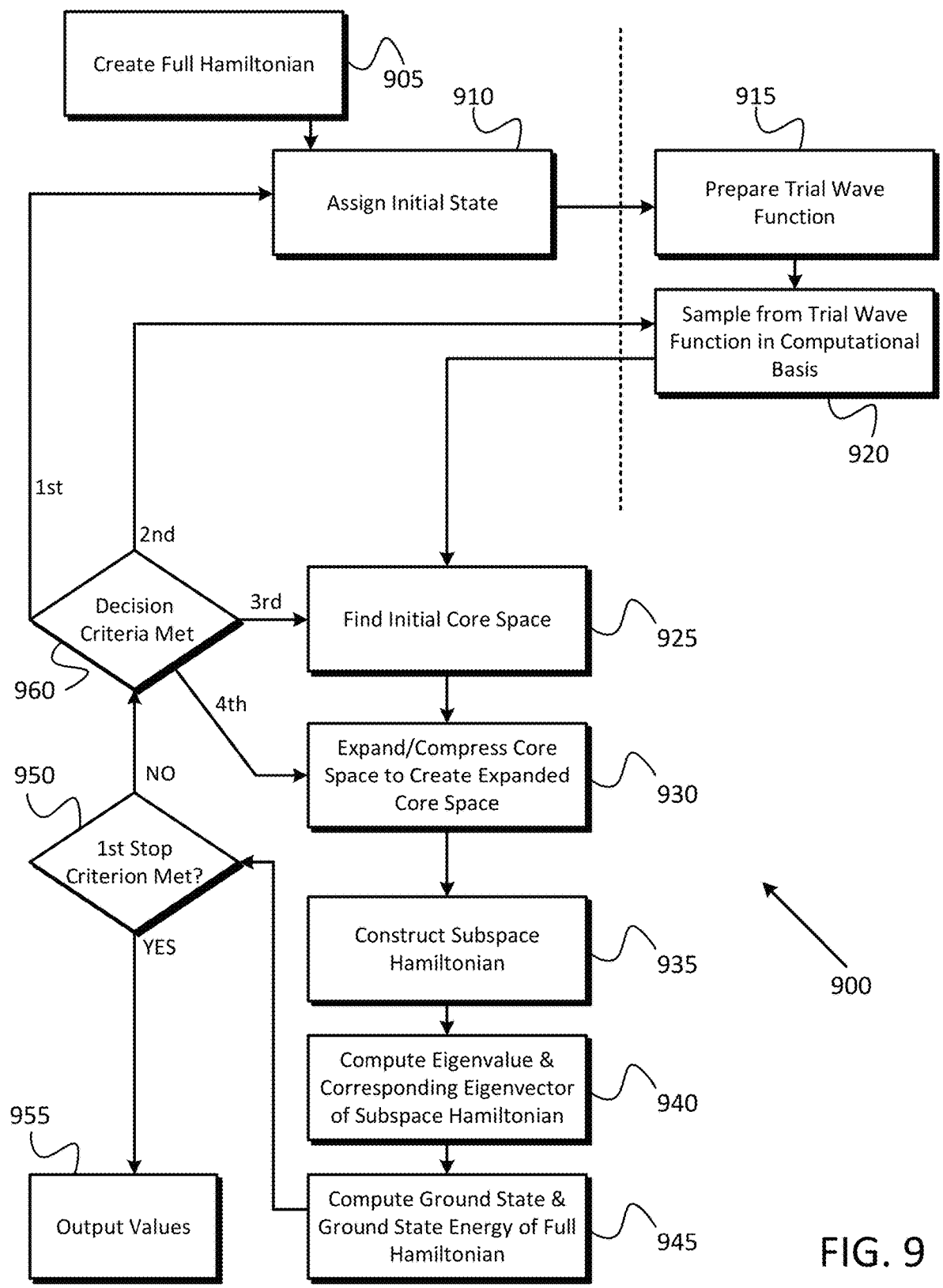
FIG. 9 is a flowchart of an example method for improving the computational efficiency of a hybrid quantum-classical computing system, as may be used to represent an element or chemical compound, according to embodiments of the present disclosure.

Method of Determining the Eigensolution Per Operation of FIG. 9

FIG. 9 is a flowchart of an example method 900 for determining the eigensolution of a Hamiltonian, as may be used to represent a chemical system, according to embodiments of the present disclosure. Method 900 may be considered a special case or variation on method 500a discussed in relation to FIG. 5A in which instead using single ansatz space from which a core space is defined for each iteration (which may vary between iterations of the various loops), the core space is expanded by various methodologies, including merging the current core space with a previous core space.

Initialization of Method 900

Method 900 begins at block 905, where a full Hamiltonian representing a chemical system is created using the classical computing system. The full Hamiltonian has a Hilbert space with $2^n$ basis states, which represent all possible states that the quantum system can be in. This is in contrast to the core space, discussed in detail in regard to block 925, which includes a subset of the $2^n$ basis states selected to be most representative of the properties of the chemical system. Hamiltonians are used to evaluate the energy of the states in the Hilbert space, and the subspace Hamiltonian offers a computationally simpler platform to evaluate that energy state, which the classical computing system can evaluate, which is in contrast to the full Hamiltonian, which can be too complex for a classical computing system to process in a reasonable timeframe, and therefore uses the quantum computing system to evaluate.

Block 910—Assigning Initial State

At block 910, the classical computing system assigns an initial state for the full Hamiltonian for the quantum computing system to begin iteratively analyzing. The initial state represents an initial assignment of the amplitudes for the full set of $2^n$ basis states to begin calculations from. In various embodiments, the classical computing system may use various state preparation protocols for assigning the initial state for the full Hamiltonian. This initial state may include at least one of: a state prepared via a Hartree-Fock protocol, a zero state, a computational basis state of the Hilbert space, a state prepared via an ab-initio initial state preparation protocol (e.g., a Density Functional Theory (DFT), Configuration Interaction (CI), Coupled Cluster (CC), Møller-Plesset Perturbation theory (MPn), etc.), a state prepared via a tensor-network initial state preparation protocol (e.g., optimizing a tensor network and mapping the resulting state to a quantum circuit to obtain a quantum state), a sparse initial state from an eigensolution from a final iteration of a previous set of iterative analyses by the hybrid computing system (e.g., a final iteration of a previous plurality of iterations for use in a subsequent plurality of iterations), a uniformly distributed state, and a randomly distributed state. The present disclosure contemplates that different protocols may be used when performing subsequent iterations by the quantum computing system on the same chemical system.

Block 915—Generating Trial Wave Function

At block 915, the quantum computing system generates a trial wave function ($|\psi\rangle$) that describes the quantum states of an isolated quantum system according to known quantum mechanics practices to analyze the Hamiltonian starting from the initial state over a plurality of iterations to find approximations for the eigensolutions of the Hamiltonian.

Block 920—Sampling Trial Wave Function

At block 920, the quantum computing system samples the trial wave function generated per block 915 in a computational basis to obtain the set of N basis states from among the $2^n$ basis states, with each basis state $b_j$ having a probability $|\alpha_j|^2$ of being sampled. In various embodiments, sampling the trial wave function updates the values of the various basis states from the initial basis states (per block 910) or earlier iterations of sampling the trial wave function.

Block 925—Finding Core Space

At block 925, the classical computing system determines the basis states from the computational basis samples (e.g., an ansatz space) that form the initial core space for analysis. In various embodiments, one or more selection protocols with different target numbers (K) of basis states for selection (K) may be used to determine the core space, as are described herein.

Block 930—Expanding/Compressing Core Space

At block 930, the classical computing system may optionally expand, compress, or expand and compress the initial core space found per block 925. In various embodiments, the expansion space used to expand on the initial core space may include an a priori space, a core space identified from an earlier iteration of the method 900, or a derived/generated set of basis states, such as alpha/beta-swapped basis states or basis states in a Hamming space. These basis states that form the expansion space are (generally or preferably) outside of the ansatz space from which the core space is derived, and are selected as potentially having a noticeable effect on the accuracy of the eigensolution if included in later calculations. Additionally, the basis states in the expansion space may be subjected to various selection protocols, either individually, with other expansion spaces, or with the core space to reduce the number of basis states used to later construct a subspace Hamiltonian (e.g., per block 935) and ensure that the selected basis states for analysis are the most significant basis states (from those available) for calculating an accurate eigensolution.

Benefits of Expansion and Compression of Core Space

Because the basis states in the expansion space are part of the whole space for the chemical system, the inclusion of additional basis states cannot degrade the results of the calculations of the eigensolutions for the chemical system; however, over-inclusion of basis states that have no effect or minimal effect may result in using more computing resources than strictly necessary to reach the eigensolutions. Accordingly, while expanding the core space to include more basis states outside of those available from the current ansatz space can improve the overall result, the classical computing system may apply various selection protocols (as are discussed herein) to compress the number of basis states in the initial core space, the expansion space, or the expanded core space to ensure that no more than K basis states are selected for inclusion in the subspace Hamiltonian. Additionally, by using classical computing methodologies to identify these expansion basis states, an operator may reduce the amount of quantum computing resources needed to generate larger ansatz spaces or multiple ansatz spaces (e.g., a union ansatz space) across multiple iterations.

Block 935—Subspace Hamiltonian Construction

At block 935, the classical computing system constructs a subspace Hamiltonian to represent the chemical system from the basis states selected according to block 925 and block 930. In various embodiments, the subspace Hamiltonian representation comprises at least one of: a K-by-K matrix, a Pauli Sum, and a black-box representation with an element-wise access protocol.

Block 940—Minimum Eigenvalue and Eigenvector Calculations

At block 940, the hybrid quantum-classical computing system computes an eigensolution of the subspace Hamiltonian. In various embodiments, the classical computing system uses an Eigensolver to compute the eigensolution, which may be at least one of: a quantum computing Eigensolver performing a calculation on a quantum computing system, or a classical computing Eigensolver performing a calculation on a classical computing system, or a hybrid computing Eigensolver performing a calculation on a hybrid computing system.

Block 945—Ground State Value Calculation

At block 945, the classical computing system computes a ground state value representing an approximation of the ground state of the full Hamiltonian and a ground state energy value representing an approximation of the ground state energy of the full Hamiltonian, using the eigensolution of the subspace Hamiltonian.

Block 950—First Loop Termination/Iteration

At block 950, the classical computing system determines whether a first stop criterion has been met, thereby completing the loops of the calculation. In various embodiments, the first stop criterion is satisfied in response to at least one of: a predefined number of iterations of the first plurality of iterations being performed, running the first plurality of iterations for a predefined amount of time, using the quantum computing system for a predefined amount of time, a change in the ground state energy value from a given iteration of the first plurality of iterations to a subsequent iteration of the first plurality of iterations being within a threshold value of a quantum noise variation value for the quantum computing system, a first derivative of the ground state energy value from a given iteration of the first plurality of iterations falling below a termination threshold, and a change in the ground state energy value from a plurality of previous iterations of the first plurality of iterations to a subsequent iteration of the first plurality of iterations being within a termination threshold.

Decisions from Block 950 Based on First Stop Criterion

When the first stop criterion has not been met, method 900 proceeds from block 950 to block 960 to determine how to proceed based on various decision criteria. When the first stop criterion has been met, method 900 proceeds from block 950 to block 955.

Block 955—Output

At block 955, in response to the first stop criterion being satisfied and the classical computer stopping the first plurality of iterations, the classical computing system outputs the eigensolution from a final iteration of the first plurality of iterations. In various embodiments, once the eigensolution is known, an operator may then simulate, via the classical computing system, using the eigensolution a chemical system representable in a $2^n$-by-$2^n$ matrix and corresponding to the full Hamiltonian in a state relative to a target chemical system and determine the most stable configuration and properties of the system. The eigensolution of a chemical system provides information about the reactivity, stability, and potential interaction of the chemical system with other chemical systems. By evaluating the reactivity, stability, and interactions of the chemical system, an operator may then utilize the chemical system in the synthesis of other chemical systems or in the study of various reactions.

Block 960—Iteration Determinations

At block 960, in response to the first stop criterion not being satisfied, the classical computing system determines which decision criteria have been met to determine how to proceed. In various embodiments, an operator is prompted which of the four decision criteria is to be satisfied, to fully or partially restart the calculations when the first stop criteria has not been satisfied. In various embodiments, method 900 may iterate from block 910 through block 960 several times until the first stop criterion is satisfied or an operator terminates method 900. In various embodiments, each time method 900 iterates through block 960, at least one parameter of the calculation is changed from a previous iteration to a next iteration. For example, a different threshold value may be selected for K, a different procedure for determining the inclusion criteria may be selected, etc. In various embodiments, the classical computing system automatically determines which of the decision criteria based on which loop may be more favorable than others to repeat, while in other embodiments, the classical computing system prompts the operator (or has been pre-instructed by the operator) for which decision criteria should be met.

First Decision Criterion is Met at Block 960

When the first decision criterion has been met, method 900 returns from block 960 to block 910, to generate a new (e.g., a second) initial state to then re-run the first plurality of iterations on the hybrid quantum-classical computing system until the first stop criterion is satisfied a subsequent (e.g., second) time.

Second Decision Criterion is Met at Block 960

When the second decision criterion has been met, method 900 returns from block 960 to block 920, to return to the point of sampling from the trial wave function to then re-run the first plurality of iterations on the quantum computing system until the second stop criterion is satisfied a subsequent (e.g., second) time, and to continue through blocks 925-950 until the first stop criterion is satisfied a subsequent (e.g., second) time.

Third Decision Criterion is Met at Block 960

When the third decision criterion has been met, method 900 returns from block 960 to block 925, finding a new set of basis states via the classical computing system to define the initial core space. In various embodiments, the classical computing system uses the previously generated core space as an a priori space to focus selection of new basis states on or away from. In various embodiments, the classical computing system may use a different inclusion criterion or a different selection protocol to select the new basis states. Method 900 may then continue through blocks 930-950 until the first stop criterion is satisfied a subsequent (e.g., second) time.

Fourth Decision Criterion is Met at Block 960

When the fourth decision criterion has been met, method 900 returns from block 960 to block 930, finding a new set of basis states via the classical computing system to define the expanded core space. In various embodiments, the classical computing system may use the initial core space (from block 925) or the expanded core space (from the previous iteration of block 930) as a starting point from which to add new basis states or compress the number of basis states (e.g., removing basis states that do not improve the accuracy of the later calculations). Method 900 may then continue through blocks 935-950 until the first stop criterion is satisfied a subsequent (e.g., second) time.

Figure 10A:
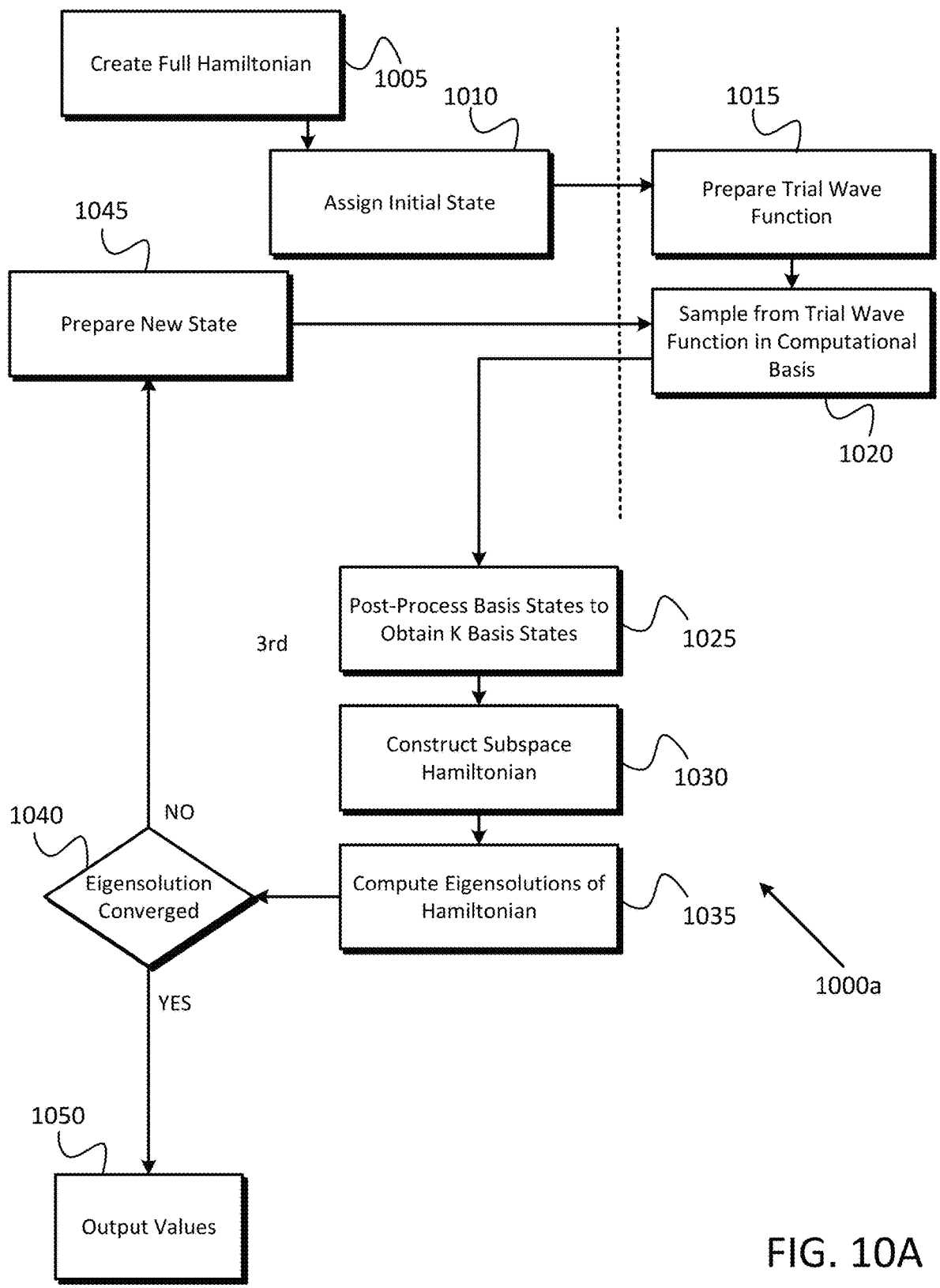
FIGS. 10A-10B are flowcharts of an example method for improving the computational efficiency of a hybrid quantum-classical computing system, as may be used to represent an element or chemical compound, according to embodiments of the present disclosure.

Method of Determining the Eigensolution Per Operation of FIG. 10A

FIG. 10A is a flowchart of an example method 1000a for determining the eigensolution of a Hamiltonian, as may be used to represent a chemical system, according to embodiments of the present disclosure. Method 1000a may be considered a special case or variation of method 500a discussed in relation to FIG. 5A, which focuses on defining the initial state instead of adjusting the value for K, using different selection protocols, using different selection criteria, or combinations thereof in each iteration (which may vary between iterations of the various loops).

Initialization of Method 1000a

Method 1000a begins at block 1005, where a full Hamiltonian representing a chemical system is created using the classical computing system. The full Hamiltonian has a Hilbert space with $2^n$ basis states, which represent all possible states that the quantum system can be in. This is in contrast to the subspace Hamiltonian, discussed in detail in regard to block 1030, which includes a subset of the $2^n$ basis states. Hamiltonians are used to evaluate the energy of the states in the Hilbert space, and the subspace Hamiltonian offers a computationally simpler platform to evaluate that energy state, which the classical computing system can evaluate, which is in contrast to the full Hamiltonian, which can be too complex for a classical computing system to process in a reasonable timeframe, and therefore uses the quantum computing system to evaluate.

Block 1010—Assigning Initial State

At block 1010, the classical computing system assigns an initial state ($|\Phi\rangle$) for the full Hamiltonian for the quantum computing system to begin iteratively analyzing. The initial state represents an initial assignment of the amplitudes for the full set of $2^n$ basis states to begin calculations from. In various embodiments, the classical computing system may use various state preparation protocols for assigning the initial state for the full Hamiltonian. This initial state may include at least one of: a state prepared via a Hartree-Fock protocol, a zero state, a computational basis state of the Hilbert space, a state prepared via an ab-initio initial state preparation protocol (e.g., a Density Functional Theory (DFT), Configuration Interaction (CI), Coupled Cluster (CC), Møller-Plesset Perturbation theory (MPn), etc.), a state prepared via a tensor-network initial state preparation protocol (e.g., optimizing a tensor network and mapping the resulting state to a quantum circuit to obtain a quantum state), a sparse initial state from an eigensolution from a final iteration of a previous set of iterative analyses by the hybrid computing system (e.g., a final iteration of a previous plurality of iterations for use in a subsequent plurality of iterations), a uniformly distributed state, and a randomly distributed state. The present disclosure contemplates that different protocols may be used when performing subsequent iterations by the quantum computing system on the same chemical system.

Block 1015—Generating Trial Wave Function

At block 1015, the quantum computing system generates a trial wave function ($|\psi\rangle$) that describes the quantum states of an isolated quantum system according to known quantum mechanics practices to analyze the Hamiltonian starting from the initial state over a plurality of iterations to find approximations for the eigensolutions of the Hamiltonian. The trial wave function is prepared according to the initial state $|\Phi\rangle$).

Block 1020—Sampling Trial Wave Function

At block 1020, the quantum computing system samples the trial wave function generated per block 1015 in a computational basis to obtain the set of N basis states from among the $2^n$ basis states, with each basis state $b_j$ having a probability $|\alpha_j|^2$ of being sampled. In various embodiments, sampling the trial wave function updates the values of the various basis states from the initial basis states (per block 1010) or earlier iterations of sampling the trial wave function. The quantum computer may repeat the projective measurement in the computational basis $N_s$ times.

Block 1025—Post-Processing

At block 1025, the classical computing system performs post-processing of the basis states to identify which basis states to use in constructing a subspace Hamiltonian (per block 1030). In various embodiments, the classical computing system computes the occurrence frequency (f) of each integer (configuration) i in the results of $N_s$ shots, which may be measured as: $f_i = n_i/N_s$, where $n_i$ is the number of i appearing in the measurement result $i_1, \ldots, i_{N_s}$. From the frequency measurements, the classical computing system chooses the K most-frequent configurations, $k_1, k_2, k_3, \ldots, k_K = \{0, 1, \ldots, 2n-1\}$, and defines the subspace $S = \text{span}\{|k_1\rangle, \ldots, |k_K\rangle\}$.

Block 1030—Subspace Hamiltonians Construction

At block 1030, the classical computing system constructs a subspace Hamiltonian for the subspace S to represent the chemical system from the basis states selected in block 1025. In various embodiments, the subspace Hamiltonian representation comprises at least one of: a K-by-K matrix, a Pauli Sum, and a black-box representation with an element-wise access protocol.

Block 1035—Eigensolution Calculations

At block 1035, the hybrid quantum-classical computing system computes an eigensolution the subspace Hamiltonian. In various embodiments, the classical computing system uses an Eigensolver to compute the eigensolution, which may be at least one of: a quantum computing Eigensolver performing a calculation on a quantum computing system, or a classical computing Eigensolver performing a calculation on a classical computing system, or a hybrid computing Eigensolver performing a calculation on a hybrid computing system. The classical computing system may perform selected CI calculations, or a diagonalization of the effective Hamiltonian in the subspace S, which gives the approximate ground state and ground-state energy of the Hamiltonian from which values for the full Hamiltonian may be derived.

Block 1040—Determining Whether Solutions are Converging

At block 1040, the classical computing system determines whether the eigensolutions for the subspace Hamiltonian and the full Hamiltonian (computed per block 1035) are converging within a convergence threshold. When the eigensolutions are determined to be converged, method 1000a proceeds to block 1055. Otherwise, when the eigensolutions are determined to not be converged, method 1000a proceeds to block 1045.

Block 1045—New State Preparation

Figure 10B:
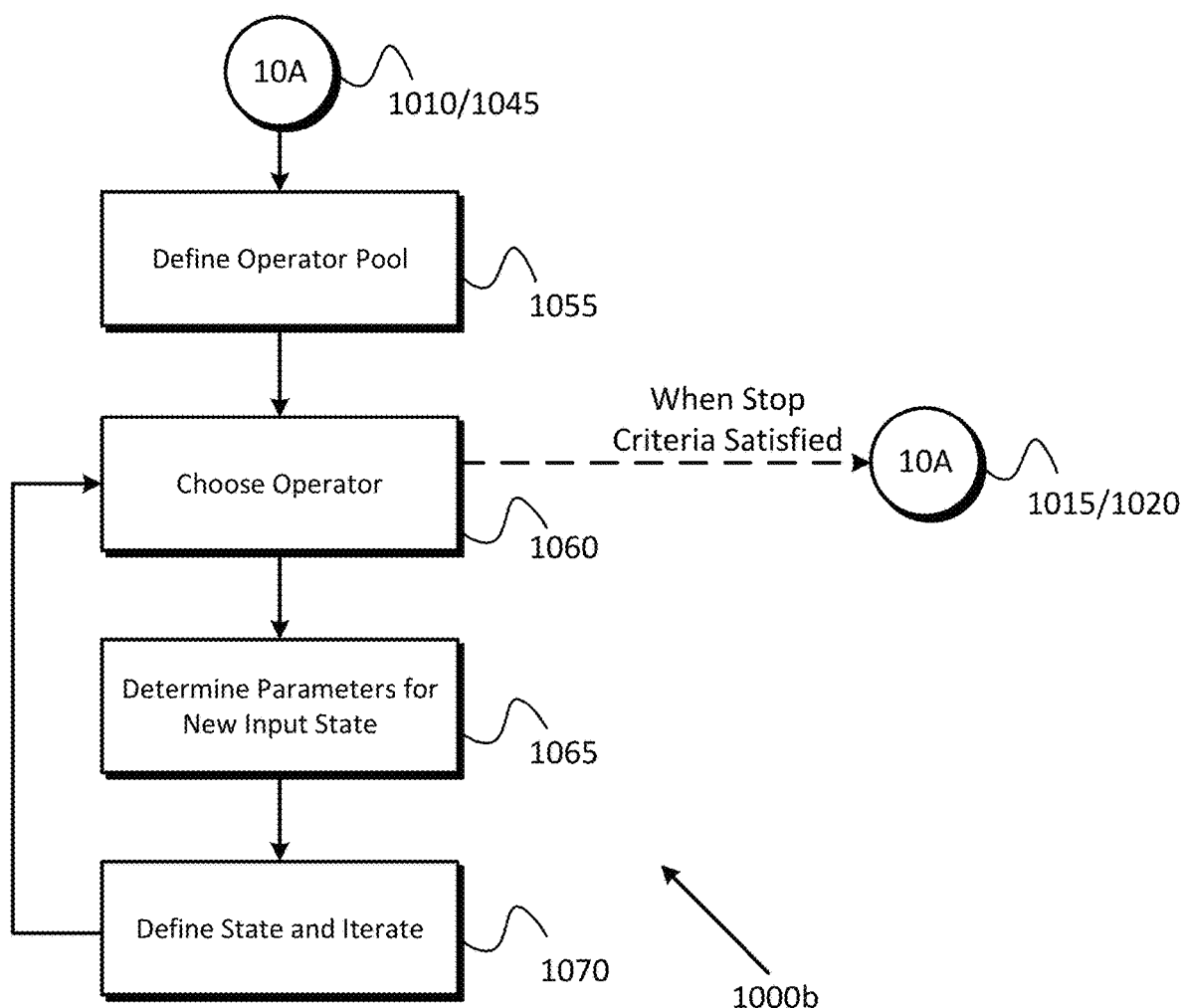

At block 1050, the classical computing system prepares a new state for evaluation via the quantum computing system based on a value of OK calculated in last-performed iteration of block 1010 or block 1045 as is discussed in relation to method 1000b in FIG. 10B. Method 1000a may then return to block 1020 to evaluate the new state, and may continue until the eigensolutions converge (per block 1040) or another stop criterion is satisfied.

Block 1050—Output

At block 1050, in response to the classical computing system determining that the eigensolutions are converged, the classical computing system outputs the eigensolution from a final iteration. In various embodiments, once the eigensolution is known, an operator may then simulate, via the classical computing system, using the eigensolution a chemical system representable in a $2^n$-by-$2^n$ matrix and corresponding to the full Hamiltonian in a state relative to a target chemical system and determine the most stable configuration and properties of the system. The eigensolution of a chemical system provides information about the reactivity, stability, and potential interaction of the chemical system with other chemical systems. By evaluating the reactivity, stability, and interactions of the chemical system, an operator may then utilize the chemical system in the synthesis of other chemical systems or in the study of various reactions.

Detailed Operation of Input State Selection in Blocks 1010/1045 of Method 1000a

Method 1000a relies on the choice of the input state (e.g., per block 1010 or block 1045) containing the important configuration to describe the exact ground state with large weight $|\alpha_i|^2$. Accordingly, method 1000b illustrated in the flowchart of FIG. 10B provides detailed operation of block 1010 or block 1045 of method 1000a when used for an adaptive construction of the input state. In method 1000b, the classical computing system evaluates the gradient $h_j$ of energy expectation value for a state $e^{i\theta P_j}|c_v\rangle$. The value of the gradient $h_j$ can be calculated by projecting the Hermitian operator $i[H, P_j]$ onto the subspace $S_v$ and computing the expectation value of the Hermitian operator for classical vector $c_v$, via a classical computing system.

Goals for Input State Selection for Method 1000b

Ideally, the exact ground state $|\psi_{GS}\rangle$ of the Hamiltonian H itself is a candidate for such input state because the weights $|\alpha_i|^2$ for important configurations in $|\psi_{GS}\rangle$ are often larger than less important configurations. One can pick up important configurations by the projective measurement for $|\psi_{GS}\rangle$. Therefore, quantum states with lower energy expectation value $\langle|\Phi|H|\Phi\rangle$ may be used as input states, which are expected to resemble the exact ground state.

Block 1055—Define Operator Pool

At block 1055, the system defines an operator pool $\mathbb{P} = \{P_1, \ldots, P_T\}$ and an initial state $|\psi_0\rangle$, and an iteration value v is initially set to zero (e.g., v=0). In various embodiments, this operator pool includes the single Pauli operators.

Block 1060—Choose Operator

At block 1060, the operator in the pool that has the largest gradient value $|h_j|$ is chosen, which is denoted as $P_{t_v}$. If $|h_{t_v}|$ is smaller than a stop threshold, method 1000b may stop and continue to block 1015 or block 1020 per method 1000a discussed in relation to FIG. 10A, using the current value of $\theta_v$ selected per the last iteration of block 1065 from method 100b for $\theta_K$ in method 1000a.

Block 1065—Determine Parameters for New Input State

At block 1065, the classical computer determines a parameter for a new input state. In various embodiments, a parameter is chosen to minimize or reduce the energy expectation value $$f_v(\theta_v) = \langle c_v|e^{-i\theta_v P_{t_v}} H e^{i\theta_v P_{t_v}}|c_v\rangle$$

with respect to $\theta_v$. The determination may be performed by the classical computing system because $P_{t_v}$ is a Pauli operator satisfying $P_{t_v}^2 = I$. The value of $f_v(\theta_v)$ may be evaluated for any value of 0, by projecting H, $P_{t_v} H P_{t_v}$, and $i[H, P_{t_v}]$ onto the subspace $S_v$ and computing the expectation values of them for the state $|c_v\rangle$, which can be efficiently carried out by classical computers. Since $f_v(\theta_v)$ is a simple trigonometric function, a classical computer can compute the exact minimum of $f_v(\theta_v)$ from these expectation values.

Block 1070—Define State and Iterate Process

At block 1070, the state is defined as $|\Phi_v+1\rangle\, e^{i\theta k^*} P_{tk}|\Phi_0\rangle$, and the value for v is iterated (e.g., v=v+1), and method 1000b returns to block 1060 using the new value for v.

Example Energy Calculations in FIGS. 11A-11F

FIGS. 11A-11F illustrate the energy of chemical systems for different values selected for K in constructing subspace Hamiltonians, according to embodiments of the present disclosure. In each of FIGS. 11A-11F, the energy value of the chemical system as calculated by a VQE is shown with data points represented as squares. The energy value of the chemical system as calculated by the full configuration interaction (FCI) that represents the ideal value for the energy level is shown with data points represented as x's. The energy values calculated for the various handover setups are shown as circles.

Energy of $Li_2S$ with Noise Model

Figure 11A:
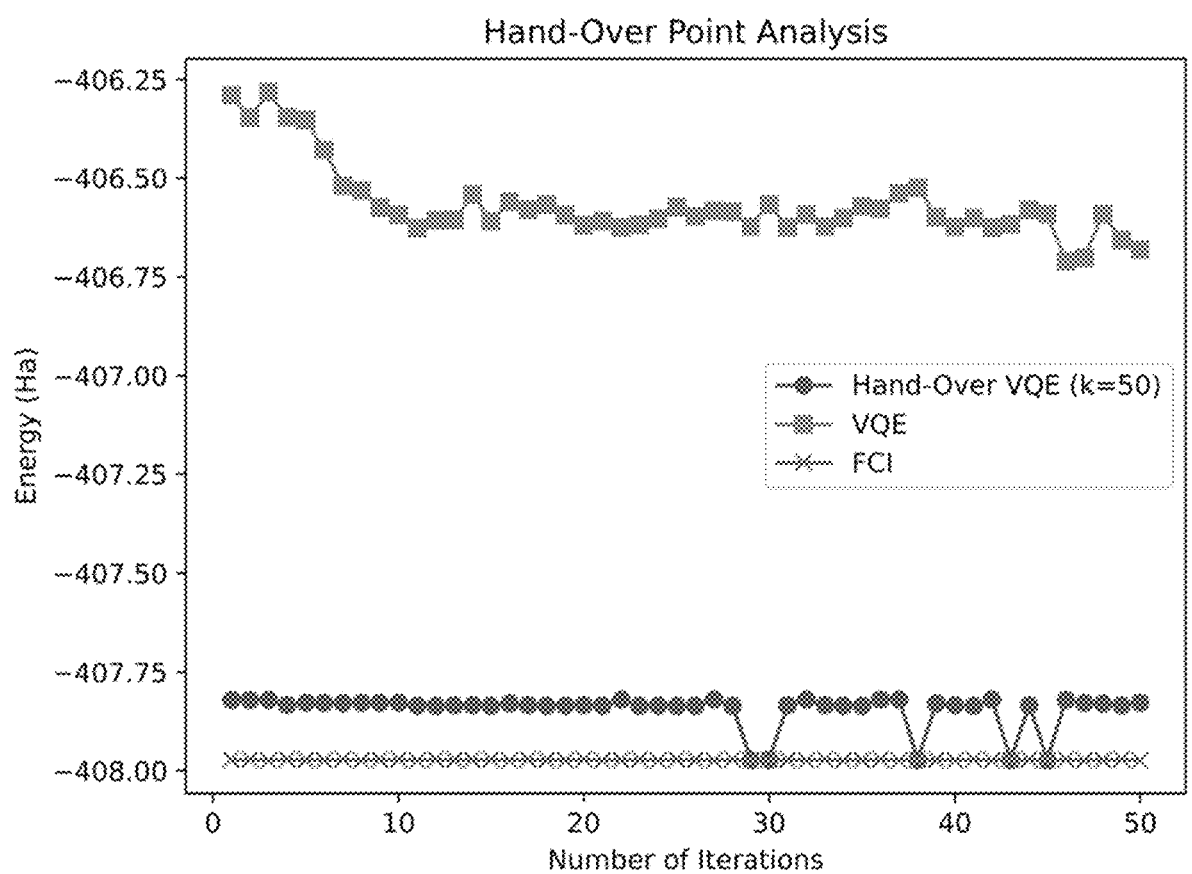
FIGS. 11A-11F illustrate various performance improvements for different values of K in constructing subspace Hamiltonians, according to embodiments of the present disclosure.
Figure 11B:
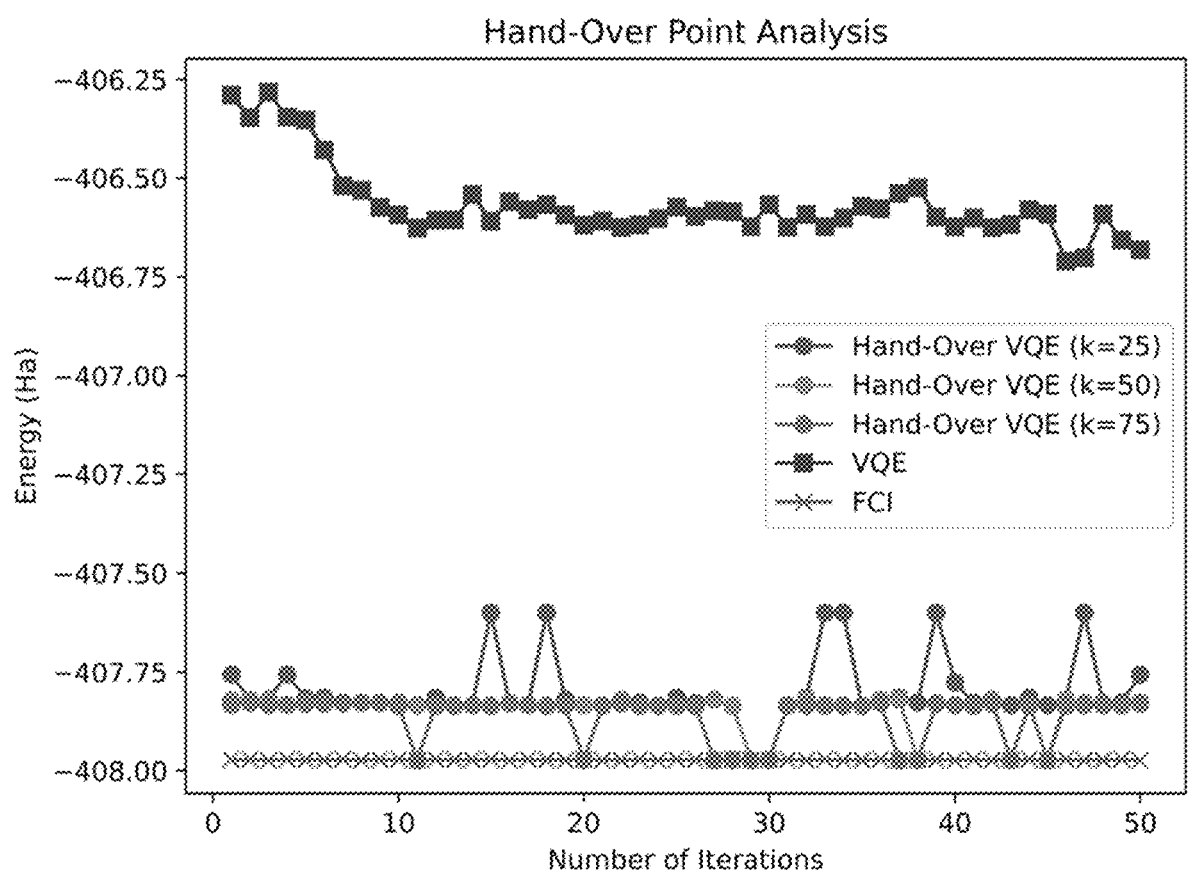
Figure 11C:
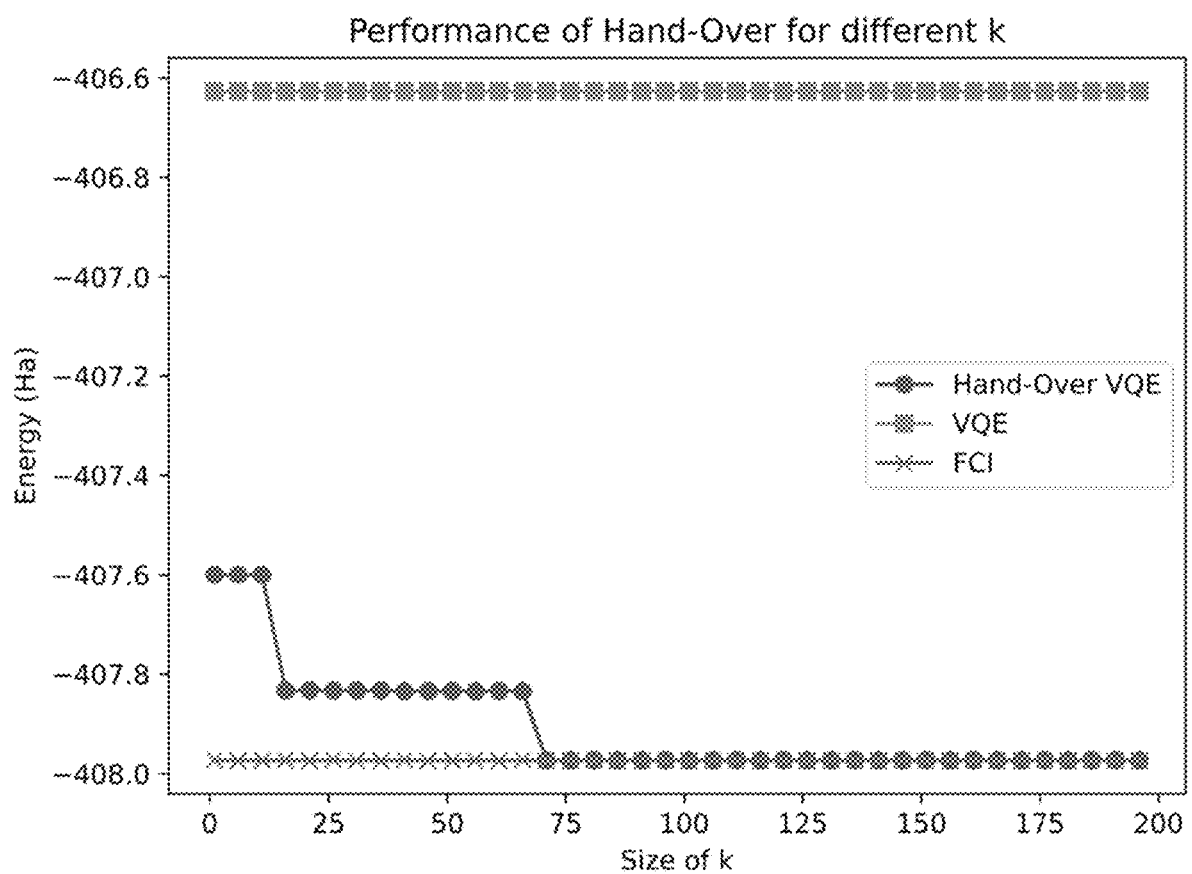

FIGS. 11A-11C illustrate analysis of the chemical system of lithium sulfide ($Li_2S$) with the quantum states developed using a quantum computer simulator with 10 qubits, six electrons, STO-3G basis set, and with a noise model applied.

Energy of $Li_2S$ with No Noise Model

Figure 11D:
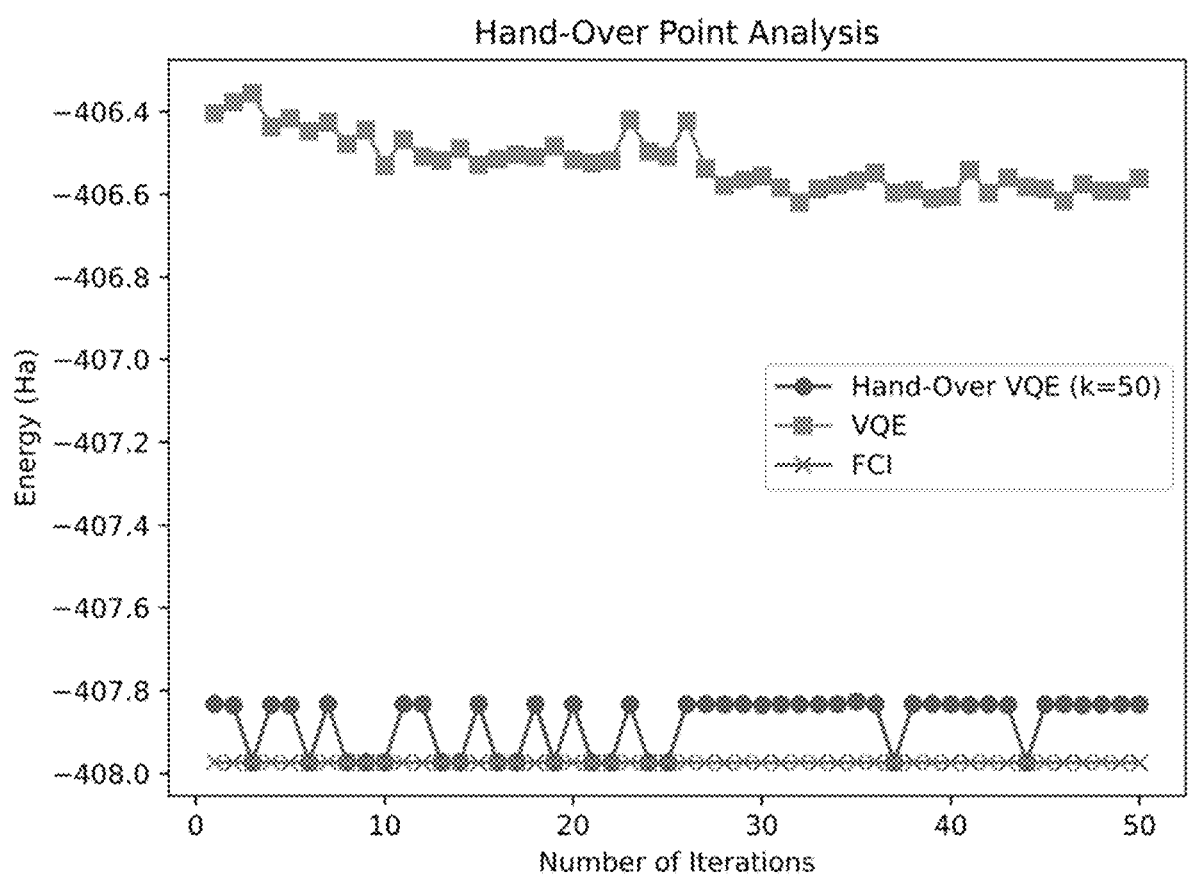
Figure 11E:
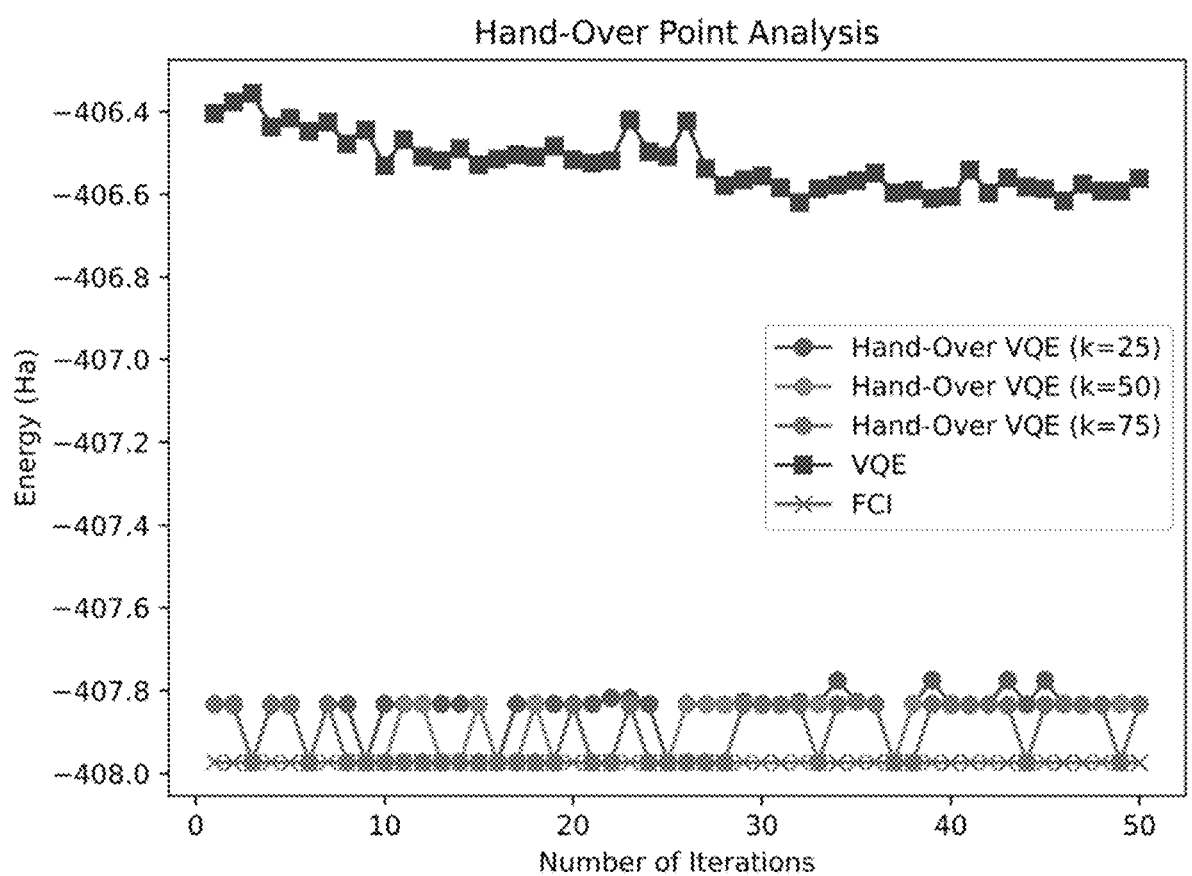
Figure 11F:
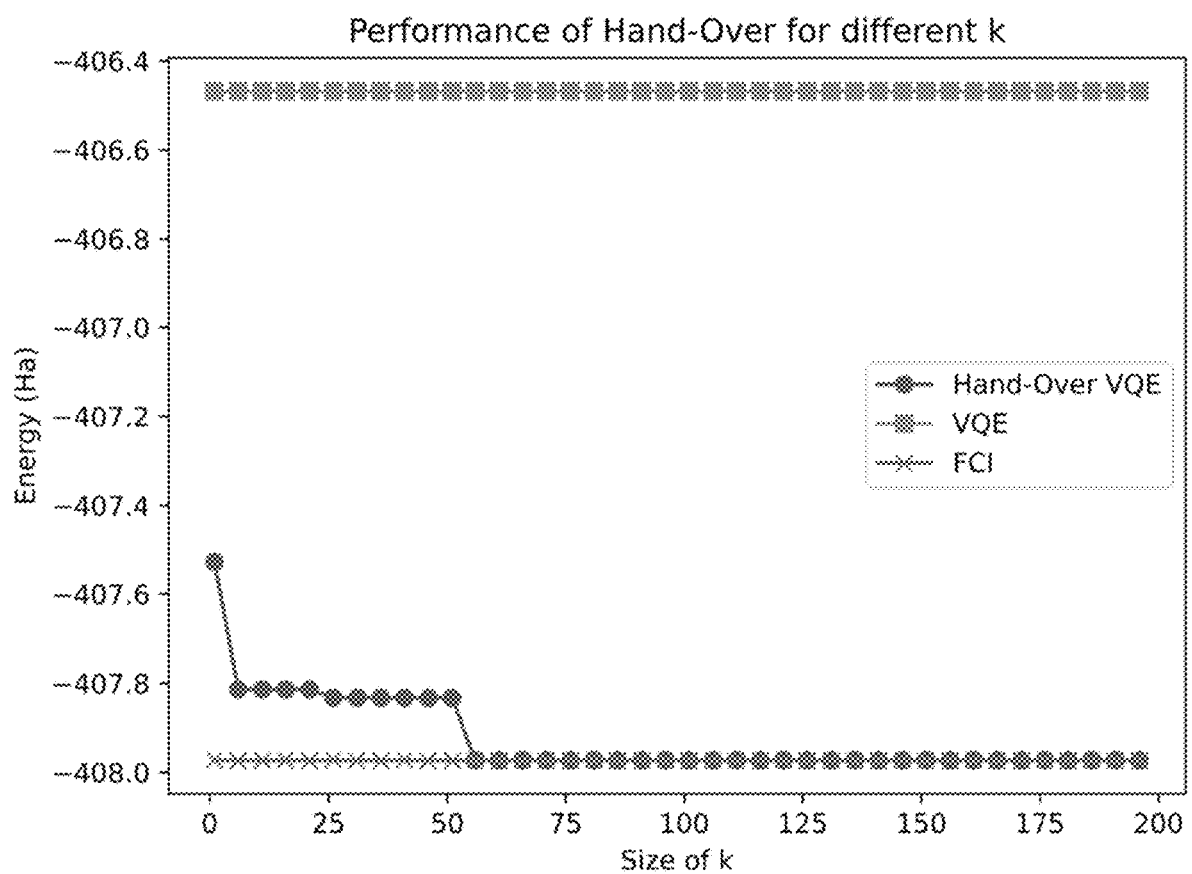

Energy of $Li_2S$ with No Noise Model FIGS. 11D-11F illustrate analysis of the chemical system of lithium sulfide ($Li_2S$) with the quantum states developed using a quantum computer simulator with 10 qubits, six electrons, STO-3G basis set, and with no noise model applied.

Description of Plots in FIGS. 11A-11F

Regardless of whether a noise model is applied or not, and regardless of the value selected for K, the values that are computed solely via a quantum computing simulator system are shown to be less accurate compared to the values calculated via handover. As shown in FIGS. 11A-11F, the calculated energy value from traditional VQE ranges from approximately −406.25 Hartree (Ha) to −406.75 Ha with a noise model and −406.25 Ha to −406.6 Ha with no noise model applied, whereas the calculated energy value from handover ranges from approximately −407.8 Ha to −408.0 Ha with a noise model and −407.75 Ha to −408.0 Ha with no noise model applied. The VQE-calculated values consistently display a greater difference (and therefore greater inaccuracy) to the ideal FCI values that the handover-calculated values display.

Accuracy Improvements

This improvement in accuracy is due, at least in part, to the classical computing systems that the calculations are handed off to being free of quantum noise. As the subspace Hamiltonian is constructed using the K basis states sampled from the state prepared by the VQE, the classical computing system is able to use the initial accuracy (and speed) of the VQE as inputs, and then complete the calculations in an environment unaffected by quantum noise to reach a more accurate eigensolution where the eigensolution may otherwise be constrained in accuracy by the magnitude of noise. Accordingly, even at low values of K, the hybrid computing system using handover outperforms the traditional VQE systems. However, as the value of K increases, the output of the hybrid system using handover approaches the accuracy offered by FCI systems.

Handover Procedure

Beneficially, because the subspace Hamiltonian is constructed from the matrix elements of the full Hamiltonian using the K selected basis states, the subspace minimum energy cannot be lower than the actual minimum energy. Accordingly, even though higher values of K generally produce more accurate eigensolutions (as increasing K approaches the exact solution with classical methods), handover allows for even lower values of K to reliably produce "upper bound" eigensolutions (where the actual eigensolution is known to be equal to or less than the produced eigensolution) that still provide useful data. Though increasing K improves the accuracy of the eigensolution in the general case, the number of basis states important to the eigensolution are not increasing; rather, increasing K increases the likelihood that these states are included in the selection. Thus, with the use of a very effective selection protocol, an operator can construct a subspace Hamiltonian with a much smaller K that also provides highly accurate eigensolutions. As shown experimentally (see e.g., FIGS. 11A-11F), even these "upper bound" eigensolutions are typically more accurate than the eigensolutions that other, more computationally expensive operations, such as quantum VQE, can produce.

When to Perform the Handover Procedure

The handover procedure is performed after the VQE, but exactly when to perform the hand over is not well defined. The hand over procedure needs to be able to sample basis states (the bitstrings) from the quantum state prepared by the VQE (or any other quantum computing method). The greater the number of relevant basis states that are sampled, the better the hand over procedure will be. It is often not clear when this point is; however, there is no limit in the number of times hand over can be attempted, so one may be able to perform the first step of hand over, the sampling of the basis states, and make a determination on whether enough basis states have been sampled to successfully perform the rest of the hand over. The first step of hand over is the least resource intensive. One may also perform the entire hand over procedure and, if the resulting solution is not good enough, they can continue with the quantum state optimization where they left off, and apply a hand over again later.

Benefits of Handover

By performing handover operations as described in the present disclosure, an operator is given greater flexibility in examining and modifying the chemical system. The operator may choose several points in the process to iterate from, allowing the operator to selectively conserve computing resources to produce a more accurate computation of eigensolutions than traditional computational processes.

Classical Computing Device

Figure 12:
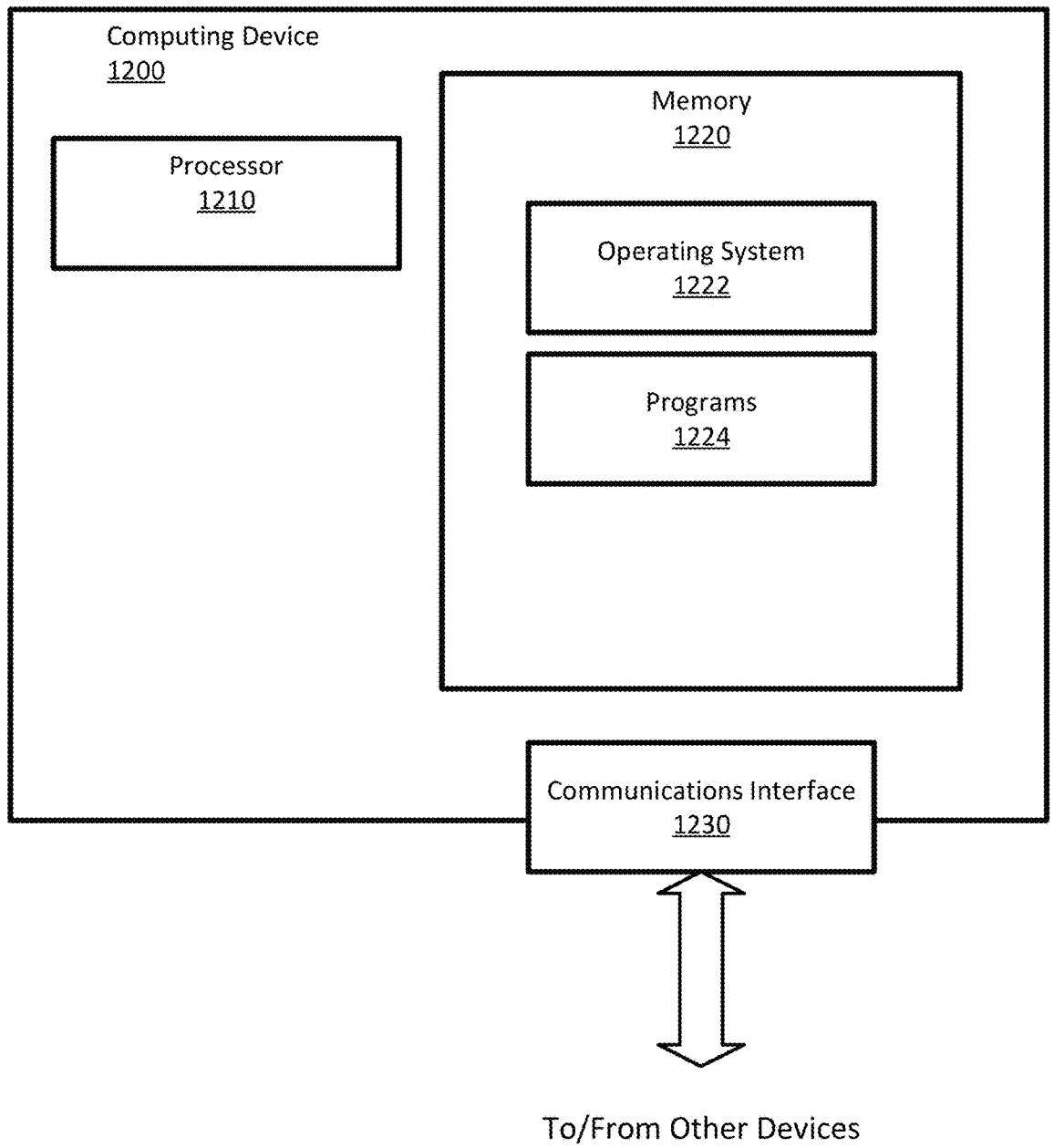
FIG. 12 illustrates a classical computing device, according to embodiments of the present disclosure.

FIG. 12 illustrates a classical computing device 1200, according to embodiments of the present disclosure. The classical computing device 1200 may include a processor 1210, a memory 1220, and a communication interface 1230.

Processor

The processor 1210 may be any processing unit capable of performing the operations and procedures described in the present disclosure according to directions or instructions. In various embodiments, the processor 1210 can represent a single processor, multiple processors, a processor with multiple cores, and combinations thereof.

Memory

The memory 1220 is an apparatus that may be either volatile or non-volatile memory and may include RAM, flash, cache, disk drives, and other computer readable memory storage devices. Although shown as a single entity, the memory 1220 may be divided into different memory storage elements such as RAM and one or more hard disk drives. As used herein, the memory 1220 is an example of a device that includes computer-readable storage media, and is not to be interpreted as transmission media or signals per se.

Inclusion of Executable Instructions in Memory

As shown, the memory 1220 includes various instructions that are executable by the processor 1210 to provide an operating system 1222 to manage various features of the classical computing device 1200 and one or more programs 1224 to provide various functionalities to users of the classical computing device 1200, which include one or more of the features and functionalities described in the present disclosure.

Programming Choices do not Require Undue Experimentation

One of ordinary skill in the relevant art will recognize that different approaches can be taken in selecting or designing a program 1224 to perform the operations described herein, including choice of programming language, the operating system 1222 used by the classical computing device 1200, and the architecture of the processor 1210 and memory 1220. Accordingly, the person of ordinary skill in the relevant art will be able to select or design an appropriate program 1224 based on the details provided in the present disclosure.

Peripheral Devices

The communication interface 1230 facilitates communications between the classical computing device 1200 and other devices, which may also be computing devices as described in relation to FIG. 12. In various embodiments, the communication interface 1230 includes antennas for wireless communications and various wired communication ports. The classical computing device 1200 may also include or be in communication, via the communication interface 1230, one or more input devices (e.g., a keyboard, mouse, pen, touch input device, etc.) and one or more output devices (e.g., a display, speakers, a printer, etc.).

Networking Computing Devices Together

Although not explicitly shown in FIG. 12, it should be recognized that the classical computing device 1200 may be connected to one or more public and/or private networks via appropriate network connections via the communication interface 1230. It will also be recognized that software instructions may also be loaded into a non-transitory computer readable medium, such as the memory 1220, from an appropriate storage medium or via wired or wireless means.

Restatement of Classical Computing Device

Accordingly, the classical computing device 1200 is an example of a system that includes a processor 1210 and a memory 1220 that includes instructions that (when executed by the processor 1210) perform various embodiments of the present disclosure. Similarly, the memory 1220 is an apparatus that includes instructions that, when executed by a processor 1210, perform various embodiments of the present disclosure.

Quantum Computing Device

Figure 13:
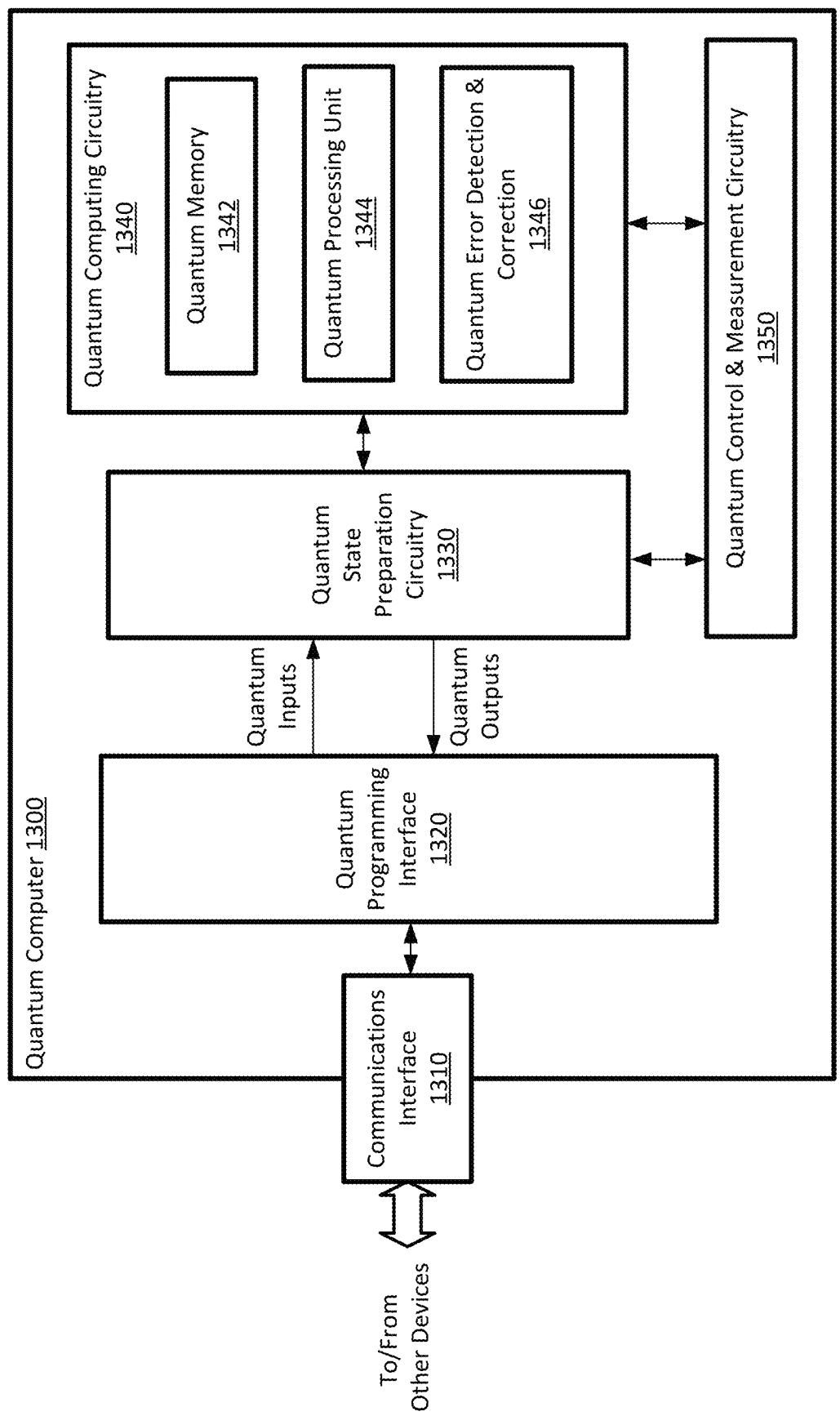
FIG. 13 illustrates a quantum computing device, according to embodiments of the present disclosure.

FIG. 13 illustrates a quantum computing device 1300, according to embodiments of the present disclosure. The quantum computing device 1300 may include at least a communications interface 1310, a quantum programming interface 1320, a quantum state preparation circuitry 1330, a quantum computing circuitry 1340, and a quantum control and measurement circuitry 1350.

Communications Interface

The communications interface 1310 facilitates communications between the quantum computer 1300 and other devices, which may include a classical computer (e.g., such as the classical computing device 1200 discussed in relation to FIG. 12 when providing a client accessing the quantum computing device 1300 for a quantum application). In various embodiments, the communications interface 1310 includes antennas for wireless communications and various wired communication ports. The classical computer pre-processes and sends input data (e.g., parameters, configurations, etc.) to the quantum computing device 1300, retrieves and post-processes output data from the quantum computing device 1300, and finally interprets and presents results to end users.

Quantum Computers

Quantum computers are designed to solve problems that classical computers cannot solve efficiently by harnessing the laws of quantum mechanics. Although still in the early stages, quantum computers demonstrate great promises in boundless potential applications, including cryptography, artificial intelligence, drug discovery, material science, scientific research and simulations, and countless other fields. Quantum computers and classical computers differ fundamentally in underlying principles, computational models, and capabilities. Unlike classical computers, which process information in bits that can only represent one of two binary states at a time with a deterministic logic, quantum computers process information in a plurality of quantum bits (qubits) that can represent a coherent superposition of both binary states at the same time. In addition, two or more qubits may be entangled with each other, leading to highly correlated quantum states to enable massive quantum parallelism so that a vast number of operations can be performed simultaneously. Quantum computers can further use quantum interference to amplify the probability of obtaining correct results and suppress the probability of obtaining wrong results. Compared to classical computers, quantum computers have the potential to achieve exponentially faster calculation speeds, and address extremely complex problems with high accuracy that is beyond the capability of today's most powerful (classical) supercomputers.

Quantum Computer Hardware

The hardware used to provide the qubits may vary in different embodiments to match the application requirements for a given quantum computing device. In some embodiments, the qubits encode the quantum states via photons (polarization), coherent states of light, electrons (spin), a nucleus of an atom or chemical compound, a trapped ion, quantum dots, and the like, many of which are still being developed. The illustrated quantum computing device 1300 is therefore provided as a general purpose representation of a quantum computing device 1300 that may implement qubits and affect state changes therein via various hardware technologies.

Context

Although not explicitly shown in FIG. 13, the present disclosure contemplates that the quantum computing device 1300 may be connected to one or more public and/or private networks via appropriate network connections via the communications interface 1310. The present disclosure also contemplates that software instructions may also be loaded into a non-transitory computer readable medium, from an appropriate storage medium or via wired or wireless means.

Quantum Programming Interface

The quantum programming interface 1320 defines a common quantum programming interface for different clients through a set of application programming interfaces (APIs) created by quantum programming software. The quantum programming interface 1320 provides a representation of the underlying quantum hardware details, which enables clients to access the resources of the quantum computing device 1300 regardless of the specific hardware implementations (e.g., client agnostic quantum computing). As illustrated in FIG. 13, by using the quantum programming interface 1320, at the beginning of quantum processing, quantum inputs are generated, which represent properly formatted data suitable for further quantum computing, and at the end of quantum processing, the quantum output data are converted to client readable format and sent to the client through the communications interface 1310.

Quantum State Preparation Circuitry

The quantum state preparation circuitry 1330 further encodes the quantum inputs to generate quantum states, which represent the initial states of qubits, such as superposition, entanglement, probability interpretation, and continuous evolution. Quantum states encode the information and properties of the quantum system, govern the behavior of physical elements, and form a basis for quantum algorithms.

Quantum Computing Circuitry

The quantum computing circuitry 1340 implements quantum algorithms and performs quantum computations using quantum gates driven according to the quantum states. The quantum computing circuitry further includes a quantum memory 1342, a quantum processing unit 1344 and a quantum error detection and correction 1346.

Quantum Memory

The quantum memory 1342 stores and preserves multiple quantum states in various superposition arrangements for a certain period of time. The quantum processing unit 1344 is an integral part which works on the quantum computer principles to accomplish the task based on quantum mechanics. The quantum processing unit 1344 also stores the state of computations in terms of quantum mechanical states and uses quantum buses to communicate amongst various other units of the quantum computer 1300. The quantum error detection and correction 1346 locates and corrects errors that exist during the operations of the quantum computing due to noise and decoherence.

Quantum Control and Measurement Circuitry

As illustrated in FIG. 13, the quantum control and measurement circuitry 1350 controls and monitors the operations of the quantum state preparation circuitry 1330 and the quantum computing circuitry 1340 to assists in error detection and correction process. At the end of quantum computing, the quantum control and measurement circuitry 1350 measures the results so quantum outputs are available to be converted to client readable formats using the quantum programming interface 1320 and provided to client through the communications interface 1310.

Overall Operation

Accordingly, the quantum computer 1300 is an example of a system that includes a quantum programming interface 1320 and a set of quantum circuitries (1330, 1340 and 1350) to accomplish a complex quantum computing task received from a client through a communication interface 1310.

Description of Quantum Computations

System Energy

Given a Hamiltonian H and a state $|\psi\rangle$, it is possible to compute the value of a number e on a quantum computer. When H gives the description of a system's energy, and $|\psi\rangle$ the state of the system, then the calculated value e, gives the energy of the system defined by H in that state $|\psi\rangle$. This is known as the expectation value of $|\psi\rangle$ on H, and is written mathematically as in Formula 1.

$$\langle\psi|H|\psi\rangle \quad \text{[Formula 1]}$$

State Relationship to Theta (θ)

On a quantum computer, it is possible to create a state $|\psi(\theta)\rangle$, where the value of the state, or rather the vector that defines the state, is dependent on the value of some parameters given by θ. The minimization of the expectation value of $|\psi(\theta)\rangle$ on H with respect to the parameters θ may be represented according to Formula 2.

$$\min_\theta \langle\psi(\theta)|H|\psi(\theta)\rangle \quad \text{[Formula 2]}$$

Explanation of Formula 2

In Formula 2, the value of θ is selected in order to minimize $\langle\psi(\theta)|H|\psi(\theta)\rangle$, or rather, the energy of the system H in the state $|\psi(\theta)\rangle$, which is generally how a Variational Quantum Eigensolver (VQE) works; updating the values of θ in order to minimize the energy e. The final result is the minimum energy value e (that the VQE can achieve) as well as the values of θ (θ is a vector of parameters). Once these parameters are obtained, the state $|\psi(\theta)\rangle$ can be recreated with ease for use in a further algorithms.

State as a Vector

The quantum computer creates the state $|\psi(\theta)\rangle$, which can be defined as a vector of exponential complexity (length) to the number of qubits. The quantum device is very efficient at creating and storing these large vectors (e.g., relative to classical computers), and that is why the quantum device can be so powerful in performing these calculations. For even moderate qubit numbers, these vectors are beyond what a classical computer could store or process. This vector is "stored" in a quantum superposition, so it is impossible to view the vector in any way besides sampling.

Example State Using 4 Qubits

For example, when working with n=4 qubits, the state on the quantum computer $|\psi(\theta)\rangle$ can be expressed as a vector, as set forth in Formula 3.

$$|\psi(\theta)\rangle = \alpha_1|0000\rangle + \alpha_2|0001\rangle + \alpha_3|0010\rangle + \ldots + \alpha_{2^n}|1111\rangle \quad \text{[Formula 3]}$$

The vectors $|0000\rangle, |0001\rangle, \ldots, |1111\rangle$ are known as basis states, and any state (or vector) can be built as a linear combination of these states, and these basis states can be represented by what are known as "one-hot vectors". For example, in Formula 4:

$$|0000\rangle = \begin{pmatrix} 1 \\ 0 \\ 0 \\ \ldots \\ 0 \end{pmatrix}, |0000\rangle = \begin{pmatrix} 0 \\ 1 \\ 0 \\ \ldots \\ 0 \end{pmatrix}, \ldots |1111\rangle = \begin{pmatrix} 0 \\ 0 \\ 0 \\ \ldots \\ 1 \end{pmatrix} \quad \text{[Formula 4]}$$

Minimum Energy Assumptions

The "one-hot vectors" can be used to represent the true minimum energy that can be given by the state $|\psi_{GS}\rangle$ (where GS refers to the ground state or true minimum energy state) shown in Formula 5, which is the desired state to create, and may be represented in vector form as shown in Formula 6.

$$|\psi_{GS}\rangle = \omega_1|0000\rangle + \omega_2|0001\rangle + \omega_3|0010\rangle + \ldots + \omega_{2^n}|1111\rangle \quad \text{[Formula 5]}$$

$$|\psi_{GS}\rangle = \omega_1\begin{pmatrix} 1 \\ 0 \\ 0 \\ \ldots \\ 0 \end{pmatrix} + \omega_2\begin{pmatrix} 0 \\ 1 \\ 0 \\ \ldots \\ 0 \end{pmatrix} + \ldots + \omega_{2^n}\begin{pmatrix} 0 \\ 0 \\ 0 \\ \ldots \\ 1 \end{pmatrix} = \begin{pmatrix} \omega_1 \\ \omega_2 \\ \omega_3 \\ \ldots \\ \omega_{2^n} \end{pmatrix} \quad \text{[Formula 6]}$$

Quantum State Sampling

When the quantum state (shown in Formula 3) is sampled, only one single basis state $|b_i\rangle$ is returned, as according to the Born rule. For example, the returned state could be state $|0010\rangle$, with the probability $|\alpha_i|^2$, for example $|\alpha_3|^2$. From repeated samples, an operator is able to see which basis states have the greatest magnitude $\alpha_i$ values.

Obstacles to State Creation

However, in practice, there are many obstacles to creating the state shown in Formula 5 on a quantum computer. These obstacles include the general difficulty of the optimization (local minima) and levels of noise on the quantum device. Assuming that the quantum computer converges to a state $|\psi(\theta^*)\rangle$, and that the quantum computer is tasked to optimize the state further towards the true minimum energy state, $|W_{GS}\rangle$, most of the $\omega_i$ values are 0, or are so close to 0 that setting those values to 0 has little effect on the energy value achieved by the state.

Assuming that the State is Sparse

Accordingly, by using this assumption that the state is sparse (or assuming that the state can be very well approximated with a sparse state), the problem can be shifted to determining which of the $\omega_i$ values are significantly non-zero (or otherwise significant) and then solving for the correct $\omega_i$ values for the determined/selected elements $|b_i\rangle$.

Sampling to Identify States with Significantly Non-Zero Amplitudes

Since the quantum computer has created a good approximate state $|\psi(\theta^*)\rangle$, by initially running an algorithm such as VQE, the classical computer can use this state to extract the required information to continue the calculations using classical computing resources. The classical computer samples this state for information about which basis states are most likely to have significantly non-zero $\omega_i$ values (these $\omega_i$ values can also be called amplitudes). An operator may, in theory, sample any number of basis states, and generally the larger the number of samples the more accurate the results are as the larger sample size increases the likelihood of capturing the basis states with non-zero amplitudes. However, operators are typically limited in practice for the number of samples that can be taken by time and space (e.g., qubits), especially for larger problems.

Sampling Produces a Representative Approximation for Sparse States

Assuming that $|\psi(\theta^*)\rangle$ is a good approximation of $|\psi_{GS}\rangle$ and that the probability of sampling a particular basis state is given by the square of the magnitude of that state's amplitude, then those basis states with the largest amplitudes will have the largest probability of being sampled during the sampling operations. Accordingly, with a sufficient number of samples, all of the basis states that had a large enough amplitude in the approximate state $|\psi(\theta^*)\rangle$ created by the quantum computer can reasonably be identified. As will be appreciated, these samples are qualitative, not quantitative as only the values of the basis states are important to obtain; the sampling statistics and particular methodologies used in sampling are less important, although the statistics could play a role in some adaption of the algorithm, like sorting the basis states, or screening the basis states if that is desired.

Implications for Handover

When $|\psi(\theta^*)\rangle$ is a good approximation of $|\psi_{GS}\rangle$ the quantum computer can hand over operations to the classical computer, because the reduction in the number of basis states allows the calculations be performed by the classical computer and the values of the basis states are provided by the quantum computer. Hand over works because the quantum computer is good at finding the basis states that have large amplitudes, but noise and quantum uncertainty in the quantum computer prevents the quantum computer from reliably providing the precise amplitude values used for $|\psi_{GS}\rangle$ (at the moment). Accordingly, classical post-processing comes in at this point to overcome the limitations of the quantum computer after the quantum computer has overcome the limitations of the classical computer.

Reducing a Full Hamiltonian to a Subspace Hamiltonian

Once a set of basis states is sampled, the Hamiltonian H is then reduced to a subspace Hamiltonian that just includes the matrix elements relevant to those basis states, and the dimension of the problem is reduced to be small enough to solve classically. The order of the basis states in construction of the subspace Hamiltonian is not of importance, as long as the chosen ordering for the rows and the columns is consistent between the subspace Hamiltonian and the full Hamiltonian H.

Classical Solution Improves on Quantum Solution

The classical solution output by hand over is indeed an approximation of the exact solution, but the approximation gives an energy much closer to the actual solution than is possible with the quantum device alone. Stated differently, the quantum device is used to help reduce the problems size to only those basis states that are significant, and then a very good approximate solution is found classically only taking those significant basis states into account. It is also proven to be impossible that this subspace minimum energy be lower than the actual minimum energy.

Summary of Classically-Boosted VQE

As will be understood, Classically-Boosted VQE can be summarized as a method used to boost the performance of the quantum state produced by the VQE by incorporating additional classical states into the calculation, and allowing the target ground state to be given as a combination of both the quantum and (optionally many) classical states. The hand over procedures provided by the present disclosure differ may also be classically-boosted or include other third-party provided basis state values, but different from conventional classically-boosted methodologies as will be apparent from a detailed reading of the disclosure.

Representation of Classically-Boosted Solution

For example, Formula 8 may represent a classically-boosted solution, where $|\psi_{CB}\rangle$ is the Classically-Boosted solution, $|\psi_{VQE}\rangle$ is the quantum state, and $|C_i\rangle$ are the classical states that are used to boost the solution.

$$|\psi_{GS}\rangle \approx |\psi\text{CB}\rangle = \sigma_0|\psi_{VQE}\rangle + \sigma_1|C_1\rangle + \sigma_2|C_2\rangle + \ldots + \sigma_k|C_k\rangle \quad \text{[Formula 8]}$$

Summary of Handover VQE

In contrast, Handover VQE can be summarized as a method which assumes the ground state can be well approximated by a sparse state (this assumption is not made in Classically-Boosted VQE) and then uses the quantum state optimized by the VQE to find which states are likely to have non-negligible contributions, through sampling of the quantum state. The labels (basis states) of non-negligible states are then used to reduce the ground state problem to one that is classically tractable on a classical computer, and the approximated ground state is solved classically. The problem becomes classically tractable because the ground state is approximated using only those states sampled, making the problem smaller in terms of time and memory requirements.

Representation of Handover Solution on Quantum Computer

The original VQE problem is to create the state $|\psi_{GS}\rangle$, as shown in Formula 5, on the quantum device.

This state must be created on the quantum device because the problem is classically intractable. The VQE creates $|\psi_{VQE}\rangle$ and the quantum computer samples some basis states from this, being a set $\{|b1\rangle, |b2\rangle, \ldots, |bk\rangle\}$. An example of this set could be $\{|0011\rangle, |1010\rangle, |0101\rangle\}$, and the ground state is then constructed as shown in Formula 9.

$$|\psi_{GS}\rangle \approx |\psi_{HandOver}\rangle = \sigma_1|b_1\rangle + \sigma_2|b_2\rangle + \ldots + \sigma_k|b_k\rangle \quad \text{[Formula 9]}$$

Improvements Offered by Handover VQE Over Classically-Boosted VQE

Accordingly, although hand over may include a VQE, as do classically-boosted solutions, the use of a sparse state of the sampled non-zero (or other measure of significance) basis states uniquely allows transfer of the calculations between the quantum and classical computers in a hybrid computing system, thereby improving the functionality of the overall system, reducing the computational resources required by conventional computing systems, improving the speed and accuracy of the calculations performed, among other technical improvements and benefits.

Differences in State Preparation on the Quantum Device in Handover VQE

Rather than preparing a rough approximation of the target state on the quantum device, handover VQE instead prepares states which offer good distributions of important basis states from which samples can be taken. To illustrate this point for ground states, a state that would be satisfactory for the handover VQE methodology is the equal superposition of the K important basis states, which facilitates the sampling of the important basis states. Traditional analysis methodologies teach against using such a state as this state is acknowledged to not be a good approximation of the ground state.

Differences Offered in Control in Handover VQE

VQE handover allows operators to apply selection heuristics that further reduce the pool of candidate basis states beyond merely controlling for electron number and total spin, which are not developed in the previous arts. Additionally, several control loops are defined in the VQE handover process that allows for feedback to enter into the analysis process. Rather than being constrained to building up (e.g., gradually increasing the size) of the quantum circuit that prepares the state for analysis or starting an analysis over from the beginning, the several control loops in the handover VQE process allows the structure of the quantum circuit used to remain unchanged. Rather, the parameters of the quantum circuit are modified and the initial state upon which the quantum circuit acts can also be modified with each iteration.

Improvements Offered by Handover VQE Over Other Hybrid Approaches

By performing Handover VQE as described in the present disclosure, the hybrid system is able to adjust the computational load between the quantum and classical computing systems through a fast iterative process. Results obtained in earlier iterations may be reused in later iterations, further increasing the speed of analysis, and preserving computational resources. Unlike other approaches, in handover VQE manual intervention from an operator is not needed to reset the hybrid system when an initially selected value for how many basis states (K) to include in a subspace Hamiltonian is deemed computationally excessive for the classical computing system to solve for, or when the operator chooses to use a different selection protocol for choosing which basis states from the full Hamiltonian should make up the K basis states in the subspace Hamiltonian. Because these choices are made via the classical computing system using already-processed data from the quantum computing system, the iterations may be performed classically despite being able to yield different eigensolutions, thereby further conserving quantum computing resources while examining or testing the solution results.

Additional Understanding of Combinations of Embodiments

In addition to the embodiments described above, many examples of specific combinations are within the scope of the disclosure, some of which are detailed below:

Clause 1:

A method with improved computational system efficiency and accuracy in calculating Hamiltonian eigensolutions, comprising: selecting K basis states from an ansatz space of a chemical system, wherein: the ansatz space consists of a subset of basis states from a whole basis space of the chemical system that are sample-able from a single parameterized quantum circuit on the quantum computer system, the whole basis space consists of every basis state to describe the chemical system, the K basis states are selected according to a selection protocol to define a core space for the chemical system, wherein the selection protocol identifies individual basis states from the ansatz space to include in the core space using at least one selection criterion other than a fixed-K-greatest selection protocol in which the individual basis state would be selected to be among the K basis states based on a magnitude of a probability of the individual basis state being among the K-highest probabilities in the ansatz space; computing, via an eigensolver, an eigensolution for the chemical system from the core space; and outputting the eigensolution for the chemical system.

Clause 2:

The method of any of clauses 1-22, wherein selecting the K basis states further comprises: selecting an initial set of $K_{selected}$ basis states from the ansatz space to define a first portion of the core space for the chemical system and are fewer in number than a set of $K_{desired}$ basis states to define the core space; and selecting a supplemental set of $K_{supplemental}$ basis states from a symmetry space of the chemical system, wherein the symmetry space includes fewer basis states than the whole basis space for the chemical system, to define a remainder of the core space, in which each basis state of the $K_{supplemental}$ basis states is not a member of the $K_{selected}$ basis states and $K_{supplemental} + K_{selected} = K_{desired}$.

Clause 3:

The method of any of clauses 1-22, wherein selecting the K basis states further comprises: selecting an initial set of $K_{selected}$ basis states from the ansatz space, wherein the $K_{selected}$ define the core space for the chemical system and are greater in number than a set of $K_{desired}$ basis states to define the core space; selecting a removal set of $K_{removal}$ basis states from the set of $K_{selected}$ basis states in which $K_{selected} - K_{removal} = K_{desired}$; and removing the $K_{removal}$ basis states from the $K_{selected}$ basis states to yield the set of $K_{desired}$ basis states from which to calculate the eigensolution.

Clause 4:

The method of any of clauses 1-22, wherein the K basis states are selected according to an electron preserving selection protocol to define the core space; wherein the electron preserving selection protocol selects a given basis state from the ansatz space to include in the K basis states when the given basis state is represented by a bitstring that contains an equivalent number of 1's as there are electrons being considered in computing the eigensolution for the chemical system.

Clause 5:

The method of any of clauses 1-22, wherein the K basis states are selected according to an alpha beta electron preserving selection protocol to define the core space for the chemical system; wherein the alpha beta electron preserving selection protocol selects a given basis state from the ansatz space to include in the K basis states when the given basis state is represented by a bitstring that contains an equivalent number of 1's in corresponding alpha positions as there are electrons in alpha orbitals and an equivalent number of 1's in corresponding beta positions as there are electrons in beta orbitals being considered in computing an eigensolution for the chemical system.

Clause 6:

The method of any of clauses 1-22, wherein the K basis states are selected according to an overlap partition selection protocol with partition bias to define the core space for the chemical system, wherein the overlap partition selection protocol selects a given basis state from the ansatz space to include in the K basis states by: constructing a graph that includes a plurality of nodes, wherein each node corresponds to one basis state of the ansatz space; adding a plurality of edges between the plurality of nodes of the graph, wherein each edge of the plurality of edges is defined between two nodes in the graph, the two nodes representing two basis states $|b_1\rangle$ and $|b_2\rangle$, where $\langle b_1|H|b_2\rangle$ is non-zero; and selecting all nodes from the plurality of nodes that are connected by one or more edges to a reference node according to a partition bias that omits any node from the plurality of nodes from selection that cannot be linked to the reference node via one or more edges.

Clause 7:

The method of any of clauses 1-22, wherein the K basis states are selected according to an overlap partition selection protocol with breadth-first bias to define the core space, wherein the overlap partition selection protocol selects a given basis state from the ansatz space to include in the K basis states by: constructing a graph that includes a plurality of nodes, wherein each node corresponds to one basis state of the ansatz space; adding a plurality of edges between the plurality of nodes of the graph, wherein each edge of the plurality of edges is defined between two nodes in the graph, the two nodes representing two basis states $|b1\rangle$ and $|b_2\rangle$, where $\langle b_1|H|b_2\rangle$ is non-zero; and selecting nodes from the plurality of nodes starting from a reference node according to a breadth-first bias that prioritizes selection of nodes that are separated from the reference node by a lower number of edges over nodes that are separated from the reference node by a larger number of edges until K nodes have been selected or all edges have been traversed.

Clause 8:

The method of any of clauses 1-22, wherein the K basis states are selected according to an overlap partition selection protocol with best-first bias to define the core space, wherein the overlap partition selection protocol selects a given basis state from the ansatz space to include in the K basis states by: constructing a graph that includes a plurality of nodes, wherein each node corresponds to one basis states of the ansatz space; adding a plurality of edges between the plurality of nodes of the graph, wherein each edge of the plurality of edges is defined between two nodes in the graph, the two nodes representing two basis states $|b_1\rangle$ and $|b_2\rangle$, where $\langle b_1|H|b_2\rangle$ is non-zero; assigning a heuristic score to each node; and selecting nodes from the plurality of nodes starting from a reference node and one or more subsequently selected nodes according to a best-first bias that selects nodes, connected by a single edge to the reference node or subsequently selected nodes, with higher values of the heuristic scores over nodes with lower values of the heuristic scores until K nodes have been selected or all edges have been traversed.

Clause 9:

The method of any of clauses 1-22, wherein the K basis states are selected according to an iterative contribution-based selection protocol to define the core space from the ansatz space of N basis states, wherein the iterative contribution-based selection protocol by: applying an electron preserving selection protocol or an alpha beta electron preserving selection protocol to produce a set of S basis states, where K<S<N, that satisfy the electron preserving selection protocol or the alpha beta electron preserving selection protocol; performing a trial selection of the K basis states having highest probabilities from among the S basis states, thereby resulting in a set of K trial-selected basis states and a set of S-K remaining basis states; constructing, via a classical computing system, a subspace Hamiltonian $H_K$ with the K trial-selected basis states; computing, via an eigensolver, an eigensolution for the chemical system from the subspace Hamiltonian $H_K$; selecting M basis states from the K trial-selected basis states, where M<K, based on an amplitude $\alpha_i$ of each basis state of the K trial-selected basis states in the eigensolution, wherein the amplitude $\alpha_i$ indicates how much each basis state of the K trial-selected basis states contributes to the eigensolution; assigning a significance score to each basis state of the S-K remaining basis states that indicates how much each basis state of the S-K remaining basis states contributes to the eigensolution; selecting from the S basis states R basis states with the R highest significance scores, including at least one basis state not included in the K trial-selected basis states; and combining the M basis states with R basis states to thereby produce a set of K evaluated basis states to define the core space.

Clause 10:

The method of any of clauses 1-22, wherein selecting the K basis states further comprises: selecting an initial set of $K_1$ basis states from the ansatz space to define an initial core space for the chemical system; in response to determining that a number of the $K_1$ basis states selected is insufficient for the eigensolver to produce the eigensolution for the chemical system from the initial core space, determining a value for $K_2$ that is different from $K_1$; and selecting a set of $K_2$ basis states from the ansatz space of the chemical system, wherein the $K_2$ basis states are selected according to the selection protocol to define a second core space for the chemical system.

Clause 11:

The method of any of clauses 1-22, wherein selecting the K basis states further comprises: selecting an initial set of $K_1$ basis states from the ansatz space, wherein the K/basis states are selected according to an initial selection protocol to define an initial core space for the chemical system; in response to determining that a number of the $K_1$ basis states selected is insufficient for an eigensolver to produce an eigensolution for the chemical system from the initial core space; selecting a set of $K_2$ basis states from the ansatz space of the chemical system from which the initial set of $K_1$ basis states were selected, wherein the $K_2$ basis states are selected according to a second selection protocol, different from the initial selection protocol, to define a second core space for the chemical system; merging the initial core space and the second core space to define the core space as a union core space of the initial core space and the second core space.

Clause 12:
The method of any of clauses 1-22, wherein selecting the K basis states further comprises: selecting an initial set of $K_1$ basis states from an initial ansatz space of a chemical system according to the selection protocol to define an initial core space for the chemical system; in response to determining that a number of the $K_1$ basis states selected is insufficient for the eigensolver to produce the eigensolution for the chemical system from the initial core space; generating a second ansatz space corresponding to at least one basis state not included in the initial ansatz space; selecting a set of $K_2$ basis states from the second ansatz space of the chemical system, wherein the $K_2$ basis states are selected according to the selection protocol to define a second core space for the chemical system; and merging the initial core space and the second core space to define the core space as a union core space.

Clause 13:
The method of any of clauses 1-22, wherein selecting the K basis states further comprises: selecting K basis states from the ansatz space according to the selection protocol to define a first portion of the core space for the chemical system; and creating additional basis states outside of the ansatz space by swapping alpha values and beta values representing basis states in the ansatz space to define a second portion of the core space.

Clause 14:
The method of any of clauses 1-22, wherein the K basis states are selected according to the selection protocol to define a first portion of a core space for the chemical system, and selecting further comprises: constructing a randomly selected subset of basis states from a symmetry space for the chemical system, wherein the symmetry space includes fewer basis states than the whole basis space for the chemical system, that are not included in the ansatz space; calculating Hamming distances for the randomly selected subset of basis states; constructing a probability distribution based on the Hamming distances for the randomly selected subset of basis states; and sampling M basis states from the randomly selected subset of basis states according to the probability distribution to define a second portion of the core space.

Clause 15:
The method of any of clauses 1-22, wherein the K basis states are selected from an unsorted list of basis states included in the ansatz space based on having a probability value above a probability threshold.

Clause 16:
The method of any of clauses 1-22, wherein: the K basis states are one of m sets of basis states generated from the ansatz space of the chemical system, wherein each set of basis states of the m sets of basis states includes k basis states, wherein k differs for each set of basis states of the m sets of basis states; constructing m subspace Hamiltonians, each subspace Hamilton of the m subspace Hamiltonians corresponding to one set of basis states of the m sets of basis states; computing, via the eigensolver, m eigensolutions for the chemical system, each of the eigensolutions corresponding to one Hamilton of the m subspace Hamiltonians; computing, by the classical computer system, a weighted sum eigensolution for a full Hamiltonian of the chemical system from the m eigensolutions; and outputting the weighted sum eigensolution for the chemical system.

Clause 17:
The method of any of clauses 1-22, wherein the K basis states selected according to the selection protocol define an initial core space for the chemical system, the method further comprising: expanding, via a classical computer system, the initial core space to identify an expansion space based on basis states included in the initial core space, wherein the expansion space includes at least one basis state not included in the ansatz space; and merging the initial core space and the expansion space to define the core space as an expanded core space.

Clause 18:
The method of any of clauses 1-22, wherein merging the initial core space and the expansion space further comprises compressing one of the initial core space alone, the expansion space alone, or the expanded core space alone to include to include no more than K basis states.

Clause 19:
The method of any of clauses 1-22, wherein the K basis states selected from the ansatz space of the chemical system are a first set of K basis states selected from a first ansatz space to define the core space as a first core space, the method further comprising: computing, via the eigensolver, a first eigensolution for the chemical system from the first core space; in response to determining that the first eigensolution does not converge: preparing a second state for a trial wave function for the chemical system, wherein a structure of a quantum circuit that prepares the second state is altered relative to a structure of the quantum circuit that prepared the first state; generating, via the quantum computer system, a second ansatz space from the trial wave function according to the second state, wherein the second ansatz space includes fewer basis states than the whole basis space for the chemical system; selecting a second set of K basis states from the second ansatz space according to the selection protocol to define a second core space for the chemical system; computing, via the eigensolver, a second eigensolution for the chemical system from the second core space; and in response to determining that the second eigensolution does converge, outputting the second eigensolution for the chemical system.

Clause 20:
The method of any of clauses 1-22, wherein the fixed-K-greatest selection protocol is used as a secondary selection protocol with a different primary selection protocol.

Clause 21:
The method of any of clauses 1-22, further comprising: simulating, via a classical computer system, using the eigensolution, the chemical system in a state relative to a target chemical system; and determining a most stable configuration and properties of the chemical system.

Clause 22:
The method of any of clauses 1-22, wherein a value of K is selected based on a computational capacity of a classical computer system to construct a subspace Hamiltonian comprising K basis states in a K-by-K matrix to represent a full Hamiltonian of the chemical system.

Clause 23:
A method with improved computational system efficiency and accuracy in calculating Hamiltonian eigensolutions, comprising: selecting a first set of basis states from an ansatz space of a chemical system, wherein: the ansatz space consists of a subset of basis states from a whole basis space of the chemical system that are sample-able from a single parameterized quantum circuit on the quantum computer system, the whole basis space consists of every basis state to describe the chemical system, the basis states are selected for the first set according to a first selection protocol to define a first core space for the chemical system; computing, via an eigensolver, a first eigensolution for the chemical system from the first core space; in response to determining that the first eigensolution does not converge: selecting a second set of basis states to define a second core space for the chemical system; computing, via the eigensolver, a second eigensolution for the chemical system from the core space; and in response to the second eigensolution converging, outputting the second eigensolution for the chemical system.

Clause 24:

The method of any of clauses 23-38, wherein a first number of basis states selected for the first set differ in number from a second number of basis stated selected for the second set.

Clause 25:

The method of any of clauses 23-38, wherein a first number of basis states selected for the first set are equal in number to a second number of basis stated selected for the second set.

Clause 26:

The method of any of clauses 23-38, wherein the first selection protocol is selected from among: an electron preserving selection protocol; an alpha beta electron preserving selection protocol; an overlap partition selection protocol with partition bias; an overlap partition selection protocol with breadth-first bias; an overlap partition selection protocol with best-first bias; an iterative contribution-based selection protocol; a fixed-K-greatest selection protocol; and from an unsorted list of basis states included in the ansatz space based on having a probability value above a probability threshold.

Clause 27:

The method of any of clauses 23-38, wherein the second set is selected according to the first selection protocol.

Clause 28:

The method of any of clauses 23-38, wherein the second set is selected according to a second selection protocol different from the first selection protocol.

Clause 29:

The method of any of clauses 23-38, wherein selecting the first set of basis states further comprises: selecting an initial set of $K_{selected}$ basis states from the ansatz space to define a first portion of the first core space for the chemical system and are fewer in number than a set of $K_{desired}$ basis states to define the first core space; and selecting a supplemental set of $K_{supplemental}$ basis states from a symmetry space of the chemical system, wherein the symmetry space includes fewer basis states than the whole basis space for the chemical system, to define a remainder of the first core space, in which each basis state of the $K_{supplemental}$ basis states is not a member of the $K_{selected}$ basis states and $K_{supplemental}$+$K_{selected}$=$K_{desired}$.

Clause 30:

The method of any of clauses 23-38, wherein selecting the first set of basis states further comprises: selecting an initial set of $K_{selected}$ basis states from the ansatz space, wherein the $K_{selected}$ define the first core space for the chemical system and are greater in number than a set of $K_{desired}$ basis states to define the core space; selecting a removal set of $K_{removal}$ basis states from the set of $K_{selected}$ basis states in which $K_{selected}$-$K_{removal}$=$K_{desired}$; and removing the $K_{removal}$ basis states from the $K_{selected}$ basis states to yield the set of $K_{desired}$ basis states from which to calculate the first eigensolution.

Clause 31:

The method of any of clauses 23-38, wherein selecting the second set of basis states further comprises: generating a second ansatz space, different from the ansatz space from which the first set of basis states are selected.

Clause 32:

The method of any of clauses 23-38, wherein the second set of basis are selected from the ansatz space.

Clause 33:

The method of any of clauses 23-38, wherein: the first set of basis states and the second set of basis states are two of m sets of basis states generated from the ansatz space of the chemical system, wherein each set of basis states of the m sets of basis states includes k basis states, wherein k differs for each set of basis states of the m sets of basis states; constructing m subspace Hamiltonians, each subspace Hamilton of the m subspace Hamiltonians corresponding to one set of basis states of the m sets of basis states; computing, via the eigensolver, m eigensolutions for the chemical system, each of the eigensolutions corresponding to one Hamilton of the m subspace Hamiltonians, the first eigensolution and the second eigensolution being two of the m eigensolutions; computing, by a classical computer system, a weighted sum eigensolution for a full Hamiltonian of the chemical system from the m eigensolutions; and outputting the weighted sum eigensolution for the chemical system.

Clause 34:

The method of any of clauses 23-38, further comprising: expanding, via a classical computer system, the first core space to identify an expansion space based on basis states included in the first core space, wherein the expansion space includes at least one basis state not included in the ansatz space; and merging the first core space and the expansion space to define the first core space as an expanded core space.

Clause 35:

The method of any of clauses 23-38, further comprising: selecting K/basis states from the ansatz space to define a first portion of the first core space for the chemical system; creating additional basis states outside of the ansatz space to by swapping alpha values and beta values representing basis states in the ansatz space to define a second portion of the core space; and including the first portion and the second portion of the first core space when computing the first eigensolution.

Clause 36:

The method of any of clauses 23-38, further comprising: selecting K basis states from the ansatz space to define a first portion of a core space for the chemical system; constructing a randomly selected subset of basis states from a symmetry space for the chemical system, wherein the symmetry space includes fewer basis states than the whole basis space for the chemical system, that are not included in the ansatz space; calculating Hamming distances for the randomly selected subset of basis states; constructing a probability distribution based on the Hamming distances for the randomly selected subset of basis states; sampling M basis states from the randomly selected subset of basis states according to the probability distribution to define a second portion of the core space; and including the first portion and the second portion of the first core space when computing the first eigensolution.

Clause 37:

The method of any of clauses 23-38, further comprising: simulating, via a classical computer system using the second eigensolution, the chemical system in a state relative to a target chemical system; and determining a most stable configuration and properties of the chemical system.

Clause 38:

The method of any of clauses 23-38, wherein a number of basis states in the first set is $K_1$ wherein a value of $K_1$ is selected based on a computational capacity of a classical computer system to construct a subspace Hamiltonian comprising $K_1$ basis states in a $K_1$-by-$K_1$ matrix to represent a full Hamiltonian of the chemical system.

Clause 39:

A method with improved computational system efficiency and accuracy in calculating Hamiltonian eigensolutions, comprising: selecting a first set of K basis states from an ansatz space of a chemical system, wherein the ansatz space consists of a subset of basis states from a whole basis space of the chemical system that are sample-able from a single parameterized quantum circuit on the quantum computer system, wherein the whole basis space consists of every basis state to describe the chemical system, wherein the K basis states are selected according to a selection protocol to define a core space for the chemical system; computing, via an eigensolver, an eigensolution for the chemical system from the core space; and outputting the eigensolution for the chemical system.

Clause 40:

A method with improved computational system efficiency and accuracy in calculating Hamiltonian eigensolutions, comprising: selecting an initial set of $K_{selected}$ basis states from an ansatz space of a chemical system, wherein the ansatz space is generated by a quantum computer system and includes fewer basis states than a whole basis space for the chemical system, wherein the $K_{selected}$ basis states are selected according to a selection protocol to define a first portion of a core space for the chemical system and are fewer in number than a set of $K_{desired}$ basis states which defines a core space to calculate an eigensolution for the chemical system via an eigensolver; selecting a supplemental set of $K_{supplemental}$ basis states from a symmetry space of the chemical system, wherein the symmetry space includes fewer basis states than the whole basis space for the chemical system, to define a remainder of the core space, in which each basis state of the $K_{supplemental}$ basis states is not a member of the $K_{selected}$ basis states and $K_{supplemental}+K_{selected}=K_{desired}$; computing, via the eigensolver, an eigensolution for the chemical system from the core space; and outputting the eigensolution for the chemical system.

Clause 41:

A method with improved computational system efficiency and accuracy in calculating Hamiltonian eigensolutions, comprising: selecting an initial set of $K_{selected}$ basis states from an ansatz space of a chemical system, wherein the ansatz space is generated by a quantum computer system and includes fewer basis states than a whole basis space for the chemical system, wherein the $K_{selected}$ basis states are selected according to a selection protocol to define a first portion of a core space for the chemical system and are greater in number than a set of $K_{desired}$ basis states which defines a core space to calculate an eigensolution for the chemical system via an eigensolver; selecting a removal set of $K_{removal}$ basis states from the set of $K_{selected}$ basis states in which $K_{selected}-K_{removal}=K_{desired}$; removing the $K_{removal}$ basis states from the $K_{selected}$ basis states to yield the set of $K_{desired}$ basis states from which to calculate the eigensolution; computing, via the eigensolver, an eigensolution for the chemical system from the core space; and outputting the eigensolution for the chemical system.

Clause 42:

A method with improved computational system efficiency and accuracy in calculating Hamiltonian eigensolutions, comprising: selecting K basis states from an ansatz space of a chemical system, wherein the ansatz space is generated by a quantum computer system and includes N basis states sampled from a whole basis space for the chemical system in which K<N, wherein the K basis states are selected according to an electron preserving selection protocol to define a core space for the chemical system; wherein the electron preserving selection protocol selects a given basis state from the N basis states to include in the K basis states when the given basis state is represented by a bitstring that contains an equivalent number of 1's as there are electrons being considered in computing an eigensolution for the chemical system; computing, via an eigensolver, the eigensolution for the chemical system from the core space; and outputting the eigensolution for the chemical system.

Clause 43:

A method with improved computational system efficiency and accuracy in calculating Hamiltonian eigensolutions, comprising: selecting K basis states from an ansatz space of a chemical system, wherein the ansatz space is generated by a quantum computer system and includes N basis states sampled from a whole basis space for the chemical system in which K<N, wherein the K basis states are selected according to an alpha beta electron preserving selection protocol to define a core space for the chemical system, wherein the alpha beta electron preserving selection protocol selects a given basis state from the N basis states to include in the K basis states when the given basis state is represented by a bitstring that contains an equivalent number of 1's in corresponding alpha positions as there are electrons in alpha orbitals and an equivalent number of 1's in corresponding beta positions as there are electrons in beta orbitals being considered in computing an eigensolution for the chemical system; computing, via an eigensolver, the eigensolution for the chemical system from the core space; and outputting the eigensolution for the chemical system.

Clause 44:

A method with improved computational system efficiency and accuracy in calculating Hamiltonian eigensolutions, comprising: selecting K basis states from an ansatz space of a chemical system, wherein the ansatz space is generated by a quantum computer system and includes N basis states sampled from a whole basis space for the chemical system in which K<N, wherein the K basis states are selected according to an overlap partition selection protocol with partition bias to define a core space for the chemical system, wherein the overlap partition selection protocol selects a given basis state from the N basis states to include in the K basis states by: constructing a graph that includes a plurality of nodes, wherein each node corresponds to one basis state of the N basis states; adding a plurality of edges between the plurality of nodes of the graph, wherein each edge of the plurality of edges is defined between two nodes in the graph, the two nodes representing two basis states $|b_1\rangle$ and $|b_2\rangle$, where $\langle b_1|H|b_2\rangle$ is non-zero; and selecting all nodes from the plurality of nodes that are connected by one or more edges to a reference node according to a partition bias that omits any node from the plurality of nodes from selection that cannot be linked to the reference node via one or more edges; computing, via an eigensolver, the eigensolution for the chemical system from the core space; and outputting the eigensolution for the chemical system.

Clause 45:

A method with improved computational system efficiency and accuracy in calculating Hamiltonian eigensolutions, comprising: selecting K basis states from an ansatz space of a chemical system, wherein the ansatz space is generated by a quantum computer system and includes N basis states sampled from a whole basis space for the chemical system in which K<N, wherein the K basis states are selected according to an overlap partition selection protocol with breadth-first bias to define a core space for the chemical system, wherein the overlap partition selection protocol selects a given basis state from the N basis states to include in the K basis states by: constructing a graph that includes a plurality of nodes, wherein each node corresponds to one basis state of the N basis states; adding a plurality of edges between the plurality of nodes of the graph, wherein each edge of the plurality of edges is defined between two nodes in the graph, the two nodes representing two basis states $|b_1\rangle$ and $|b_2\rangle$, where $\langle b_1|H|b_2\rangle$ is non-zero; and selecting nodes from the plurality of nodes starting from a reference node according to a breadth-first bias that prioritizes selection of nodes that are separated from the reference node by a lower number of edges over nodes that are separated from the reference node by a larger number of edges until K nodes have been selected or all edges have been traversed; computing, via an eigensolver, the eigensolution for the chemical system from the core space; and outputting the eigensolution for the chemical system.

Clause 46:

A method with improved computational system efficiency and accuracy in calculating Hamiltonian eigensolutions, comprising: selecting K basis states from an ansatz space of a chemical system, wherein the ansatz space is generated by a quantum computer system and includes N basis states sampled from a whole basis space for the chemical system in which K<N, wherein the K basis states are selected according to an overlap partition selection protocol with best-first bias to define a core space for the chemical system, wherein the overlap partition selection protocol selects a given basis state from the N basis states to include in the K basis states by: constructing a graph that includes a plurality of nodes, wherein each node corresponds to one basis states of the N basis states; adding a plurality of edges between the plurality of nodes of the graph, wherein each edge of the plurality of edges is defined between two nodes in the graph, the two nodes representing two basis states $|b_1\rangle$ and $|b_2\rangle$, where $\langle b_1|H|b_2\rangle$ is non-zero; assigning a heuristic score to each node; and selecting nodes from the plurality of nodes starting from a reference node and one or more subsequently selected nodes according to a best-first bias that selects nodes, connected by a single edge to the reference node or subsequently selected nodes, with higher values of the heuristic scores over nodes with lower values of the heuristic scores until K nodes have been selected or all edges have been traversed; computing, via an eigensolver, the eigensolution for the chemical system from the core space; and outputting the eigensolution for the chemical system.

Clause 47:

A method with improved computational system efficiency and accuracy in calculating Hamiltonian eigensolutions, comprising: selecting K basis states from an ansatz space of a chemical system, wherein the ansatz space is generated by a quantum computer system and includes N basis states sampled from a whole basis space for the chemical system in which K<N, wherein the K basis states are selected according to an iterative contribution-based selection protocol to define a core space for the chemical system, wherein the iterative contribution-based selection protocol by: applying an electron preserving selection protocol or an alpha beta electron preserving selection protocol to produce a set of S basis states, where K<S<N, that satisfy the electron preserving selection protocol or the alpha beta electron preserving selection protocol; performing a trial selection of the K basis states having highest probabilities from among the S basis states, thereby resulting in a set of K trial-selected basis states and a set of S-K remaining basis states; constructing, via a classical computing system, a subspace Hamiltonian $H_K$ with the K trial-selected basis states; computing, via an eigensolver, an eigensolution for the chemical system from the subspace Hamiltonian $H_K$; selecting M basis states from the K trial-selected basis states, where M<K, based on an amplitude at of each basis state of the K trial-selected basis states in the eigensolution, wherein the amplitude at indicates how much each basis state of the K trial-selected basis states contributes to the eigensolution; assigning a significance score to each basis state of the S-K remaining basis states that indicates how much each basis state of the S-K remaining basis states contributes to the eigensolution; selecting from the S basis states R basis states with the R highest significance scores, including at least one basis state not included in the K trial-selected basis states; combining the M basis states with R basis states to thereby produce a set of K evaluated basis states to define the core space; computing, via an eigensolver, the eigensolution for the chemical system from the core space; and outputting the eigensolution for the chemical system.

Clause 48:

A method with improved computational system efficiency and accuracy in calculating Hamiltonian eigensolutions, comprising: selecting K basis states from an ansatz space of a chemical system, wherein the ansatz space is generated by a quantum computer system and includes N basis states sampled from a whole basis space for the chemical system in which K<N, wherein the K basis states are selected according to a fixed-K-greatest selection protocol to define a core space for the chemical system, wherein the fixed-K-greatest selection protocol sorts the N basis states based on a probability of the N basis states and selects the K basis states with highest probabilities from the N basis states to define the core space; computing, via an eigensolver, the eigensolution for the chemical system from the core space; and outputting the eigensolution for the chemical system.

Clause 49:

A method with improved computational system efficiency and accuracy in calculating Hamiltonian eigensolutions, comprising: selecting an initial set of $K_1$ basis states from an ansatz space of a chemical system, wherein the ansatz space is generated by a quantum computer system and includes fewer basis states than a whole basis space for the chemical system, wherein the K basis states are selected according to a selection protocol to define an initial core space for the chemical system; in response to determining that a number of the K/basis states selected is insufficient for an eigensolver to produce an eigensolution for the chemical system from the core space, determining a value for $K_2$ that is different from Kr; selecting a set of $K_2$ basis states from the ansatz space of the chemical system, wherein the $K_2$ basis states are selected according to the selection protocol to define a second core space for the chemical system; computing, via an eigensolver provided by at least one of the classical computer system, the quantum computer system, or the hybrid quantum-classical computer system, an eigensolution for the chemical system from the second core space; and outputting the eigensolution for the chemical system.

Clause 50:

A method with improved computational system efficiency and accuracy in calculating Hamiltonian eigensolutions, comprising: selecting an initial set of $K_1$ basis states from an ansatz space of a chemical system, wherein the ansatz space is generated by a quantum computer system and includes fewer basis states than a whole basis space for the chemical system, wherein the K/basis states are selected according to an initial selection protocol to define an initial core space for the chemical system; in response to determining that a number of the $K_1$ basis states selected is insufficient for an eigensolver to produce an eigensolution for the chemical system from the initial core space; selecting a set of $K_2$ basis states from the ansatz space of the chemical system from which the initial set of $K_1$ basis states were selected, wherein the $K_2$ basis states are selected according to a second selection protocol, different from the initial selection protocol, to define a second core space for the chemical system; merging the initial core space and the second core space to define a union core space; computing, via an eigensolver, an eigensolution for the chemical system from the union core space; and outputting the eigensolution for the chemical system.

Clause 51:

A method with improved computational system efficiency and accuracy in calculating Hamiltonian eigensolutions, comprising: selecting an initial set of $K_1$ basis states from an initial ansatz space of a chemical system, wherein the initial ansatz space is generated by a quantum computer system and includes fewer basis states than a whole basis space for the chemical system, wherein the $K_1$ basis states are selected according to a selection protocol to define an initial core space for the chemical system; in response to determining that a number of the $K_1$ basis states selected is insufficient for an eigensolver to produce an eigensolution for the chemical system from the initial core space; generating a second ansatz space corresponding to at least one basis state not included in the initial ansatz space; selecting a set of $K_2$ basis states from the second ansatz space of the chemical system, wherein the $K_2$ basis states are selected according to the selection protocol to define a second core space for the chemical system; merging the initial core space and the second core space to define a union core space; computing, via an eigensolver, an eigensolution for the chemical system from the union core space; and outputting the eigensolution for the chemical system.

Clause 52:

A method with improved computational system efficiency and accuracy in calculating Hamiltonian eigensolutions, comprising: selecting K/basis states from an ansatz space of a chemical system, wherein the ansatz space is generated by a quantum computer system and includes fewer basis states than a whole basis space for the chemical system, wherein the K, basis states are selected according to a selection protocol to define a first portion of a core space for the chemical system; creating additional basis states outside of the ansatz space by swapping alpha values and beta values representing basis states in the ansatz space to define a second portion of the core space; computing, via an eigensolver, an eigensolution for the chemical system from the core space, including the first portion and the second portion; and outputting the eigensolution for the chemical system.

Clause 53:

A method with improved computational system efficiency and accuracy in calculating Hamiltonian eigensolutions, comprising: selecting K basis states from an ansatz space of a chemical system, wherein the ansatz space is generated by a quantum computer system and includes fewer basis states than a whole basis space for the chemical system, wherein the K basis states are selected according to a selection protocol to define a first portion of a core space for the chemical system; constructing a randomly selected subset of basis states from a symmetry space for the chemical system, wherein the symmetry space includes fewer basis states than the whole basis space for the chemical system, that are not included in the ansatz space; calculating Hamming distances for the randomly selected subset of basis states; constructing a probability distribution based on the Hamming distances for the randomly selected subset of basis states; sampling M basis states from the randomly selected subset of basis states according to the probability distribution to define a second portion of the core space; computing, via an eigensolver, an eigensolution for the chemical system from the core space, including the first portion and the second portion; and outputting the eigensolution for the chemical system.

Clause 54:

A method with improved computational system efficiency and accuracy in calculating Hamiltonian eigensolutions, comprising: selecting K basis states from an ansatz space of a chemical system, wherein the ansatz space is generated by a quantum computer system and includes fewer basis states than a whole basis space for the chemical system, wherein the K basis states are selected from an unsorted list of basis states included in the ansatz space based on having a probability value above a probability threshold; computing, via an eigensolver, an eigensolution for the chemical system from the core space; and outputting the eigensolution for the chemical system.

Clause 55:

A method with improved computational system efficiency and accuracy in calculating Hamiltonian eigensolutions, comprising: generating m sets of basis states from an ansatz space of a chemical system, wherein each set of basis states of the m sets of basis states includes k basis states, wherein k differs for each set of basis states of the m sets of basis states; constructing m subspace Hamiltonians, each subspace Hamilton of the m subspace Hamiltonians corresponding to one set of basis states of the m sets of basis states; computing, via an eigensolver, m eigensolutions for the chemical system, each of the eigensolutions corresponding to one Hamilton of the m subspace Hamiltonians; computing, by the classical computer system, a weighted sum eigensolution for a full Hamiltonian of the chemical system from the m eigensolutions; and outputting the eigensolution for the chemical system.

Clause 56:

A method with improved computational system efficiency and accuracy in calculating Hamiltonian eigensolutions, comprising: selecting K basis states from an ansatz space of a chemical system, wherein the ansatz space is generated by a quantum computer system and includes fewer basis states than a whole basis space for the chemical system, wherein the K basis states are selected according to a selection protocol to define an initial core space for the chemical system; expanding, via a classical computer system, the initial core space to identify an expansion space based on basis states included in the initial core space, wherein the expansion space includes at least one basis state not included in the ansatz space; merging the initial core space and the expansion space to define an expanded core space; computing, via an eigensolver, an eigensolution for the chemical system from the expanded core space; and outputting the eigensolution for the chemical system.

Clause 57:

The method of clause 56, wherein merging the initial core space and the expansion space further comprises compressing one of the initial core space alone, the expansion space alone, or the expanded core space alone to include to include no more than K basis states.

Clause 58:

A method with improved computational system efficiency and accuracy in calculating Hamiltonian eigensolutions, comprising: selecting a first set of K basis states from a first ansatz space of a chemical system, wherein the first ansatz space is generated by a quantum computer system and includes fewer basis states than a whole basis space for the chemical system, wherein the K basis states of the first state are selected from the first ansatz space according to a selection protocol to define a core space for the chemical system; computing, via an eigensolver, a first eigensolution for the chemical system from the first core space; in response to determining that the first eigensolution does not converge: preparing a second state for the trial wave function, wherein a structure of a quantum circuit that prepares the second state is altered relative to a structure of the quantum circuit that prepared the first state; generating, via the quantum computer system, a second ansatz space from the trial wave function according to the second state, wherein the second ansatz space includes fewer basis states than the whole basis space for the chemical system; selecting a second set of K basis states from the second ansatz space according to the selection protocol to define a second core space for the chemical system; computing, via the eigensolver, a second eigensolution for the chemical system from the second core space; and in response to determining that the second eigensolution does converge, outputting the second eigensolution for the chemical system.

Clause 59:

A method with improved computational system efficiency and accuracy in calculating Hamiltonian eigensolutions, comprising: creating, via a classical computer system, a full Hamiltonian with a Hilbert space having 2n basis states; running a first plurality of iterations on a hybrid quantum-classical computer system, comprising the classical computer system and a quantum computer system, until a first stop criterion is satisfied, wherein each iteration of the first plurality of iterations comprises: assigning, via the classical computer system, an initial state for the full Hamiltonian via an initial state preparation protocol; generating, via the hybrid quantum-classical computer system, a trial wave function according to the initial state using a trial wave function preparation protocol; running a second plurality of iterations on the hybrid quantum-classical computer system until a second stop criterion is satisfied, wherein each iteration of the second plurality of iterations comprises: sampling, via the quantum computer system, a batch result including a value from the trial wave function, wherein: the value represents a computational basis state of the Hilbert space; stopping the second plurality of iterations, on the hybrid quantum-classical computer system, in response to the second stop criterion being satisfied, wherein a first plurality of values comprising the batch result sampled at each iteration of the second plurality of iterations is output; selecting, via the classical computer system, from the first plurality of values a second plurality of values that satisfies an inclusion criterion, via selecting values from the first plurality of values according to a selection protocol, wherein: a number of values of the second plurality of values equals K; K is less than 2n; and the K values of the second plurality of values describe a subset of K basis states with an amplitude of greatest magnitude from among the 2n basis states; the selection includes one of: a symmetry criterion; an overlap criterion; and an iterative contribution-based criterion; constructing, via the classical computer system, a subspace Hamiltonian comprising K basis states in a subspace Hamiltonian representation to represent the full Hamiltonian, using the second plurality of values; computing, via an eigensolver provided via the hybrid quantum-classical computer system, a minimum eigenvalue of the subspace Hamiltonian; computing, via the eigensolver provided via the hybrid quantum-classical computer system, an eigenvector corresponding to the minimum eigenvalue; and computing, via the classical computer system, a ground state value representing an approximation of the ground state of the full Hamiltonian and a ground state energy value representing an approximation of the ground state energy of the full Hamiltonian, using the minimum eigenvalue of the subspace Hamiltonian and the eigenvector corresponding to the minimum eigenvalue of the subspace Hamiltonian; and stopping the first plurality of iterations, on the classical computer system, in response to the first stop criterion being satisfied; and outputting the ground state value and the ground state energy value from a final iteration of the first plurality of iterations.

Clause 60:

The method of any of clauses 59-80, wherein the initial state preparation protocol comprises: assigning, via the classical computer system, the initial state for the full Hamiltonian, wherein the initial state comprises at least one of: a state prepared via a Hartree-Fock protocol; a zero state; a computational basis state of the Hilbert space; a state prepared via an ab-initio initial state preparation protocol; a state prepared via a tensor-network initial state preparation protocol; a sparse initial state from a ground state value from a final iteration of a previous first plurality of iterations; a uniformly distributed state; and a randomly distributed state.

Clause 61:

The method of any of clauses 59-80, wherein the trial wave function preparation protocol comprises: running, via a variational quantum eigensolver (VQE) via the hybrid quantum-classical computer system, a third plurality of iterations until a third stop criterion is satisfied, wherein each iteration of the third plurality of iterations comprises: constructing, via the classical computer system, a parameterized quantum circuit according to the initial state; generating, via execution of the parameterized quantum circuit on the quantum computer system, a parameterized wave function that approximates the ground state of the full Hamiltonian; performing, via the quantum computer system, a Pauli sampling of the parameterized wave function, produced by the parameterized quantum circuit, with regards to the full Hamiltonian; calculating, via the classical computer system, an expectation value of the parameterized wave function with respect to the full Hamiltonian; and updating a set of parameters of the parameterized quantum circuit according to the expectation value; stopping the third plurality of iterations, on the hybrid quantum-classical computer system, in response to the third stop criterion being satisfied, wherein the parameterized wave function from a last iteration of the third plurality of iterations is output; and wherein the third plurality of iterations is performed prior to the second plurality of iterations.

Clause 62:

The method of any of clauses 59-80, wherein the third stop criterion is satisfied in response to at least one of: a predefined number of iterations of the third plurality of iterations being performed; running the third plurality of iterations for a predefined amount of time; using the quantum computer system for a predefined amount of time; a change in the expectation value from a given iteration of the third plurality of iterations to a subsequent iteration of the third plurality of iterations being within a threshold value of a quantum noise variation value for the quantum computer system; a first derivative of the expectation value from a given iteration of the third plurality of iterations falling below a termination threshold; a change in the expectation value from a plurality of previous iterations of the third plurality of iterations to a subsequent iteration of the third plurality of iterations being within a termination threshold; and a predefined number of samples across the third plurality of iterations, wherein a sample comprises: executing a quantum circuit via the quantum computer system, obtaining a wave function; performing a measurement of the wave function via the quantum computer system, obtaining a measurement result; and outputting the measurement result.

Clause 63:

The method of any of clauses 59-80, wherein the trial wave function preparation protocol comprises: constructing, via the classical computer system, a parameterized quantum circuit according to the initial state; generating, via execution of the parameterized quantum circuit on the quantum computer system, a parameterized wave function that approximates the ground state of the full Hamiltonian, without performing a Pauli sampling; outputting the parameterized wave function.

Clause 64:

The method of any of clauses 59-80, wherein the second stop criterion is satisfied in response to at least one of: a predefined number of iterations of the second plurality of iterations being performed; and the batch result containing a predefined number of values.

Clause 65:

The method of any of clauses 59-80, wherein the inclusion criterion is satisfied in response to at least one of: the second plurality of values containing a predefined number of values from the first plurality of values; and the second plurality of values containing a number of values within a predefined threshold of a predefined number of values from the first plurality of values.

Clause 66:

The method of any of clauses 59-80, wherein the selection protocol comprises: when the screening criterion resulted in selection of not exactly K values from the first plurality of values, selecting an additional screening criterion to select exacting K values for use in constructing the subspace Hamiltonian, wherein the additional screening criterion is selected from at least one of: a second symmetry criterion; a second screening criterion; an overlap criterion; an iterative contribution-based criterion; a randomized selection; a screening criterion; or selection from a third plurality of values from a previous second plurality of iterations.

Clause 67:

The method of any of clauses 59-80, wherein the symmetry criterion is satisfied in response to the value representing a computational basis state of the Hilbert space, with a predetermined number of electrons, or wherein the screening criterion is satisfied in response to the value representing a computational basis state of the Hilbert space with an amplitude magnitude within a predefined top percentile of a plurality of amplitude magnitudes of the values of the first plurality of values.

Clause 68:

The method of any of clauses 59-80, wherein the symmetry criterion is satisfied based on selecting the number of values of the second plurality of values equaling K that are represented by bit strings having a number of 1s equaling a number of electrons in a chemical system represented by the full Hamiltonian.

Clause 69:

The method of any of clauses 59-80, wherein the symmetry criterion is satisfied based on selecting the number of values of the second plurality of values equaling K that are represented by bit strings having a number of 1s in positions corresponding to a given orbital equaling a number of electrons in the given orbital of a chemical system represented by the full Hamiltonian.

Clause 70:

The method of any of clauses 59-80, wherein the overlap criterion is satisfied based on: generating a graph of the first plurality of values as a plurality of nodes with edges connecting every pair of nodes for which $\langle b1|H|b2\rangle$ is non-zero; identifying a reference node from the plurality of nodes associated with a known reference state; and selecting all nodes of the plurality of nodes that share a partition with the reference node.

Clause 71:

The method of any of clauses 59-80, wherein the overlap criterion is satisfied based on: generating a graph of the first plurality of values as a plurality of nodes with edges connecting every pair of nodes for which $\langle b1|H|b2\rangle$ is non-zero; identifying a reference node from the plurality of nodes associated with a known reference state; and selecting all nodes one edge away from the reference node or a previously selected node from the plurality of nodes until all nodes of the plurality of nodes that share a partition with the reference node are selected or at least K nodes from the plurality of nodes are selected, whichever occurs first.

Clause 72:

The method of any of clauses 59-80, wherein the overlap criterion is satisfied based on: generating a graph of the first plurality of values as a plurality of nodes with edges connecting every pair of nodes for which $\rangle b1|H|b2\langle$ is non-zero; assigning a score to each node of the plurality of nodes based on a heuristic measure of how important a corresponding basis state is; identifying a reference node from the plurality of nodes associated with a known reference state; and selecting a next node one edge away from the reference node or a previously selected node from the plurality of nodes that has the highest score relative to all other nodes of the plurality of nodes that are one edge away from the references node or any previously selected node from the plurality of nodes until all nodes of the plurality of nodes that share a partition with the reference node are selected or at least K nodes from the plurality of nodes are selected, whichever occurs first.

Clause 73:

The method of any of clauses 59-80, wherein the screening criterion is satisfied based on selecting the number of values of the second plurality of values equaling K that exceed a predefined threshold value.

Clause 74:

The method of any of clauses 59-80, wherein the iterative contribution-based criterion is satisfied based on: applying, via the classical computing system, a symmetry criterion to the first plurality of values to obtain a fourth plurality of values; sorting, via the classical computing system, the fourth plurality of values based on a first plurality of magnitude of amplitude squares; selecting, via the classical computing system, from the fourth plurality of values fifth plurality of values wherein: a number of values of the fifth plurality of values is equal to k; constructing, via the classical computing system, a subspace Hamiltonian using the fifth plurality of values; solving, via the classical computing system, the eigensolutions of the subspace Hamiltonian constructed using the fifth plurality of values; selecting, via the classical computing system, a sixth plurality of values based on a second inclusion criterion, wherein the second inclusion criterion is satisfied based on: selecting, via the classical computing system, a seventh plurality of values from the fifth plurality of values with a largest amplitude; assigning, via the classical computing system, a first plurality of significance scores to the values of the fourth plurality of values not included in the fifth plurality of values, wherein a significance score in the first plurality of significance scores comprises: a measure, via the classical computer system, of the effect of adding a corresponding value to the eigensolutions of the fifth plurality of values; selecting, via the classical computing system, an eighth plurality of values comprising: a number of values of the eighth plurality of values is equal to R; and a value in the eighth plurality of values has a significance score within a top R number of significance scores; combining, via the classical computing system, a ninth plurality of values comprising; the sixth plurality of values; and the eighth plurality of values; outputting, via the classical computing system, the ninth plurality of values.

Clause 75:

The method of any of clauses 59-80, wherein the first stop criterion is satisfied in response to at least one of: a predefined number of iterations of the first plurality of iterations being performed; running the first plurality of iterations for a predefined amount of time; using the quantum computer system for a predefined amount of time; a change in the ground state energy value from a given iteration of the first plurality of iterations to a subsequent iteration of the first plurality of iterations being within a threshold value of a quantum noise variation value for the quantum computer system; a first derivative of the ground state energy value from a given iteration of the first plurality of iterations falling below a termination threshold; and a change in the ground state energy value from a plurality of previous iterations of the first plurality of iterations to a subsequent iteration of the first plurality of iterations being within a termination threshold.

Clause 76:

The method of any of clauses 59-80, further comprising, prior to outputting the first plurality of values, comprising the batch result sampled at each iteration of the second plurality of iterations, from a final iteration of the second plurality of iterations: in response to determining that the second stop criterion is not satisfied: sampling in the computational basis, via the quantum computer system, a second batch result including a second value from the trial wave function, wherein: the second value represents a computational basis state of the Hilbert space.

Clause 77:

The method of any of clauses 59-80, further comprising, prior to outputting the parameterized wave function from a last iteration of the third plurality of iterations: in response to determining that the third stop criterion is not satisfied: constructing, via the classical computer system, a second parameterized quantum circuit according to the initial state; generating, via execution of the second parameterized quantum circuit on the quantum computer system, a second parameterized wave function that approximates the ground state of the full Hamiltonian; performing, via the quantum computer system, a Pauli sampling of the second parameterized wave function, produced by the second parameterized quantum circuit, with regards to the full Hamiltonian; calculating, via the classical computer system, a second expectation value of the second parameterized wave function with respect to the full Hamiltonian; and updating a second set of parameters of the second parameterized quantum circuit according to the second expectation value.

Clause 78:

The method of any of clauses 59-80, further comprising, prior to outputting the ground state value and the ground state energy value from the final iteration of the first plurality of iterations: in response to determining that the first stop criterion is not satisfied: assigning, via the classical computer system, a second initial state for the full Hamiltonian via the initial state preparation protocol; and re-running the first plurality of iterations on the hybrid quantum-classical computer system until the first stop criterion is satisfied a second time.

Clause 79:

The method of any of clauses 59-80, further comprising, prior to outputting the ground state value and the ground state energy value from the final iteration of the first plurality of iterations: in response to determining that the first stop criterion is not satisfied: re-running the second plurality of iterations on the quantum computer system until the second stop criterion is satisfied a second time.

Clause 80:

The method of any of clauses 59-80, further comprising, prior to outputting the ground state value and the ground state energy value from the final iteration of the first plurality of iterations: in response to determining that the first stop criterion is not satisfied: re-selecting, via the classical computer system, from the first plurality of values a new second plurality of values that satisfies the inclusion criterion, via selecting values from the first plurality of values according to the selection protocol.

Clause 81:

A method with improved computational system efficiency and accuracy in calculating Hamiltonian eigensolutions, comprising: creating, via a classical computer system, a full Hamiltonian with a Hilbert space having 2n basis states; assigning, via the classical computer system, an initial state for the full Hamiltonian; constructing, via the classical computer system, a parameterized quantum circuit according to the initial state; running a plurality of iterations, on a quantum computer system, of a variation quantum eigensolver (VQE) using the parameterized quantum circuit to generate a parameterized wave function that approximates the ground state of the full Hamiltonian, wherein each iteration of the plurality of iterations includes: a Pauli sampling or a Pauli measurement of a quantum state produced by the parameterized quantum circuit with regards to the full Hamiltonian to calculate an expectation value of the parameterized wave function with respect to the full Hamiltonian; and updating parameters of the parameterized wave function according to the expectation value; stopping the plurality of iterations, on the quantum computer system, in response to a stop criterion being satisfied, wherein the parameterized wave function from a last iteration of the plurality of iterations is output as a finalized wave function; selecting, via the classical computer system, a plurality of values from the finalized wave function that satisfy an inclusion criterion, wherein: a number of samples of the plurality of samples equals K; K is less than 2n; and the K values of the plurality of values describe a subset of K basis states with greatest magnitudes from among the 2n basis states as an approximated representation of energy states in the full Hamiltonian; in response to determining that K is within a computational capacity of the classical computer system to construct a subspace Hamiltonian comprising K basis states in a K-by-K matrix to represent the full Hamiltonian: computing, via the classical computer system, classical values for the K basis states; constructing, via the classical computer system, the subspace Hamiltonian using the classical values for the K basis states; computing, via an eigensolver provided via the classical computer system, a minimum eigenvalue of the subspace Hamiltonian; computing, via the classical computer system, an eigenvector corresponding to the minimum eigenvalue; and computing, via the classical computer system, a ground state value representing the ground state and a ground state energy value representing the ground state energy of the full Hamiltonian using the minimum eigenvalue and the eigenvector of the subspace Hamiltonian.

Clause 82:

The method of any of clauses 81-94, further comprising: simulating, via the classical computer system, using the ground state value and the ground state energy value a chemical system representable in a 2n-by-2n matrix and corresponding to the full Hamiltonian in a state relative to a target biological molecule; and applying a therapeutically effective dose of the chemical system to a biological subject according to the simulation to treat a condition.

Clause 83:

The method of any of clauses 81-94, wherein the stop criterion is satisfied in response to one of: a change in the expectation value from a given iteration of the plurality of iterations to a subsequent iteration of the plurality of iterations being within a threshold value of a quantum noise variation value for the quantum computer system; or a first derivative of the expectation value across the plurality of iterations falling below a termination threshold.

Clause 84:

The method of any of clauses 81-94, further comprising, prior to determining that K is within the computational capacity of the classical computer system: determining that an earlier value of K determined after satisfying the stop criterion for an earlier plurality of iterations is less than the computational capacity of the classical computer system; assigning, via the classical computer system, a second initial state for the full Hamiltonian according to the classical ground state and the classical ground state energy of the full Hamiltonian; constructing, via the classical computer system, a second parameterized quantum circuit according to the second initial state; running a second plurality of iterations, on the quantum computer system, of the VQE using the second parameterized quantum circuit to generate a second parameterized wave function that approximates the ground state of the full Hamiltonian until the stop criterion is satisfied; and wherein selecting, via the classical computer system, the plurality of values from the finalized wave function that satisfy an inclusion criterion re-selects the plurality of values from the second parameterized wave function such that K is greater than the earlier value of K.

Clause 85:

The method of any of clauses 81-94, further comprising, prior to determining that K is within the computational capacity of the classical computer system: determining than an earlier value of K determined after satisfying the stop criterion for an earlier plurality of iterations is greater than the computational capacity of the classical computer system; assigning, via the classical computer system, a second initial state for the full Hamiltonian according to the classical ground state and the classical ground state energy of the full Hamiltonian; constructing, via the classical computer system, a second parameterized quantum circuit according to the second initial state; running a second plurality of iterations, on the quantum computer system, of the VQE using the second parameterized quantum circuit to generate a second parameterized wave function that approximates the ground state of the full Hamiltonian until the stop criterion is satisfied; and wherein selecting, via the classical computer system, the plurality of values from the finalized wave function that satisfy an inclusion criterion re-selects the plurality of values from the second parameterized wave function such that K is less than the earlier value of K.

Clause 86:

The method of any of clauses 81-94, wherein the inclusion criterion specifies that the plurality of values consists of the 2n basis states with non-zero values as identified by the quantum computing system.

Clause 87:

The method of any of clauses 81-94, wherein the inclusion criteria is based on a selection protocol that comprises: when the screening criterion resulted in selection of not exactly K values from the first plurality of values, selecting an additional screening criterion to select exacting K values for use in constructing the subspace Hamiltonian, wherein the additional screening criterion is selected from at least one of: a second symmetry criterion; a second screening criterion; an overlap criterion; a randomized selection; a screening criterion; or selection from a third plurality of values from a previous second plurality of iterations.

Clause 88:

The method of any of clauses 81-94, wherein the inclusion criteria includes a symmetry criterion, wherein the symmetry criterion is satisfied in response to the value representing a computational basis state of the Hilbert space, with a predetermined number of electrons, or wherein the screening criterion is satisfied in response to the value representing a computational basis state of the Hilbert space with an amplitude magnitude within a predefined top percentile of a plurality of amplitude magnitudes of the values of the first plurality of values.

Clause 89:

The method of any of clauses 81-94, wherein the inclusion criteria includes a symmetry criterion, wherein the symmetry criterion is satisfied based on selecting the number of values of the second plurality of values equaling K that are represented by bit strings having a number of 1s equaling a number of electrons in a chemical system represented by the full Hamiltonian.

Clause 90:

The method of any of clauses 81-94, wherein the inclusion criteria includes a symmetry criterion, wherein the symmetry criterion is satisfied based on selecting the number of values of the second plurality of values equaling K that are represented by bit strings having a number of 1s in positions corresponding to a given orbital equaling a number of electrons in the given orbital of a chemical system represented by the full Hamiltonian.

Clause 91:

The method of any of clauses 81-94, wherein the inclusion criteria includes an overlap criterion, wherein the overlap criterion is satisfied based on: generating a graph of the first plurality of values as a plurality of nodes with edges connecting every pair of nodes for which $\langle b1|H|b2\rangle$ is non-zero; identifying a reference node from the plurality of nodes associated with a known reference state; and selecting all nodes of the plurality of nodes that share a partition with the reference node.

Clause 92:

The method of any of clauses 81-94, wherein the inclusion criteria includes an overlap criterion, wherein the overlap criterion is satisfied based on: generating a graph of the first plurality of values as a plurality of nodes with edges connecting every pair of nodes for which $\langle b1|H|b2\rangle$ is non-zero; identifying a reference node from the plurality of nodes associated with a known reference state; and selecting all nodes one edge away from the reference node or a previously selected node from the plurality of nodes until all nodes of the plurality of nodes that share a partition with the reference node are selected or at least K nodes from the plurality of nodes are selected, whichever occurs first.

Clause 93:

The method of any of clauses 81-94, wherein the inclusion criteria includes an overlap criterion, wherein the overlap criterion is satisfied based on: generating a graph of the first plurality of values as a plurality of nodes with edges connecting every pair of nodes for which $\langle b1|H|b2\rangle$ is non-zero; assigning a score to each node of the plurality of nodes based on a heuristic measure of how important a corresponding basis state is; identifying a reference node from the plurality of nodes associated with a known reference state; and selecting a next node one edge away from the reference node or a previously selected node from the plurality of nodes that has the highest score relative to all other nodes of the plurality of nodes that are one edge away from the references node or any previously selected node from the plurality of nodes until all nodes of the plurality of nodes that share a partition with the reference node are selected or at least K nodes from the plurality of nodes are selected, whichever occurs first.

Clause 94:

The method of any of clauses 81-94, wherein the inclusion criteria includes a screening criterion, wherein the screening criterion is satisfied based on selecting the number of values of the second plurality of values equaling K that exceed a predefined threshold value.

Clause 95:

A classical computing system, including a processor and a memory, configured to perform the operations set forth in any one or more of clauses 1-94.

Clause 96:

A hybrid computing system, including the classical computing system described in clause 95 and a quantum computing system, configured to produce the ansatz.

Clause 97:

The hybrid computing system of clause 96, wherein the eigensolver is provided by one or both of the classical computing system and the quantum computing system.

DESCRIPTION OF TERMINOLOGY USED IN THE PRESENT DISCLOSURE

Certain terms are used throughout the description and claims to refer to particular features or components. As one skilled in the art will appreciate, different persons may refer to the same feature or component by different names. This document does not intend to distinguish between components or features that differ in name but not function.

Interpretation of "Optimize"

As used herein, the term "optimize" and variations thereof, is used in a sense understood by data scientists to refer to actions taken for continual improvement of a system relative to a goal. An optimized value will be understood to represent "near-best" value for a given reward framework, which may oscillate around a local maximum/minimum or a global maximum/minimum for a "best" value or set of values, which may change as the goal changes or as input conditions change. Accordingly, an optimal solution for a first goal at a given time may be suboptimal for a second goal at that time or suboptimal for the first goal at a later time.

Chemical Naming Conventions

As used herein, various chemical compounds are referred to by associated element abbreviations set by the International Union of Pure and Applied Chemistry (IUPAC), which one of ordinary skill in the relevant art will be familiar with. Similarly, various units of measure may be used herein, which are referred to by associated short forms as set by the International System of Units (SI), which one of ordinary skill in the relevant art will be familiar with.

Interpretation of about, Approximately, and Substantially

As used herein, "about," "approximately" and "substantially" are understood to refer to numbers in a range of the referenced number, for example the range of −10% to +10% of the referenced number, preferably −5% to +5% of the referenced number, more preferably −1% to +1% of the referenced number, most preferably −0.1% to +0.1% of the referenced number.

Numerical Ranges

Furthermore, all numerical ranges herein should be understood to include all integers, whole numbers, or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

Interpretation of "at Least One Of"

As used in the present disclosure, a phrase referring to "at least one of" a list of items refers to any set of those items, including sets with a single member, and every potential combination thereof. For example, when referencing "at least one of A, B, or C" or "at least one of A, B, and C", the phrase is intended to cover the sets of: A, B, C, A-B, B-C, and A-B-C, where the sets may include one or multiple instances of a given member (e.g., A-A, A-A-A, A-A-B, A-A-B-B-C-C-C, etc.) and any ordering thereof. For avoidance of doubt, the phrase "at least one of A, B, and C" shall not be interpreted to mean "at least one of A, at least one of B, and at least one of C".

Interpretation of "Determining"

As used in the present disclosure, the term "determining" encompasses a variety of actions that may include calculating, computing, processing, deriving, investigating, looking up (e.g., via a table, database, or other data structure), ascertaining, receiving (e.g., receiving information), accessing (e.g., accessing data in a memory), retrieving, resolving, selecting, choosing, establishing, and the like.

Examples are Illustrative and do not Limit Scope

Without further elaboration, it is believed that one skilled in the art can use the preceding description to use the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

CLAIM CONSTRUCTION

Within the claims, reference to an element in the singular is not intended to mean "one and only one" unless specifically stated as such, but rather as "one or more" or "at least one". Unless specifically stated otherwise, the term "some" refers to one or more. No claim element is to be construed under the provision of 35 U.S.C. § 112 (f) unless the element is expressly recited using the phrase "means for" or "step for". All structural and functional equivalents to the elements of the various embodiments described in the present disclosure that are known or come later to be known to those of ordinary skill in the relevant art are expressly incorporated herein by reference and are intended to be encompassed by the claims. Moreover, nothing disclosed in the present disclosure is intended to be dedicated to the public regardless of whether such disclosure is explicitly recited in the claims.

The invention is claimed as follows:

1. A method, comprising:
   selecting a first set of basis states from an ansatz space of a chemical system to define a first core space, wherein:
   the ansatz space consists of a subset of basis states from a whole basis space of the chemical system that are sample-able from a single parameterized quantum circuit on a quantum computer system,
   the whole basis space consists of every basis state to describe the chemical system,
   basis states from the ansatz space are selected for the first set of basis states according to a first selection protocol to define the first core space for the chemical system;
   computing, via an eigensolver, a first eigensolution for the chemical system from the first core space;
   determining whether the first eigensolution converges;
   in response to determining that the first eigensolution does not converge:
   selecting a second set of basis states to define a second core space for the chemical system, wherein a first number of basis states selected for the first set of basis states are equal in number to a second number of basis states selected for the second set of basis states;
   computing, via the eigensolver, a second eigensolution for the chemical system from the second core space; and
   in response to the second eigensolution converging, outputting the second eigensolution for the chemical system.

2. The method of claim 1, wherein the second set of basis states are selected from the ansatz space.

3. The method of claim 1, further comprising:
   simulating, via a classical computer system using the second eigensolution, the chemical system in a state relative to a target biological molecule; and
   applying a therapeutically effective dose of the chemical system to a biological subject according to the simulation to treat a condition.

4. A method, comprising:
   selecting a first set of basis states from an ansatz space of a chemical system to define a first core space, wherein:
   the ansatz space consists of a subset of basis states from a whole basis space of the chemical system that are sample-able from a single parameterized quantum circuit on a quantum computer system,
   the whole basis space consists of every basis state to describe the chemical system,
   basis states from the ansatz space are selected for the first set of basis states according to a first selection protocol to define the first core space for the chemical system;
   wherein the first selection protocol is selected from among:
   an electron preserving selection protocol;
   an alpha beta electron preserving selection protocol;
   an overlap partition selection protocol with partition bias;
   an overlap partition selection protocol with breadth-first bias;
   an overlap partition selection protocol with best-first bias;
   an iterative contribution-based selection protocol;
   a fixed-K-greatest selection protocol; and
   from an unsorted list of basis states included in the ansatz space based on having a probability value above a probability threshold;
   computing, via an eigensolver, a first eigensolution for the chemical system from the first core space;
   determining whether the first eigensolution converges;
   in response to determining that the first eigensolution does not converge:
   selecting a second set of basis states to define a second core space for the chemical system;
   computing, via the eigensolver, a second eigensolution for the chemical system from the second core space; and
   in response to the second eigensolution converging, outputting the second eigensolution for the chemical system.

5. The method of claim 4, wherein a first number of basis states selected for the first set of basis states differ in number from a second number of basis states selected for the second set of basis states.

6. The method of claim 4, wherein a first number of basis states selected for the first set of basis states are equal in number to a second number of basis states selected for the second set of basis states.

7. The method of claim 4, wherein the second set of basis states is selected according to the first selection protocol.

8. The method of claim 4, wherein the second set of basis states is selected according to a second selection protocol different from the first selection protocol.

9. A method, comprising:
   selecting a first set of basis states from an ansatz space of a chemical system to define a first core space, wherein:
   the ansatz space consists of a subset of basis states from a whole basis space of the chemical system that are sample-able from a single parameterized quantum circuit on a quantum computer system,
   the whole basis space consists of every basis state to describe the chemical system,
   basis states from the ansatz space are selected for the first set of basis states according to a first selection protocol to define the first core space for the chemical system;
   wherein selecting the first set of basis states further comprises:
   selecting an initial set of $K_{selected}$ basis states from the ansatz space to define a first portion of the first core space for the chemical system and are fewer in number than a set of $K_{desired}$ basis states to define the first core space; and selecting a supplemental set of $K_{supplemental}$ basis states from a symmetry space of the chemical system, wherein the symmetry space includes fewer basis states than the whole basis space for the chemical system, to define a remainder of the first core space, in which each basis state of the $K_{supplemental}$ basis states is not a member of the $K_{selected}$ basis states and $K_{supplemental} + K_{selected} = K_{desired}$;

computing, via an eigensolver, a first eigensolution for the chemical system from the first core space;

determining whether the first eigensolution converges;

in response to determining that the first eigensolution does not converge:

selecting a second set of basis states to define a second core space for the chemical system;

computing, via the eigensolver, a second eigensolution for the chemical system from the second core space; and in response to the second eigensolution converging, outputting the second eigensolution for the chemical system.

10. A method, comprising:

selecting a first set of basis states from an ansatz space of a chemical system to define a first core space, wherein:

the ansatz space consists of a subset of basis states from a whole basis space of the chemical system that are sample-able from a single parameterized quantum circuit on a quantum computer system, the whole basis space consists of every basis state to describe the chemical system, basis states from the ansatz space are selected for the first set of basis states according to a first selection protocol to define the first core space for the chemical system;

wherein selecting the first set of basis states further comprises:

selecting an initial set of $K_{selected}$ basis states from the ansatz space, wherein the $K_{selected}$ define the first core space for the chemical system and are greater in number than a set of $K_{desired}$ basis states to define the first core space;

selecting a removal set of $K_{removal}$ basis states from the set of $K_{selected}$ basis states in which $K_{selected} - K_{removal} = K_{desired}$; and removing the $K_{removal}$ basis states from the $K_{selected}$ basis states to yield the set of $K_{desired}$ basis states from which to calculate the first eigensolution;

computing, via an eigensolver, a first eigensolution for the chemical system from the first core space;

determining whether the first eigensolution converges;

in response to determining that the first eigensolution does not converge:

selecting a second set of basis states to define a second core space for the chemical system;

computing, via the eigensolver, a second eigensolution for the chemical system from the second core space; and in response to the second eigensolution converging, outputting the second eigensolution for the chemical system.

11. A method, comprising:

selecting a first set of basis states from an ansatz space of a chemical system to define a first core space, wherein:

the ansatz space consists of a subset of basis states from a whole basis space of the chemical system that are sample-able from a single parameterized quantum circuit on a quantum computer system, the whole basis space consists of every basis state to describe the chemical system, basis states from the ansatz space are selected for the first set of basis states according to a first selection protocol to define the first core space for the chemical system;

computing, via an eigensolver, a first eigensolution for the chemical system from the first core space;

determining whether the first eigensolution converges;

in response to determining that the first eigensolution does not converge:

selecting a second set of basis states to define a second core space for the chemical system, wherein selecting the second set of basis states further comprises:

generating a second ansatz space, different from the ansatz space from which the first set of basis states are selected;

computing, via the eigensolver, a second eigensolution for the chemical system from the second core space; and in response to the second eigensolution converging, outputting the second eigensolution for the chemical system.

12. A method, comprising:

selecting a first set of basis states from an ansatz space of a chemical system to define a first core space, wherein:

the ansatz space consists of a subset of basis states from a whole basis space of the chemical system that are sample-able from a single parameterized quantum circuit on a quantum computer system, the whole basis space consists of every basis state to describe the chemical system, basis states from the ansatz space are selected for the first set of basis states according to a first selection protocol to define the first core space for the chemical system;

computing, via an eigensolver, a first eigensolution for the chemical system from the first core space;

determining whether the first eigensolution converges;

in response to determining that the first eigensolution does not converge:

selecting a second set of basis states to define a second core space for the chemical system;

computing, via the eigensolver, a second eigensolution for the chemical system from the second core space; and in response to the second eigensolution converging, outputting the second eigensolution for the chemical system, wherein:

the first set of basis states and the second set of basis states are two of m sets of basis states generated from the ansatz space of the chemical system, wherein each set of basis states of the m sets of basis states includes k basis states, wherein k differs for each set of basis states of the m sets of basis states;

constructing m subspace Hamiltonians, each subspace Hamilton of the m subspace Hamiltonians corresponding to one set of basis states of the m sets of basis states;

computing, via the eigensolver, m eigensolutions for the chemical system, each of the eigensolutions corresponding to one Hamilton of the m subspace Hamiltonians, the first eigensolution and the second eigensolution being two of the m eigensolutions;

computing, by a classical computer system, a weighted sum eigensolution for a full Hamiltonian of the chemical system from the m eigensolutions; and outputting the weighted sum eigensolution for the chemical system.

13. A method, comprising:

selecting a first set of basis states from an ansatz space of a chemical system to define a first core space, wherein:
the ansatz space consists of a subset of basis states from a whole basis space of the chemical system that are sample-able from a single parameterized quantum circuit on a quantum computer system,
the whole basis space consists of every basis state to describe the chemical system,
basis states from the ansatz space are selected for the first set of basis states according to a first selection protocol to define the first core space for the chemical system;

expanding, via a classical computer system, the first core space to identify an expansion space based on basis states included in the first core space, wherein the expansion space includes at least one basis state not included in the ansatz space; and merging the first core space and the expansion space to define the first core space as an expanded core space;

computing, via an eigensolver, a first eigensolution for the chemical system from the expanded core space;

determining whether the first eigensolution converges;

in response to determining that the first eigensolution does not converge:
selecting a second set of basis states to define a second core space for the chemical system;
computing, via the eigensolver, a second eigensolution for the chemical system from the second core space; and
in response to the second eigensolution converging, outputting the second eigensolution for the chemical system.

14. A method, comprising:

selecting a first set of basis states from an ansatz space of a chemical system to define a first core space, wherein:
the ansatz space consists of a subset of basis states from a whole basis space of the chemical system that are sample-able from a single parameterized quantum circuit on a quantum computer system,
the whole basis space consists of every basis state to describe the chemical system,
basis states from the ansatz space are selected for the first set of basis states according to a first selection protocol to define the first core space for the chemical system;

wherein defining the first core space further comprises:
selecting $K_1$ basis states from the ansatz space to define a first portion of the first core space for the chemical system; and
creating additional basis states outside of the ansatz space to by swapping alpha values and beta values representing basis states in the ansatz space to define a second portion of the first core space for the chemical system;

computing, via an eigensolver, a first eigensolution for the chemical system from the first core space, including the first portion and the second portion of the first core space when computing the first eigensolution;

determining whether the first eigensolution converges;

in response to determining that the first eigensolution does not converge:
selecting a second set of basis states to define a second core space for the chemical system;
computing, via the eigensolver, a second eigensolution for the chemical system from the second core space; and
in response to the second eigensolution converging, outputting the second eigensolution for the chemical system.

15. A method, comprising:

selecting a first set of basis states from an ansatz space of a chemical system to define a first core space, wherein:
the ansatz space consists of a subset of basis states from a whole basis space of the chemical system that are sample-able from a single parameterized quantum circuit on a quantum computer system,
the whole basis space consists of every basis state to describe the chemical system,
basis states from the ansatz space are selected for the first set of basis states according to a first selection protocol to define the first core space for the chemical system;

wherein defining the first core space further comprises:
selecting K basis states from the ansatz space to define a first portion of the first core space for the chemical system;
constructing a randomly selected subset of basis states from a symmetry space for the chemical system, wherein the symmetry space includes fewer basis states than the whole basis space for the chemical system, that are not included in the ansatz space;
calculating Hamming distances for the randomly selected subset of basis states;
constructing a probability distribution based on the Hamming distances for the randomly selected subset of basis states;
sampling M basis states from the randomly selected subset of basis states according to the probability distribution to define a second portion of the first core space for the chemical system;

computing, via an eigensolver, a first eigensolution for the chemical system from the first core space, including the first portion of the first core space and the second portion of the first core space when computing the first eigensolution;

determining whether the first eigensolution converges;

in response to determining that the first eigensolution does not converge:
selecting a second set of basis states to define a second core space for the chemical system;
computing, via the eigensolver, a second eigensolution for the chemical system from the second core space; and
in response to the second eigensolution converging, outputting the second eigensolution for the chemical system.

16. A method, comprising:

selecting a first set of basis states from an ansatz space of a chemical system to define a first core space, wherein:
the ansatz space consists of a subset of basis states from a whole basis space of the chemical system that are sample-able from a single parameterized quantum circuit on a quantum computer system,
the whole basis space consists of every basis state to describe the chemical system, basis states from the ansatz space are selected for the first set of basis states according to a first selection protocol to define the first core space for the chemical system;
computing, via an eigensolver, a first eigensolution for the chemical system from the first core space;
determining whether the first eigensolution converges;
in response to determining that the first eigensolution does not converge:
   selecting a second set of basis states to define a second core space for the chemical system;
   computing, via the eigensolver, a second eigensolution for the chemical system from the second core space; and
in response to the second eigensolution converging, outputting the second eigensolution for the chemical system,
wherein a number of basis states in the first set of basis states is $K_1$ wherein a value of $K_1$ is selected based on a computational capacity of a classical computer system to construct a subspace Hamiltonian comprising $K_1$ basis states in a $K_1$-by-$K_1$ matrix to represent a full Hamiltonian of the chemical system.

* * * * *